(12) United States Patent
Prusik et al.

(10) Patent No.: US 11,455,483 B2
(45) Date of Patent: *Sep. 27, 2022

(54) TWO DIMENSIONAL BARCODE WITH DYNAMIC ENVIRONMENTAL DATA SYSTEM, METHOD, AND APPARATUS

(71) Applicant: TEMPTIME CORPORATION, Morris Plains, NJ (US)

(72) Inventors: Thaddeus Prusik, Stroudsburg, PA (US); Mohannad Abdo, Clifton, NJ (US); Clive Hohberger, Highland Park, IL (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/773,055

(22) Filed: Jan. 27, 2020

(65) Prior Publication Data

US 2020/0234019 A1 Jul. 23, 2020

Related U.S. Application Data

(63) Continuation of application No. 15/464,207, filed on Mar. 20, 2017, now Pat. No. 10,546,172, which is a
(Continued)

(51) Int. Cl.
*G06K 7/14* (2006.01)
*G06K 19/06* (2006.01)

(52) U.S. Cl.
CPC ....... *G06K 7/1473* (2013.01); *G06K 19/0614* (2013.01); *G06K 19/06037* (2013.01); *G06K 19/06046* (2013.01); *G06K 19/06075* (2013.01)

(58) Field of Classification Search
CPC .......... G06K 7/1473; G06K 19/06046; G06K 19/06075; G06K 19/0614; G06K 19/06037
See application file for complete search history.

(56) References Cited

U.S. PATENT DOCUMENTS

| 4,646,066 A | 2/1987 | Baughman et al. |
| 4,729,671 A | 3/1988 | Asano et al. |

(Continued)

FOREIGN PATENT DOCUMENTS

| CN | 101769884 | 7/2010 |
| CN | 103295043 | 9/2013 |

(Continued)

OTHER PUBLICATIONS

R. E. Blahut, "Theory and Practice of Error Control Codes (corr. Edition)", 1983, p. 166.
(Continued)

*Primary Examiner* — Sonji N Johnson
(74) *Attorney, Agent, or Firm* — K&L Gates LLP

(57) ABSTRACT

Methods, systems, and apparatus for combining preprinted information together with coded sensor information within a two-dimensional barcode. The sensor information may be of an environmental, physical or biological nature, and records a cumulative change in status of the environmental or biological condition to which the labeled product has been exposed. A sensor dye chemistry is employed that undergoes a continuous chemical or physical state change in response to the occurrence of the environmental condition. The continuous change is between an initial state and an end state causing a change in the color state of the sensor dye embedded within the sensor-augmented two-dimensional
(Continued)

barcode, encoding sensor digital information. Sensor information is recovered utilizing the error-correction feature during barcode decoding.

20 Claims, 30 Drawing Sheets

Related U.S. Application Data continuation-in-part of application No. 15/084,987, filed on Mar. 30, 2016, now Pat. No. 10,318,781.

(60) Provisional application No. 62/140,258, filed on Mar. 30, 2015.

(56) References Cited

U.S. PATENT DOCUMENTS

| | | | |
|---|---|---|---|
| 4,935,206 A | 6/1990 | Heim | |
| 5,053,339 A | 10/1991 | Patel | |
| 5,109,864 A | 5/1992 | Lu | |
| 6,070,805 A | 6/2000 | Kaufman et al. | |
| 6,642,016 B1 | 11/2003 | Sjoholm et al. | |
| 6,685,094 B2 | 2/2004 | Cameron | |
| 7,209,042 B2 | 4/2007 | Martin et al. | |
| 7,490,575 B2 | 2/2009 | Taylor et al. | |
| 7,604,398 B1 | 10/2009 | Akers et al. | |
| 7,691,634 B2 | 4/2010 | Vaillant | |
| 7,719,404 B2 | 5/2010 | Makela et al. | |
| 7,878,410 B2 | 2/2011 | Norrby et al. | |
| 8,267,576 B2 | 9/2012 | Haarer et al. | |
| 8,395,521 B2 | 3/2013 | Kauffman et al. | |
| 8,579,193 B2 | 11/2013 | Nemet et al. | |
| 8,629,081 B2 | 1/2014 | Azizian | |
| 8,757,503 B2 | 6/2014 | Conzelmann | |
| 8,870,082 B2 | 10/2014 | Cattaneo et al. | |
| 8,899,829 B1 | 12/2014 | Butera et al. | |
| 8,957,780 B2 | 2/2015 | Cooperman | |
| 8,968,662 B2 | 3/2015 | Haarer et al. | |
| 9,011,794 B2 | 4/2015 | Haarer et al. | |
| 9,022,292 B1* | 5/2015 | van der Merwe | G07F 7/1008 235/383 |
| 9,606,140 B2 | 3/2017 | Burghardt et al. | |
| 2003/0042317 A1 | 3/2003 | Behm et al. | |
| 2003/0098357 A1 | 5/2003 | Cummings et al. | |
| 2004/0092023 A1 | 5/2004 | Wright | |
| 2004/0212509 A1 | 10/2004 | Zweig | |
| 2005/0162274 A1 | 7/2005 | Shniberg et al. | |
| 2006/0083657 A1 | 4/2006 | McDonnell et al. | |
| 2006/0091215 A1* | 5/2006 | Uchiyama | G06K 19/06037 235/462.1 |
| 2006/0227669 A1 | 10/2006 | Pennaz et al. | |
| 2007/0058493 A1 | 3/2007 | Kuczynski et al. | |
| 2008/0063575 A1 | 3/2008 | Rakow et al. | |
| 2008/0173712 A1 | 7/2008 | Nemet et al. | |
| 2008/0232427 A1 | 9/2008 | Leute et al. | |
| 2009/0010304 A1 | 1/2009 | Skinner et al. | |
| 2009/0020609 A1 | 1/2009 | Cohen | |
| 2009/0166438 A1 | 7/2009 | Sanchez et al. | |
| 2010/0012018 A1 | 1/2010 | Ribi | |
| 2011/0006109 A1 | 1/2011 | Nemet et al. | |
| 2011/0084128 A1 | 4/2011 | Haarer et al. | |
| 2011/0258130 A1 | 10/2011 | Grabiner et al. | |
| 2011/0312096 A1 | 12/2011 | Whitman et al. | |
| 2012/0079981 A1 | 4/2012 | Huffman et al. | |
| 2012/0172825 A1 | 7/2012 | Ales et al. | |
| 2012/0175412 A1 | 7/2012 | Grabiner et al. | |
| 2012/0286028 A1 | 11/2012 | Simske et al. | |
| 2012/0326878 A1 | 12/2012 | Viguie et al. | |
| 2013/0015236 A1 | 1/2013 | Porter | |
| 2013/0215004 A1 | 8/2013 | Nordlinder | |
| 2013/0224875 A1 | 8/2013 | Haarer et al. | |
| 2014/0009605 A1 | 1/2014 | Lane | |
| 2014/0023264 A1 | 1/2014 | Branch et al. | |
| 2014/0127738 A1 | 5/2014 | Lee et al. | |
| 2014/0154808 A1 | 6/2014 | Patel | |
| 2014/0252096 A1 | 9/2014 | Nemet | |
| 2014/0263651 A1* | 9/2014 | Mesh-Iliescu | G06F 40/103 235/462.04 |
| 2014/0334723 A1 | 11/2014 | Chatow et al. | |
| 2014/0339312 A1 | 11/2014 | Simske | |
| 2015/0116093 A1 | 4/2015 | Swager et al. | |
| 2015/0118362 A1 | 4/2015 | Raczynski | |
| 2015/0193677 A1 | 7/2015 | Nemet | |
| 2015/0199545 A1 | 7/2015 | Sakina et al. | |
| 2015/0317923 A1* | 11/2015 | Edmonds | G09F 3/0294 40/541 |
| 2015/0332135 A1 | 11/2015 | Dixit et al. | |
| 2015/0347886 A1* | 12/2015 | Fang | G06K 19/0614 235/494 |
| 2016/0154939 A1 | 6/2016 | Grabiner et al. | |
| 2016/0292486 A1 | 10/2016 | Prusik et al. | |
| 2017/0193260 A1 | 7/2017 | Prusik et al. | |
| 2019/0197377 A1 | 6/2019 | Studnicka et al. | |
| 2019/0210806 A1 | 7/2019 | Aida et al. | |
| 2019/0267045 A1 | 8/2019 | Rueger et al. | |
| 2019/0316975 A1 | 10/2019 | Tada et al. | |
| 2020/0005237 A1 | 1/2020 | Simons | |
| 2020/0158579 A1 | 5/2020 | Tokuda et al. | |

FOREIGN PATENT DOCUMENTS

| | | |
|---|---|---|
| CN | 103543146 | 1/2014 |
| CN | 104250715 | 12/2014 |
| CN | 204155296 | 2/2015 |
| CN | 108256607 | 7/2018 |
| CN | 108682283 | 10/2018 |
| DE | 19912529 | 9/2000 |
| DE | 10325714 | 10/2004 |
| DE | 202005006301 | 6/2005 |
| DE | 102006004974 | 8/2007 |
| DE | 10 2013 011238 | 1/2015 |
| EP | 1319928 | 6/2003 |
| EP | 1645856 | 4/2006 |
| FI | 200300299 | 2/2003 |
| GB | 2430257 | 3/2007 |
| IN | 1280/CHENP/2004 | 5/2006 |
| JP | 2002-099879 | 4/2002 |
| JP | 2008-233909 | 3/2007 |
| JP | 2007285838 | 11/2007 |
| JP | 2013122341 | 6/2013 |
| JP | 5723474 | 5/2015 |
| KR | 101519317 | 5/2015 |
| WO | WO200550192 | 4/2006 |
| WO | WO200756752 | 5/2007 |
| WO | WO200806154 | 1/2008 |
| WO | WO200961831 | 5/2009 |
| WO | WO201061134 | 6/2010 |
| WO | WO201078422 | 7/2010 |
| WO | WO201085755 | 7/2010 |
| WO | WO201302552 | 1/2013 |
| WO | WO201390407 | 6/2013 |
| WO | 2014027424 | 2/2014 |
| WO | WO2014102556 | 7/2014 |
| WO | WO2014153476 | 9/2014 |
| WO | WO2015113086 | 8/2015 |
| WO | 2016160912 | 10/2016 |
| WO | 2018000051 | 1/2018 |
| WO | 2019206130 | 10/2019 |

OTHER PUBLICATIONS

S.A. Vanstone et al., "An Introduction to Error Correcting Codes with Applications", 1989, p. 219.
FreshCode TTI Labels—Varcode.
GSI General Specifications, V15, Issue 2, Jan. 2015, http://www.gs1.org/docs/barcodes/GS1_General_Specifications.pdf.
Tanguy, et al., "Enhanced Radio Frequency Biosensor for Food Quality Detection Using Functionalized Carbon . . . ", ACS Appl. Mater. Interfaces, 2015, 7 (22), pp. 11939-11947.

(56) References Cited

OTHER PUBLICATIONS

Wu, et al., "3D-printed microelectronics for integrated circuitry and passive wireless sensors", Microsystems & Nanoengineering 1, Article No. 15013 (2015).
Yang, "3D-printed 'smart cap' uses electronics to sense spoiled food", Jul. 20, 2015, UC Berkeley, http://news.berkeley.edu/2015/07/20/3d-printed-electronic-smart-cap/.
Wan, A new type of TTI based on an electrochemical pseudo transistor, Journal of Food Engineering, vol. 168, Jan. 2016, pp. 79-83.
News: New 3D technique . . . Aug. 15, 2015,AIPIA Active & Intelligent Packaging Industry Assoc., http://www.aipia.info/news-New-3D-technique-Prints-Embedded-Smart-Cap--Sensor-444.php. http://www.businesswire.com/news/home/20151013005396/en/3615067/Palladio-Group-Ink-Introduce-PhutureMed%E2%84%A2-Advanced-Packaging.
Search Report and Written Opinion dated Aug. 5, 2016 issued for International PCT Application No. PCT/US16/24884 filed: Mar. 30, 2016.
Windl, et al., "Reactivable passive radio-frequency identification temperature indicator" J. Appl. Phys. 117, 17C125 (2015).
Search Report and Written Opinion dated Jul. 26, 2018 issued for International PCT Application No. PCT/US18/23068 filed: Mar. 19, 2018.
International Search Report and Written Opinion dated Dec. 15, 2020 issued for International PCT Application No. PCT/US20/44081.
International Search Report and Written Opinion dated Dec. 18, 2020 issued in International PCT Application No. PCT/US20/44055.

* cited by examiner

FIG. 20

Inactivated Polio Vaccine

*Tests Passed*

| | |
|---|---|
| Monitor Category: | VVM7 |
| Remaining Life: | 80% |
| Expiration Date: | 2019-12-31 |
| Product Authenticity: | ✓ OK |
| GTIN: | 10123451234512 |
| Batch Number: | 16R00150 |
| Serial Number: | 1234 |

FIG. 34

Inactivated Polio Vaccine

*Tests Failed*

Monitor Category:   VVM7

Remaining Life:   0%

Expiration Date:   2019-12-31

Product Authenticity:   ✓  OK

GTIN:   *10123451234512*

Batch Number:   *16R00150*

Serial Number:   *1234*

FIG. 35

TWO DIMENSIONAL BARCODE WITH DYNAMIC ENVIRONMENTAL DATA SYSTEM, METHOD, AND APPARATUS

CROSS REFERENCES TO RELATED APPLICATIONS

The present application is a continuation application of U.S. patent application Ser. No. 15/464,207, filed on Mar. 20, 2017 which is a continuation-in-part of U.S. application Ser. No. 15/084,987, filed on Mar. 30, 2016, which is incorporated herein by reference in its entirety and which claims the benefit of U.S. Provisional Application 62/140,258, filed on Mar. 30, 2015, the entire contents of each of which are hereby incorporated herein by reference.

BACKGROUND

A barcode is an optical machine-readable representation of data. A two-dimensional (2D) barcode (e.g., Data Matrix or QR Code), is a two-dimensional way to represent information in a bar code. Black and white 2D barcodes can represent more data per unit area than one-dimensional (i.e., linear) barcodes (e.g., Code 39 or Code 128). Barcodes have many uses, including documenting inventory, tracking deliveries, matching a product against a pricing file, and providing information to the user. For some systems, data recovery from barcodes may be system critical. Many 2D barcode technologies provide robust error correction capabilities, and typically, using multiple linked barcodes or larger sized barcodes may increase data recovery capabilities. However, space available for barcodes may be limited in many aspects. Moreover, the current barcode technology may be improved upon as presently disclosed.

SUMMARY

The present disclosure provides a new and innovative system, methods and apparatus for providing and reading 2D barcodes that include dynamic environmental data, where modules of the barcode may continuously (as contrasted with step-wise) change color state in response to environmental conditions. In an exemplary aspect of the present disclosure, a sensor-augmented two-dimensional barcode includes a substrate, a first layer provided on the substrate, and a second layer provided on the substrate. The first layer includes a sensor dye region, which includes a sensor dye having a chemistry that is configured, responsive to the occurrence of an environmental condition, to undergo a continuous chemical or physical state change between an initial state and an end state, causing a change in the color state of the sensor dye. The color state indicates exposure to the environmental condition. The second layer includes a two-dimensional error-correcting barcode symbol, which includes a plurality of modules in a permanent color state. The modules are optionally square, rectangular, or circular.

In accordance with another exemplary aspect of the present disclosure, an article of manufacture includes pharmaceutical, biological, food product, chemotherapeutic or vaccine; a container holding said pharmaceutical, biological, food product, chemotherapeutic or vaccine product; and a sensor-augmented two-dimensional barcode symbol provided on or in the container, preferably being applied to the outside surface of the container.

In accordance with another exemplary aspect of the present disclosure, a method of reading of a sensor-augmented two-dimensional barcode symbol includes optically scanning an image of the sensor-augmented two-dimensional barcode symbol to obtain color values for pixels in the image. Then, a scanned pixel map containing the color values in the sensor-augmented two-dimensional barcode symbol is constructed, and the pixels in the scanned pixel map are processed to assign a binary color value to each pixel and to form a binarised pixel map. The two-dimensional barcode symbol is identified and decoded in the binarised pixel map to recover a symbol codeword sequence. Next, underlying data codewords are recovered from the symbol codeword sequence, preferably by utilizing error correction process on the symbol codeword sequence. The data codewords are processed for identification of barcode modules in a sensor dye region, and an average color value of the barcode modules in the sensor dye region is determined. The average color value of the sensor dye region is processed to determine a reflectance percentage of incident light at a time of scanning.

In accordance with another exemplary aspect of the present disclosure, a method of reading of a sensor-augmented two-dimensional barcode symbol includes a sensor-augmented two-dimensional barcode symbol includes optically scanning an image of the sensor-augmented two-dimensional barcode symbol to obtain a greyscale value for each pixel in the image. Then, a greyscale pixel map of the pixels in the sensor-augmented two-dimensional barcode symbol is constructed. Next, the method includes processing the pixels in the greyscale pixel map to assign a binary color value to each pixel and to form a binarised pixel map. Additionally, identifying the two-dimensional barcode symbol in the binarised pixel map is identified and decoded to recover a symbol codeword sequence. Then, underlying data codewords from the symbol codeword sequence are recovered utilizing an error-correction process on the symbol codewords. The data codewords are processed for identification of the barcode modules in a sensor dye region. Then, an average greyscale value of the barcode modules in the sensor dye region is determined, and the average greyscale values of the sensor dye region are processed to determine a reflectance percentage of incident light at a time of scanning.

Additional features and advantages of the disclosed system, method, and apparatus are described in, and will be apparent from, the following Detailed Description and the Figures.

BRIEF DESCRIPTION OF THE FIGURES

FIG. 20 is a representation of a 14×14 bitmap and utah placement within a 16×16 Data Matrix symbol, according to an example embodiment of the present disclosure.

FIG. 34 is a first representation of a barcode reader display, according to an example embodiment of the present disclosure.

FIG. 35 is a second representation of a barcode reader display, according to an example embodiment of the present disclosure.

DETAILED DESCRIPTION OF EXAMPLE EMBODIMENTS

Figure 1A:
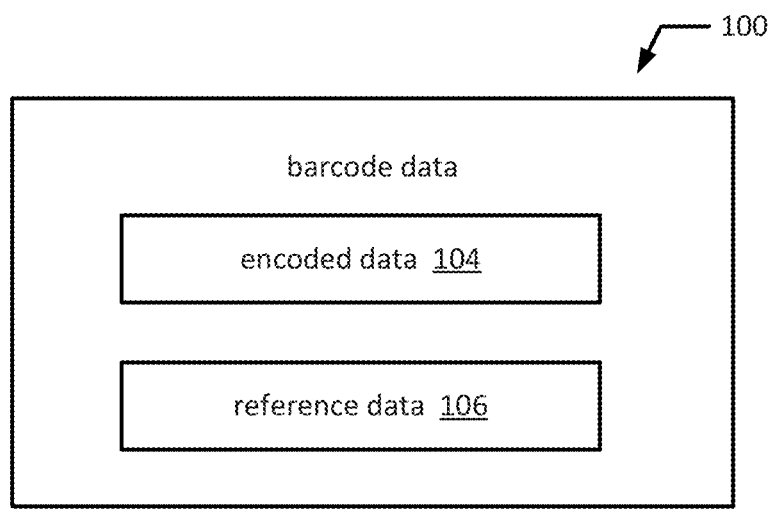
FIG. 1A is a block diagram of an example data structure of barcode data of a 2D barcode, according to an example embodiment of the present disclosure.
Figure 1B:
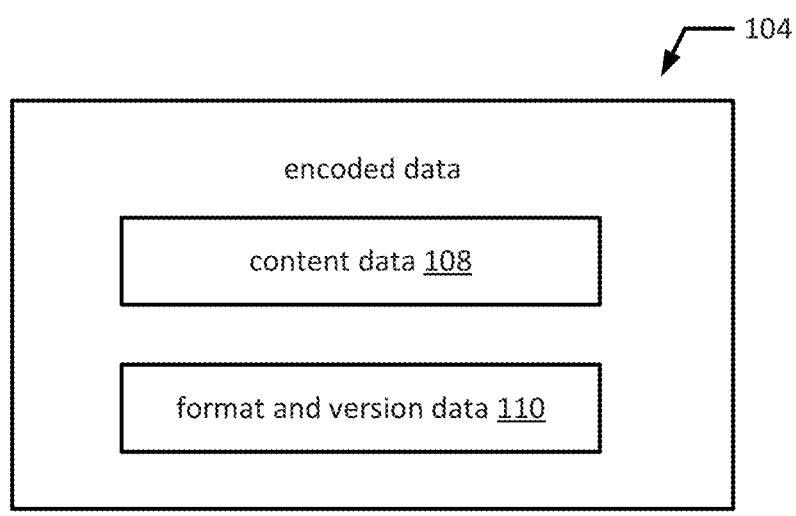
FIG. 1B is a block diagram of an example data structure of the encoded data of a 2D barcode, according to an example embodiment of the present disclosure.
Figure 1C:
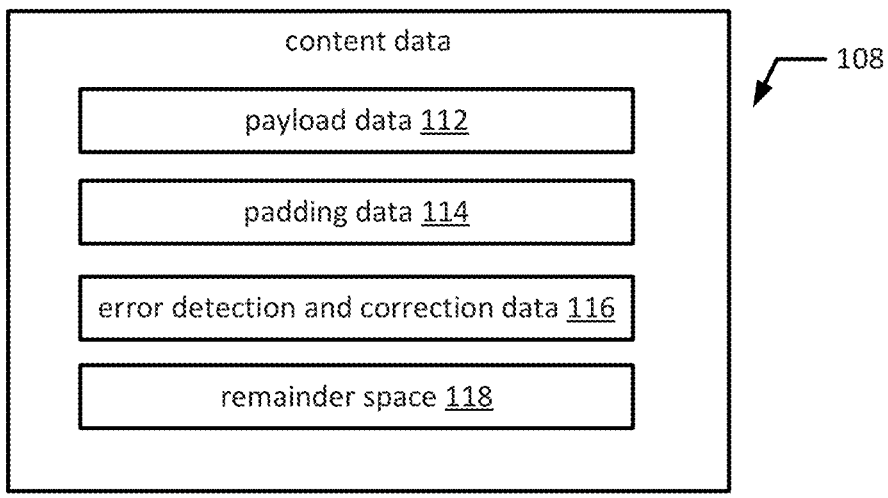
FIG. 1C is a block diagram of an example data structure of the content data of a 2D barcode, according to an example embodiment of the present disclosure.
Figure 1D:
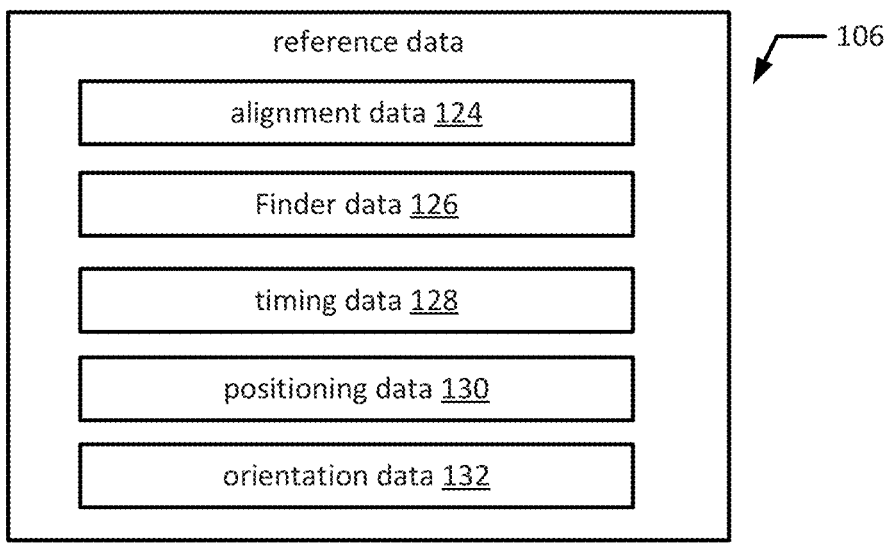
FIG. 1D is a block diagram of an example data structure of the reference data of a 2D barcode, according to an example embodiment of the present disclosure.
Figure 1E:
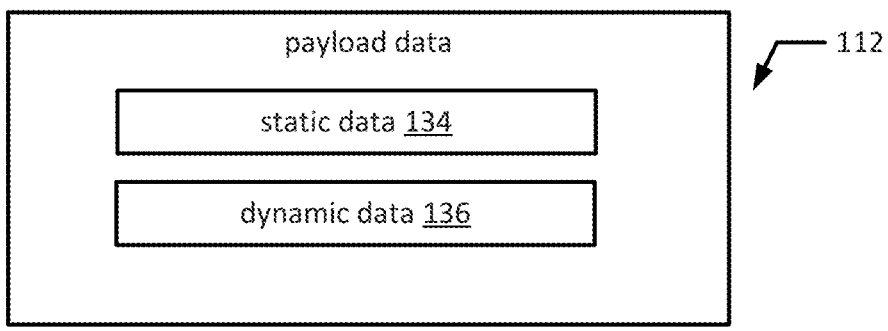
FIG. 1E is a block diagram of an example data structure of the payload data of a 2D barcode, according to an example embodiment of the present disclosure.

Prior approaches have been with one-dimensional (linear or 1D) barcodes that either become unreadable or change with stimuli. Noteworthy, are the FreshCode smart barcode labels supplied by Varcode Ltd. See: http://www.varcode.com/portfolio_item/freshcode/).

There have been a plurality of 1D barcode patent applications including Nemet et al., US20140252096 A1. While combining environmental measurements into data value of 1D barcodes has been generally described, the techniques applicable to 1D barcodes do not appear to be applicable to two-dimensional (2D) barcodes with environmental monitoring.

The area taken by 1D barcodes limit their practicality in applications were space is critical, e.g., unit of use applications, vials, etc. Two-dimensional barcodes with high density encoding technologies, for example Data Matrix, could have an encoded area approximately 30 times or more smaller in practice than a 1D barcode representing the same data.

Prior applications involving 2D barcodes have not addressed environmental monitoring and focus on high density of information stored that is static and not sensitive to environmental factors such as temperature, time, time-temperature product, freezing, nuclear radiation, toxic chemicals, or the like.

Some solutions have addressed having two sets of data, primary/secondary or covert/overt data, whereby the second set of information is stored into the redundant space of the barcode and can be read with a conventional reader or independently using a second reader or other decrypting methods. While these solutions including the secondary/covert data have addressed matters such as security and authenticity, none have addressed environmental monitoring where data is dynamic. A pending US Patent Application by Porter et al. US 20130015236 A1 High-value document authentication system and method and references contained therein describe primary and secondary information sets and the application to document authentication.

Other solutions have addressed multiple sets of data, primary/secondary/tertiary etc., whereby different data sets (secondary, tertiary, etc.) are progressively stored over the prior set. Multiple information sets are incrementally added, for example, by printing over the prior set with different color modules and then decrypting the data utilizing readers configured to interpret various color modules. See for example Simske et al., US20140339312 A1. These solutions are progressively introducing static data one layer at a time and address matters pertaining to tracking, tracing, inspection, quality assurance and not dynamic environmental data.

Some example embodiments described in this disclosure provide a unique way of combining preprinted data together with coded sensor information in a two-dimensional barcode on a media. The preprinted data and coded sensor information may be combined in a single step, or the coded sensor information may be added dynamically to the preprinted data in a secondary step depending on the actual planned sensor usage.

A sensor dye chemistry may be employed where the sensed property is an environmental, physical, or biological property. A specified condition of the sensed property causes activation of a chemical or physical state change resulting in a change in the color state of the sensor dye. The change in the color state results in sensor digital information being revealed in the pattern of sensor dye modules within the sensor-augmented two-dimensional barcode. Sensor digital information is recovered when the barcode is read using an extension of the standard reading and error correction algorithms for the two-dimensional barcode symbology in use.

In another example, the sensor dye may have a chemistry that is configured to undergo a continuous chemical or physical state change. For example, the sensor dye may continuously change between an initial state and an end state causing a change in the color state of the sensor dye. In an example, the sensor dye may have a chemical composition that continuously changes color based on exposure to both time and temperature (e.g., the current color state of the sensor dye patch is a result of the cumulative exposure to environmental conditions). For example, for a product that spoils rapidly at temperatures above 15° C., the sensor dye patch color change may indicate a short exposure to such a temperature even if the product is currently at a temperature well below 15° C. Due to the cumulative nature of the sensor dye chemistry, the sensor dye continuously changes color from an initial state to an end state such that product properties, such as remaining product life, can be obtained at any point in the supply chain.

Examples of environmental sensors include temperature monitors, measuring either cumulative heat exposure or passing beyond a set high or low temperature threshold value(s); time, time-temperature product, nuclear radiation exposure monitors; gas or humidity exposure monitors each passing above a cumulative exposure threshold or an instantaneous threshold value. Examples of medical sensors include recording patient thermometers; assays measuring levels to biological toxins such as aflatoxin or botulism toxin; and includes colorimetric immunoassays for sensing of the presence of biological agents such as prions or biological organisms such as infectious bacteria.

Block diagrams of an example data structure 100 of a two dimensional (2D) barcode, an example data structure of the encoded data of a 2D barcode, an example data structure of the content data of a 2D barcode, and an example data structure of the reference data of a 2D barcode are shown in FIG. 1A, FIG. 1B, FIG. 1C, and FIG. 1D respectively. The 2D barcode includes encoded data 104 and reference data 106. The encoded data 104 may include content data 108 and format and version data 110. The content data 108 may include payload data 112, padding data 114, error detection and correction data 116, and remainder space 118. The format and version data 110 provides information needed to decode the content data 108. For example, the format and version data 110 may include mask information. The reference data 106 is the data required to identify which protocol is being used and allows a reader to locate and scan the 2D barcode. The reference data 106 may include alignment data 124, finder data 126, timing data 128, positioning data 130, and orientation data 132. The payload data may include static data 134 and dynamic data 136. For example, as illustrated in FIGS. 2A, 2B, 2C, and 2D discussed in further detail below, the positioning data 130 may include a position block 138 or positioning modules, and the finder data 126 may include a finder pattern 142 or finder modules. Additionally, the alignment data 124 may include an alignment block 146. The timing data 128 may include a timing pattern 148. The reference data 106 may also include separators, identification modules, and orientation modules.

Figure 2B:
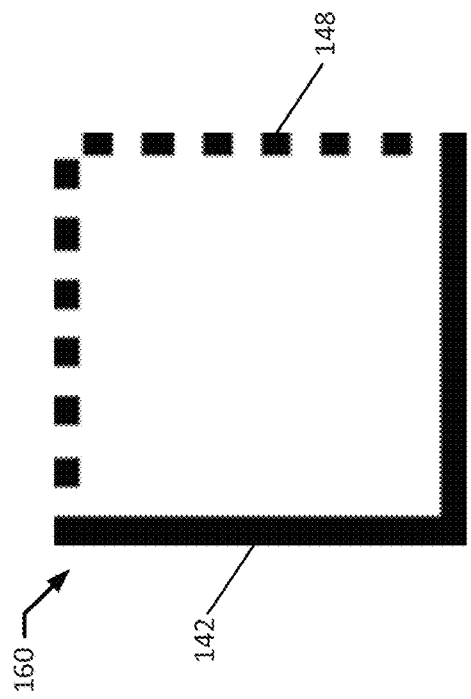
FIG. 2B is an example of the reference data of a 2D barcode, according to an example embodiment of the present disclosure.
Figure 2A:
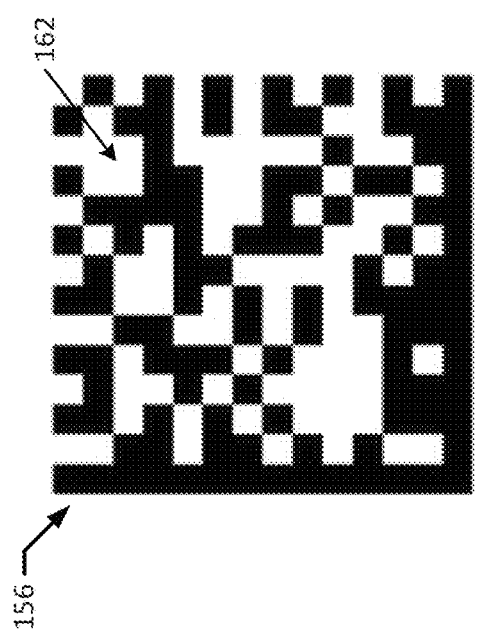
FIG. 2A is an example 2D barcode, according to an example embodiment of the present disclosure.
Figure 2D:
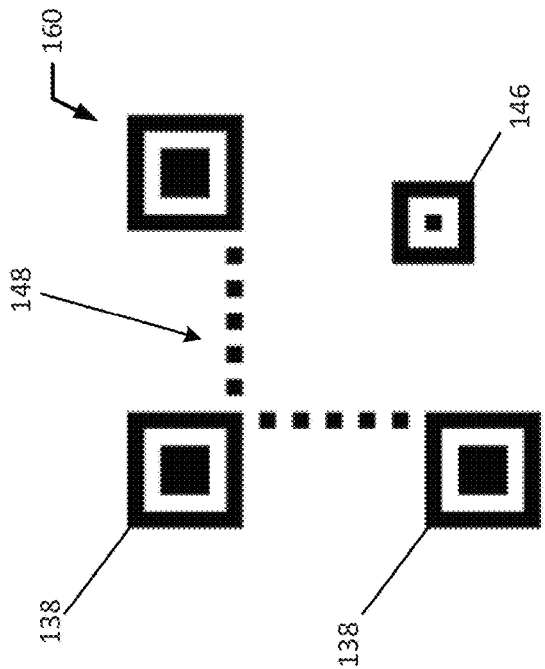
FIG. 2D is an example of the reference data of a 2D barcode, according to an example embodiment of the present disclosure.
Figure 2C:
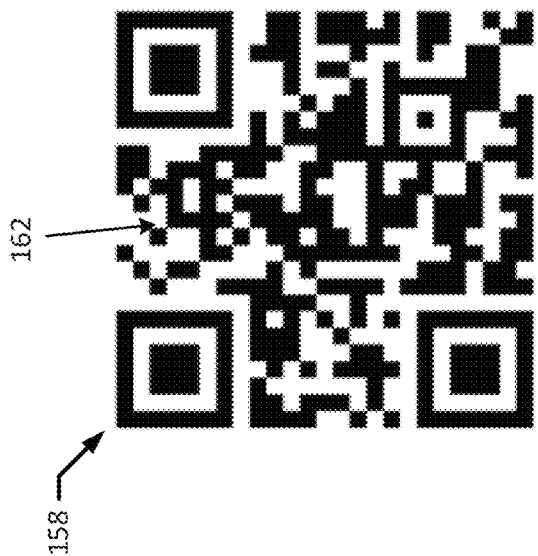
FIG. 2C is an example 2D barcode, according to an example embodiment of the present disclosure.

Example 2D barcodes are shown in FIG. 2A and FIG. 2C and their respective reference data 106 and format and version data 110 are shown in FIG. 2B and FIG. 2D. FIG. 2A includes all the encoded data 104 and reference data 106 for a 2D barcode 156 (e.g., Data Matrix). FIG. 2B shows only the reference data 106 for a 2D barcode 156. For example, the reference data 106, which includes the finder pattern 142 and the timing pattern 148, encloses the content data 108 of the 2D barcode 156. FIG. 2C includes all the encoded data 104 and reference data 106 for a 2D barcode 158 (e.g., QR code). FIG. 2D shows only the reference data 106 for a 2D barcode 158. For example, the reference data 106 may include the position blocks 138, the alignment block 146, and the timing patterns 148.

Figure 3A:
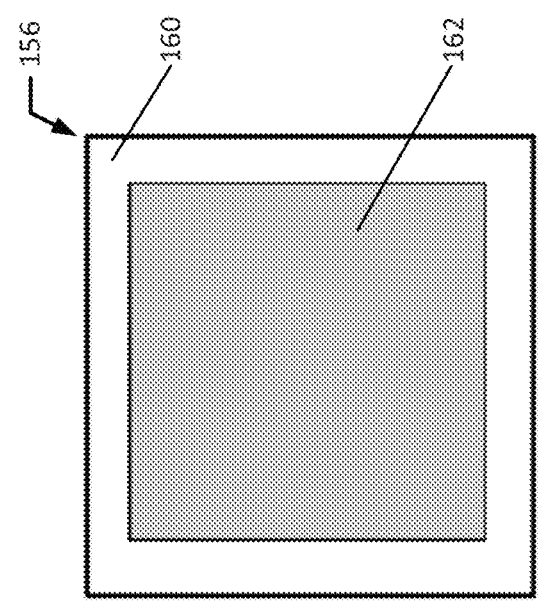
FIG. 3A is a representation of a 2D barcode, according to an example embodiment of the present disclosure.
Figure 3B:
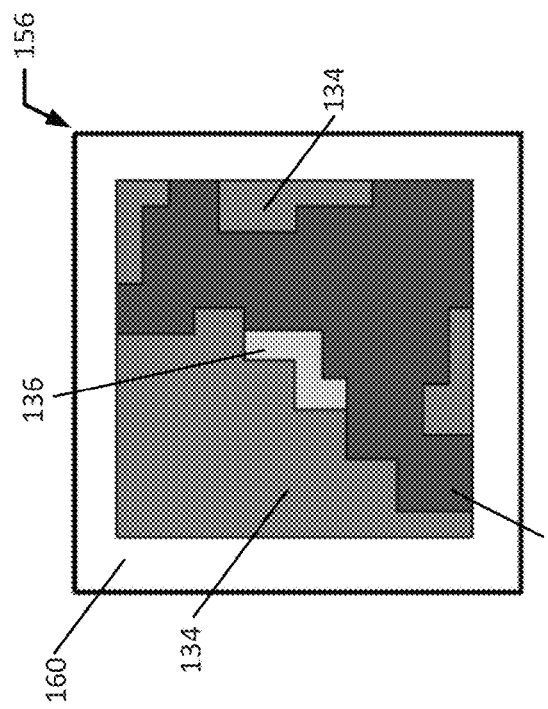
FIG. 3B is a representation of a 2D barcode, according to an example embodiment of the present disclosure.
Figure 3C:
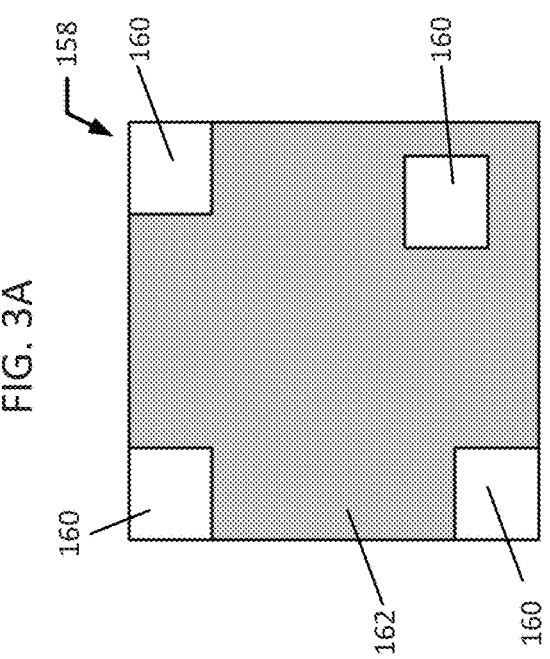
FIG. 3C is a representation of a 2D barcode, according to an example embodiment of the present disclosure.
Figure 3D:
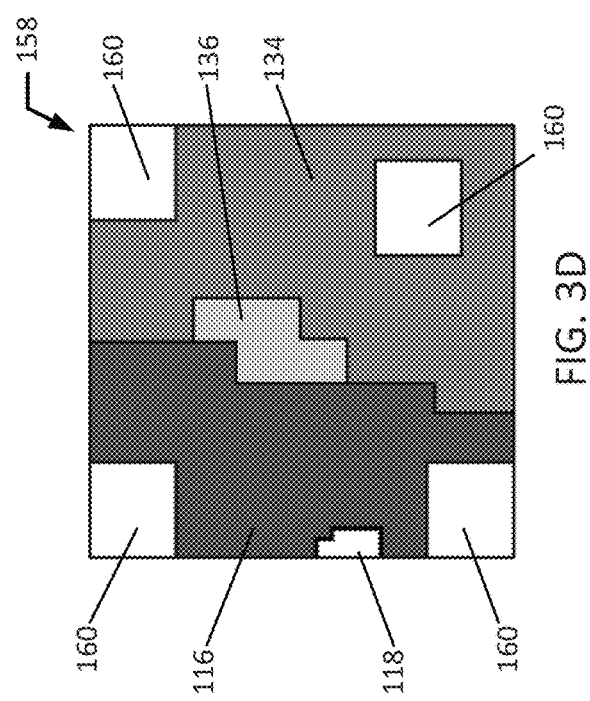
FIG. 3D is a representation of a 2D barcode, according to an example embodiment of the present disclosure.

A representation of a 2D barcode 156 is shown in FIG. 3A and FIG. 3B. A representation of a 2D barcode 158 is shown in FIG. 3C and FIG. 3D. The representation of each 2D barcode shows the reference data region 160 and the encoded data region 162. The encoded data region 162 may include static data 134, dynamic data 136, and error detection and correction data 116. Also, the 2D barcode 156 may include a plurality of unused bits which may not be used for encoded data 104 or providing reference data 106. The 2D barcode 158 may include remainder space 118 which may include a plurality of unused bits.

Some examples described herein employ Data Matrix, although it will be appreciated that similar approaches may be employed with other two dimensional bar codes schemes by varying the approach to conform with the applicable 2D barcode standard. Data Matrix is a two-dimensional error-correcting barcode symbol formed in compliance with ISO/IEC 16022 Information technology—automatic identification and data capture techniques Data Matrix barcode symbology specification. The ECC 200 Data Matrix symbology utilizes Reed-Solomon error correction to recover the encoded data from symbols which have suffered a limited amount of accidental damage or deliberate alternation. All Data Matrix referred to herein are of the ECC 200 symbol type, and may be either square or rectangular in shape, and are identified by the number of rows and columns respectively.

Data is encoded in a Data Matrix as a sequence of 8-bit codewords, or symbol character values. Codewords may either contain data or Reed-Solomon error correction (RSEC) check character values. It will be appreciated that the general approach described herein may use other codeword sizes, other data layouts, and other forms of error correcting codes, and that this common Data Matrix is only described as an example.

Each module is a visual cell in matrix comprising the Data Matrix symbol that is used to encode one bit of data. Each module is colored either nominally black or nominally white. The module matrix is the visual manifestation of the binary bitmap matrix contained with the area of the symbol bounded by the Finder Pattern. The Finder Pattern may be an 'L' formed by connected solid lines along two edges of the symbol module matrix, with an alternating pattern of white and black modules along the opposite edges of the symbol. See FIG. 16. It will be appreciated that in other bar code symbologies, other finder patterns may be employed.

Figure 16:
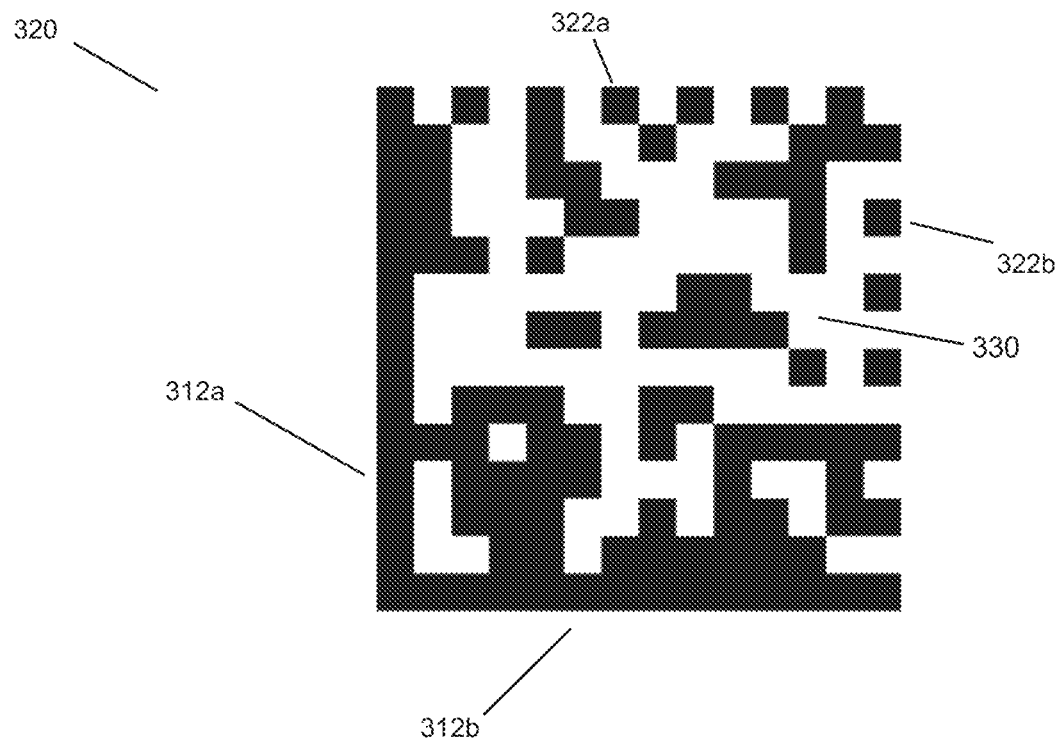
FIG. 16 is a block diagram of a 14×14 Data Matrix symbol encoding the data "1234567890", according to an example embodiment of the present disclosure.

FIG. 16 illustrates a 14×14 square Data Matrix 320 encoding the data "1234567890". This Data Matrix has two parts: the Finder Pattern forming an 'L' formed by connected solid lines 312a and 312b along two edges of the symbol with an alternating pattern of white and black modules 322a and 322b along the opposite edges of the symbol. Symbol codewords are encoded in the 12×12 module matrix 330 interior to the Finder Pattern.

Figure 17:
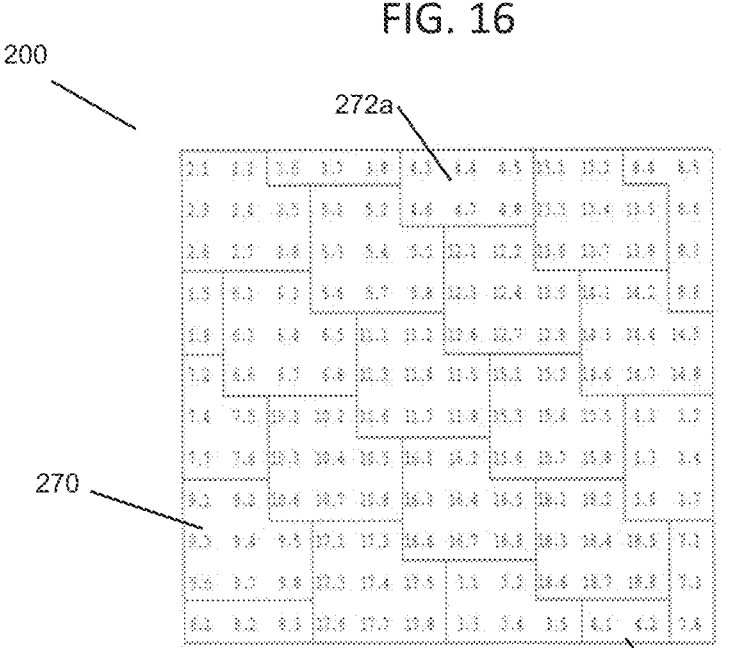
FIG. 17 is an illustration of Codeword and utah placement and bitmap matrix for a 14×14 Data matrix symbol, according to an example embodiment of the present disclosure.

The detailed structure of the 12×12 module matrix 330 of the 14×14 Data Matrix 320 is shown as the bitmap matrix 200 in FIG. 17. A 14×14 Data Matrix contains 18 codewords, each formed of eight modules corresponding to the eight bits of the codeword, referred to as a "utah." The 12×12 bitmap matrix shows the layout of all the 18 codewords in a 14×14 Data Matrix.

A "utah" is an arrangement of 8 modules to encode 1 codeword. It may be arranged either as a single connected group with a pattern frequently in the shape of the State of Utah, or formed as two subgroups of connected modules split across two patterns. The contiguous utah 270 encoding codeword 9 shows the typical arrangement of bits within a contiguous utah. Conversely, the utah for codeword 4 consists of two smaller subgroups: Subgroup 272a at the top of the bitmap matrix 200 encoding bits 4.3 through 4.8, and subgroup 272b at the bottom of the bitmap matrix encoding bits 4.1 and 4.2.

Figure 18:
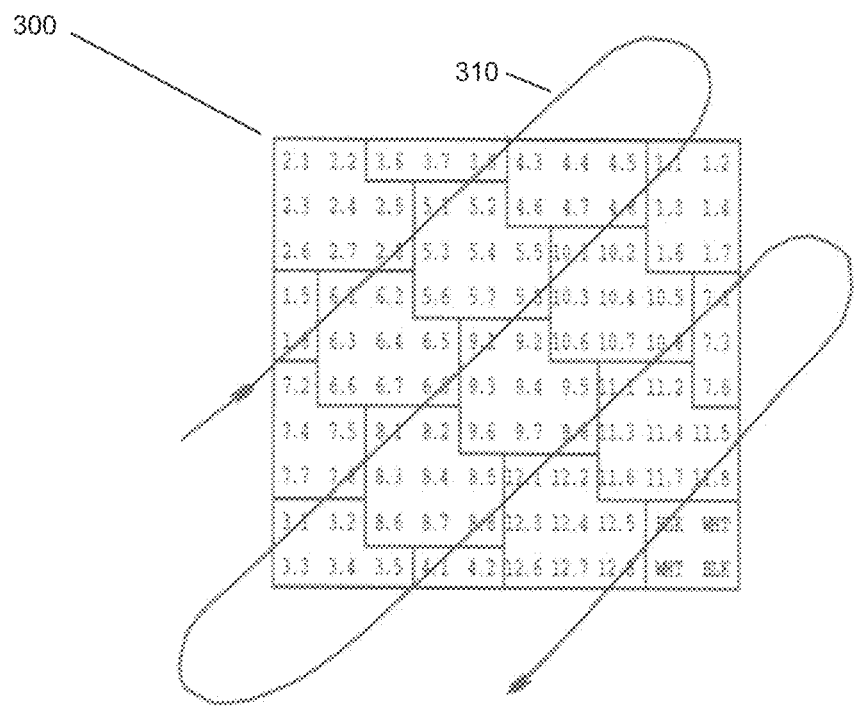
FIG. 18 is a Schematic of the general codeword placement within a 10×10 Data Matrix bitmap, according to an example embodiment of the present disclosure.

The general layout of codeword utah placement within a 10×10 Data Matrix bitmap matrix 300 is shown in FIG. 18. Trace lines 310 shows the overall method for placing codeword utahs within a bitmap matrix. Note in comparing FIG. 17 and FIG. 18 that the placement of:
  All bits of utah 2
  Utah 3 bits 3.6-3.8
  Utah 4 bits 4.3-4.8
  All bits of utahs 5 and 6

Figure 19:
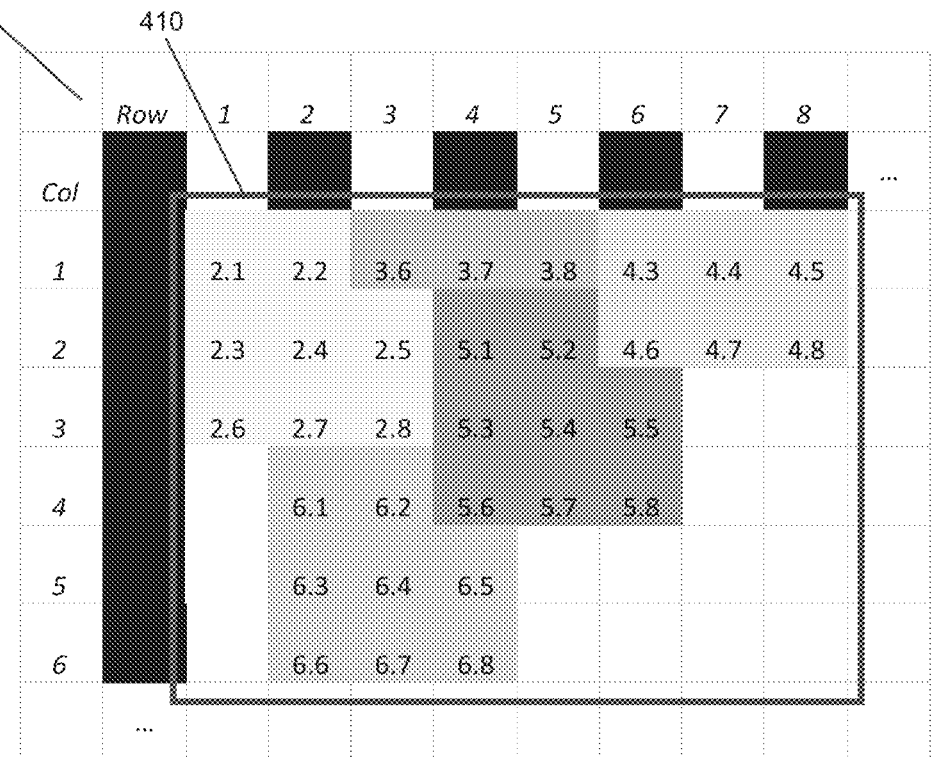
FIG. 19 is a block diagram of Invariant utah placement in all practical sizes of Data Matrix symbols, according to an example embodiment of the present disclosure.

These bit positions in identical positions relative to the upper left-hand corner (ULC) of the Data Matrix symbol. In accordance with ISO/IEC 16022 standard Annex F.3, all square Data Matrix symbols up to size 26×26 and all rectangular Data Matrix symbols, these bit positions are invariant in their placement relative to the ULC of each Data Matrix symbol. These bit positions define an "invariant bitmap" for Data Matrix symbols. It will be appreciated that other barcode standards may have different invariant bitmaps. In FIG. 19, invariant bitmap 410 is shown in the ULC of Data Matrix symbol 405. To define terminology, the printed Data Matrix symbol prior to augmentation with sensor modules is referred to as the "underlying Data Matrix symbol"; its codeword sequence as the "underlying symbol codeword sequence" encoding "underlying data codewords and their RSEC error correction codewords". It will be appreciated that other symbologies have their own underlying symbols, underlying codeword sequences, underlying data codewords and error correction codewords, depending on the particular type of error correction employed.

Figure 4:
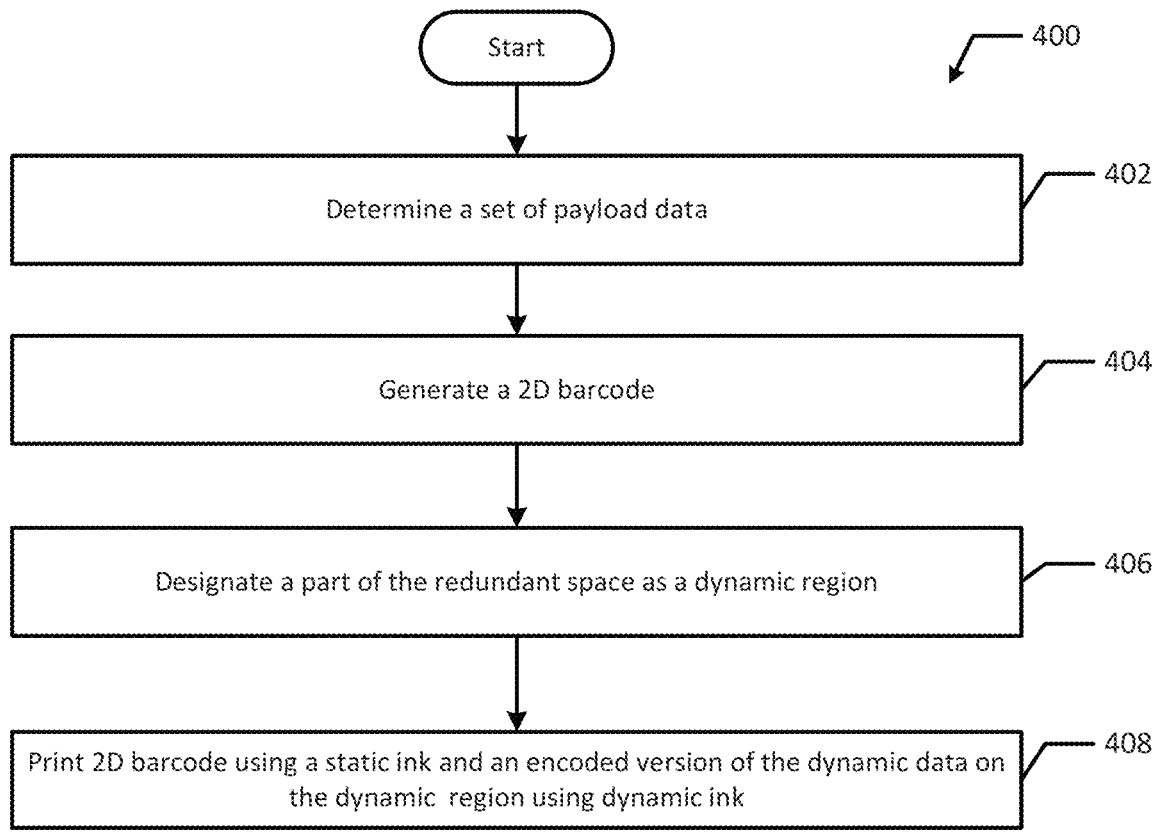
FIG. 4 includes a flowchart illustrating an example process for providing a 2D barcode, according to an example embodiment of the present disclosure.

FIG. 4 includes a flowchart of an example process 400 of providing a 2D barcode. Although the process 400 is described with reference to the flowchart illustrated in FIG. 4, it will be appreciated that many other methods of performing the acts associated with the process 400 may be used. For example, the order of many of the blocks may be changed, many blocks may be intermittently repeated or continually performed, certain blocks may be combined with other blocks, and many of the blocks described are optional or may only be contingently performed.

The example process 400 may begin with determining a set of payload data 112 which includes a set of static data 134 and a set of dynamic data 136 (block 402). For example, the set of static data 134 may include a serial number, a lot number, a batch number, and a threshold exposure temperature for a product (e.g., 30° C.). Additionally, the set of dynamic data 136 may include information that when decoded by a reader informs a user whether the product exceeded the threshold exposure temperature. Next, a 2D barcode which includes an encoded version of the set of static data is generated, and the 2D barcode includes redundant space (block 404). In an example embodiment, the redundant space may include a plurality of unused bits, a padding region, and/or error detection and correction region (e.g., remainder space 118). Additionally, the redundant space may include a format information region, a version information region, and/or a reference data region. Furthermore, the redundant space may include all of the remainder space and/or all of the plurality of unused bits. Additionally, the redundant space may include a portion of the padding data, or may include all of the padding data. The redundant space may also include a portion of the content data, a portion of the reference data, or a combination of various portions and/or all of data included in the content data and the reference data. Next, at least part of the redundant space is designated as a dynamic region which is adapted to store the set of dynamic data 136 (block 406). Next, the 2D barcode is printed using a static ink and an encoded version of the set of the dynamic data on the dynamic region using a dynamic ink which changes states responsive to at least one environmental change, such that the set of dynamic data 136 is in one of a plurality of states (block 408). In an example embodiment, the set of dynamic data 136 is readable by a reader of the 2D barcode and the set of static data 134 is readable by the reader of the 2D barcode when the set of dynamic data 136 is in each one of the plurality of states. In an example embodiment, the dynamic ink may be sensitive to an environmental factor such as temperature, time, time and temperature, freezing, radiation, toxic chemicals, or a combination of such factors, or the like. In an example embodiment, the ink may be a thermochromic ink. For example, the dynamic ink may be a water-based irreversible thermochromic ink designed to change permanently from white to black at 40° C. Additionally, the thermochromic ink may be reversible. For example, the reversible thermochromic ink may be a liquid crystal ink or a leuco dye ink (examples include QCR Solutions Reversible Thermochromic Inks and H.W. Sands Corporation inks). In an example embodiment, the ink may be a photochromic ink which may be either reversible or irreversible. For example, the dynamic ink may change states based upon exposure to UV light. Additionally, the ink may be an ink sensitive to time and temperature (an example includes the OnVu indicator). The dynamic ink may change from a darker color to a lighter color, a lighter color to a darker color, may change levels of transparency or opacity, and/or may change levels of reflectivity or absorptivity, or may change any other suitable characteristic allowing the barcode to be readable in one or more states by a reader. Additionally, the dynamic ink may continuously change between a range of an initial color state to an end color state. For example, a dynamic ink may change from a lighter color to a dark blue, which may be alternatively transformed by a reader to values on continuous "greyscale". Said greyscale (which is not necessary truly grey but is a continuous tone of some hue) is determined reducing the R, G and B values of each pixel to a single greyscale value by a formula of form:

$$\text{Greyscale value} = (aR + bG + cB)/K$$

Where {a, b, c} represent the relative contribution of each sRGB color in the pixel, and K is scaling factor. Additionally, a dynamic ink or sensor dye patch may continuously change from a white or clear color to a dark red or blue (e.g., changing from white, to a faint red, become less and less opaque until it reaches a solid red color at the end color state). Moreover, any suitable combination of colors may be used for the states of one or more dynamic inks.

In an example embodiment, the dynamic ink may permanently change or irreversibly change in response to an environmental factor. For example, a certain drug may experience chemical decomposition when it is exposed to a certain temperature. A supplier may want to know if the drug ever reached a temperature above 30° C. threshold during transportation and storage. If the dynamic ink irreversibly changes, the set of dynamic data 136 may be decoded to inform the supplier that the chemical was exposed to a temperature above 30° C. and that the contents of the container may have experienced thermal degradation. Providing a 2D barcode with the set of dynamic data 136 in the redundant space advantageously allows an individual to use a reader to read the 2D barcode both before the dynamic ink has activated and after the dynamic ink has activated from the set of dynamic data 136 in a first state to represent a set of dynamic data 136 in a second state. For example, the original 2D barcode is still readable and allows a reader to obtain the set of static data 134, such as serial number, lot number, and batch number even after the set of dynamic data 136 is in a second state, this advantageously allows both the set of static data 134 and the set of dynamic data 136 to be printed on the same 2D barcode without losing the static data 134 upon the set of dynamic data 136 changing from the first state to the second state.

In another example embodiment, the dynamic ink may continuously change in response to an environmental factor. For example, the sensor dye may change colors responsive to the occurrence of an environmental condition, such as time, temperature, or time-temperature product. For example, it may be advantageous for a product user to know the remaining product life instead of just whether or not the product has already expired. For example, products closer to expiration may have their product life extended if kept at a lower condition or by reducing exposure to a specific environmental condition. Additionally, consumption or use of products that are near expiration may be prioritized, thereby advantageously reducing waste. By having a sensor dye that continuously changes color, product life can be determined throughout the products lifetime and throughout the supply chain.

A sensor dye chemistry is utilized to detect the change in condition of a sensed environmental or medical property. Since Data Matrix modules are nominally either black or white, 6 types of sensor dye chemistries may be utilized as shown in Table 1. Here "B" refers to black color state; "W" refers to white color state; and "X" refers to the dye being in a transparent color state.

TABLE 1

Types and Color Properties of Selected Sensor Dye Chemistries

| Sensor dye chemistry | Unactivated State | Activated State |
|---|---|---|
| W→X | White | Transparent |
| W→B | White | Black |
| B→W | Black | White |
| B→X | Black | Transparent |
| X→W | Transparent | White |
| X→B | Transparent | Black |

It is assumed that black and white dye color states are opaque and thus hide the underlying color when in either the black or white state. However, when a dye is in the transparent color state (X), the underlying color is now visible.

Since sensor dye module patterns can be either overprinted on either black or white modules of the Data Matrix symbol, or printed in place of Data Matrix modules, the color state of the sensor dye modules in the Data Matrix symbol changes upon sensor dye chemistry activation. Different sensor dye chemistry systems have different properties with respect to encoding sensor data.

The sensor dye systems which go from the colored to transparent state are typically used with an underlying bit pattern that is printed in the Data Matrix, and all of the bits in that pattern are covered with sensor dye creating a uniform black or white color state covering those modules until activated. Once activated, the sensor dye turns transparent and the underlying bit pattern in the Data Matrix barcode is visible. Alternately dye systems which go from transparent color state to a black or white color state may selectively cover modules of a uniform black or white pattern printed in the Data Matrix symbol, and upon activation, the data encoded in the sensor dye module pattern is now visible. This latter system has the advantage that the sensor dye encoded data may be determined at the time of printing of the sensor dye modules which may be at a different time and location than the pre-printing of the Data Matrix symbol.

In the example, the sensor dye chemistry in use can be accurately printed on a module by module basis over a preprinted Data Matrix module, or printed in place of Data Matrix module. For example, this may be done on a multistation printing press. Another method of doing this is on-demand through the use of a 2-channel piezoelectric inkjet printer, where one channel contains black ink for printing the Data Matrix and the other channel contains sensor dye to be printed either on top of or in place of Data Matrix modules. The final Data Matrix symbol, augmented by the addition of sensor modules, is one example of a "sensor-augmented two-dimensional barcode symbol".

If a 2-channel inkjet printer is used, then the sensor dye chemistry in use should be known at the time of printing, especially if sensor modules are printed in place of normally-printed Data Matrix symbol modules.

In the case of overprinted sensor modules where the sensor dye chemistry is known at the time of printing the underlying Data Matrix, it is possible to encode indicator bits itself which specify the dye system in use. Indicator bits in the underlying Data Matrix are over printed with sensor dye modules. Use of these indicator bits will enable the Data Matrix reader to know what dye system is in use and its activation state and thus how to interpret a scanned Data Matrix symbol.

Note that in Table 2, 0=white and 1=black for each indicator bit. Only the 4 most common dye chemistries, where one of the states is transparent and the other is either black or white, are coded by the indicator bits.

TABLE 2

Indicator Bits for the Most Common Sensor Dye Chemistries

| Sensor Dye System | Data Matrix Printed Bits 3.6 and 3.7 | Indication Before Sensor Activation | Indication After Sensor Activation |
|---|---|---|---|
| W→X | 11 | 00 | 11 |
| B→X | 00 | 11 | 00 |
| X→B | 10 | 10 | 11 |
| X→W | 01 | 01 | 00 |

The value of the printed indicator bits may be recovered from the scanned image regardless of whether it is before or after sensor activation, and may be compared with the indicator bits read from the underlying Data Matrix. Then both the dye system and activation state are determined according to Table 3.

TABLE 3

Recovering the Activation State and Indicator Bits from the Scanned Image

| Underlying Data Matrix Indicator Bits | Scanned Indicator Bits | Sensor Dye System | Sensor Dye State |
|---|---|---|---|
| 00 | 00 | B→X | Activated |
| 00 | 11 | B→X | Unactivated |
| 01 | 00 | X→W | Activated |
| 01 | 01 | X→W | Unactivated |
| 10 | 10 | X→B | Unactivated |
| 10 | 11 | X→B | Activated |
| 11 | 00 | W→X | Unactivated |
| 11 | 11 | X→W | Activated |

The colors values of sensor dye modules themselves may be used to encode sensor data which either only becomes visible or changes due to module color state change upon sensor dye activation.

encoding this sensor data itself in an error correcting code is useful when the sensor color change activation threshold is not precise for each sensor dye module; where the entire sensor-augmented two-dimensional barcode may not have been exposed uniformly to the condition activating each sensor dye module; or when sensor modules may be missing or damaged.

Here it is assumed that the sensor module colors may be binarised to 0 or 1. For, example 5 bits of sensor module color data may encode two useful pieces of data: The sensor product type and the activation condition. The associated parameters may encoded using internal tables indexed by the 5-bit data value.

Many types of error correcting codes may be used to encode sensor digital information. Typically encoded is a sensor dye bit pattern of binary-encoded sensor data. Useful error correcting codes include Hamming Codes, Bose-Chaudhuri-Hocquenghem Codes, Golay Codes, Simplex Codes, Reed-Muller Codes, Fire Codes, Convolutional Codes, and Reed-Solomon Codes.

As an example, Bose-Chaudhuri-Hocquenghem BCH (n,k,t) binary error correcting codes are well known for encoding a string of binary data; here a string of k bits are within an n-bit length code with T error correction bits. Up to (t div 2) bits may be error corrected. For example, the QR Code and Ultracode 2-dimensional barcode symbologies use a BCH(15,5,7) code which can encode k=5 bits in n=15 bits and correct up to (7 div 2)=3 bit errors. There are standard decoding and error correction techniques for decoding and error correcting these codes. Table C.1 in Annex C of ISO/IEC 18004 Information technology—Automatic identification and data capture techniques—QR Code 2005 barcode symbology specification gives the complete 15 bit code sequences for data values 0, 1 . . . 31. ISO/IEC 18004 Table C.1 is summarized in Table 4. Data Values 0 and 31 are reserved and not to be encoded, as they represent unactivated dye module states: Data value 0 (all BCH bits=0) for W→X and W→B Sensor dye chemistries; data value 31 (all BCH bits=1) for B→X and B→W sensor dye chemistries.

TABLE 4

BCH (15, 5, 3) Encoding of 5 Bits of Sensor Data

| 5-Bit Data Value | BCH (15, 5, 3) Encoding | | |
|---|---|---|---|
| | Bit 15 | Bits 14->8 | Bits 7->1 |
| 0 | 0 | 0000000 | 0000000 |
| 1 | 0 | 0001010 | 0110111 |
| 2 | 0 | 0010100 | 1101110 |
| 3 | 0 | 0011110 | 1011001 |
| 4 | 0 | 0100011 | 1101011 |
| 5 | 0 | 0101001 | 1011100 |
| 6 | 0 | 0110111 | 0000101 |
| 7 | 0 | 0111101 | 0110010 |
| 8 | 0 | 1000111 | 1010110 |
| 9 | 0 | 1001101 | 1100001 |
| 10 | 0 | 1010011 | 0111000 |
| 11 | 0 | 1011001 | 0001111 |
| 12 | 0 | 1101110 | 0111101 |
| 13 | 0 | 1101110 | 0001010 |
| 14 | 0 | 1110000 | 1010011 |
| 15 | 0 | 1111010 | 1100100 |
| 16 | 1 | 0000101 | 0011011 |
| 17 | 1 | 0001111 | 0101100 |
| 18 | 1 | 0010001 | 1110101 |
| 19 | 1 | 0011011 | 1110101 |
| 20 | 1 | 0100110 | 1000000 |
| 21 | 1 | 0101100 | 1000111 |
| 22 | 1 | 0110010 | 0011110 |
| 23 | 1 | 0111000 | 0101001 |
| 24 | 1 | 1000010 | 1001101 |
| 25 | 1 | 1001000 | 1111010 |
| 26 | 1 | 1010110 | 0100011 |
| 27 | 1 | 1011100 | 0010100 |
| 28 | 1 | 1100001 | 0100110 |
| 29 | 1 | 1101001 | 0010001 |
| 30 | 1 | 1110101 | 1001000 |
| 31 | 1 | 1111111 | 1111111 |

Recovery of the sensor bit data when BCH(15,5,7) is encoded in a Data Matrix symbol (whether the sensor bits have been activated or not) may be done by first recovering the sensor digital information from scanning and decoding on the sensor-augmented two-dimensional barcode symbol. From the particular sensor dye module pattern, extract the 15-bit BCH-encoded binary number. Note that there are many standard methods for decoding and error-correcting BCH encoded data. The classic Peterson-Gorenstein Zierler Decoder is discussed in R. E. Blahut, "Theory and Practice of Error Control Codes (corr. edition)", 1983 (ISBN-10: 0-201-10102-5), p. 166. A useful and practical algorithm for a BCH(15,5,7) decoding is given by S. A Vanstone and P. C. van Oorschot, "An Introduction to Error Correcting Codes with Applications", 1989 (ISBN-10: 0-7923-9017-2), p. 219. Using any method for decoding and error-correcting BCH(15,5,7) encoded data, extract the 5-bit sensor data.

Other types of sensor digital information may be encoded in the sensor dye module pattern. This includes visual patterns and images of any type, such as ISO or ANSI or ISO warning signs and symbols, or any other type of designed graphic. The number of bits which are encoded and the number of utahs deliberately damaged in the process (which is affected by the physical extent of the visual pattern on the underlying Data Matrix symbol) as well as the size of the underlying Data Matrix and its available number of RSEC codewords all affect the visual pattern and image encoding capability.

Sensor dye module patterns may also be encoded after the underlying Data Matrix symbol has been preprinted. This allows different technologies to be used for printing the underlying Data Matrix and later printing the sensor dye module pattern. This also allows different kinds of sensor dye chemistries to be used on a previously printed Data Matrix without that sensor dye chemistry being known at the time that the underlying Data Matrix itself was printed.

In an example embodiment, a non-privileged reader may be capable of reading the static data 134 and may not be capable of reading the dynamic data 136 of the 2D barcode. In another example embodiment, only privileged readers may be capable of reading the static data 134 and the dynamic data 136 of the 2D barcode. In some cases, having dynamic data 136 on a barcode that cannot be read by non-privileged readers may advantageously allow a manufacturer or supplier to include information on a 2D barcode that they may not want to provide to the public or a customer. Additionally, having a privileged reader that may read both the static data 134 and the dynamic data 136 advantageously allows an individual using the privileged reader to obtain both the static data 134 and the dynamic data 136 without having to use multiple readers.

Figure 5:
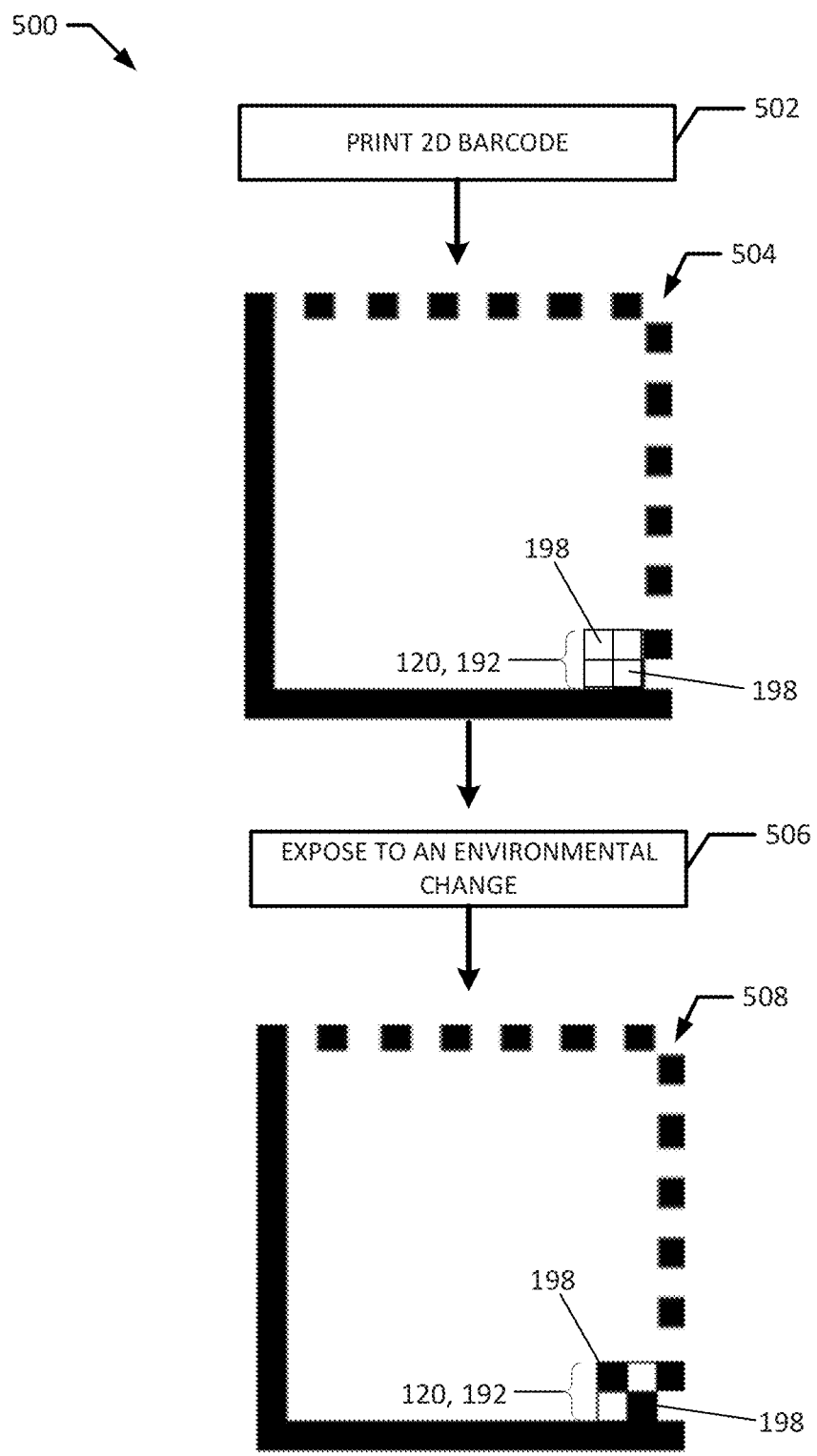
FIG. 5 is a flow diagram illustrating a 2D barcode printed using an example process for providing a 2D barcode, according to an example embodiment of the present disclosure.

FIG. 5 is a flow chart diagram 500 illustrating an example 2D barcode printed using process 400. As shown in FIG. 5, the 2D barcode is printed by a process 502 with an encoded version of the set of dynamic data on the dynamic region 192. In this example, the set of dynamic data 136 is printed on a plurality of unused bits 120 in the lower right hand corner of the 2D barcode. The dynamic ink 198 is used on the upper left hand and bottom right hand information modules of the plurality of unused bits 120. After the dynamic region is printed with the dynamic ink 198, the barcode is in a first state 504 (i.e., the dynamic ink 198 has not activated yet). The dynamic ink 198 used in the dynamic region 192 activates to a solid black color upon exposure to a specified environmental change 506. Once the 2D barcode is exposed to the environmental change 506, the set of dynamic data 136 in the dynamic region 192 changes and the 2D barcode changes to a second state 508 and conveys the information of the environmental change 506 to a reader.

Figure 6A:
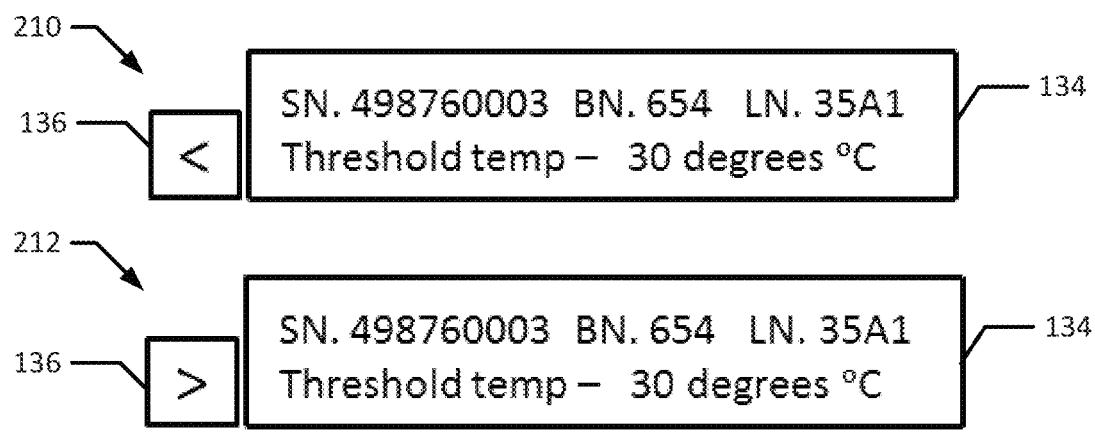
FIG. 6A is a textual representation of a set of static data and a set of dynamic data, according to an example embodiment of the present disclosure.
Figure 6B:
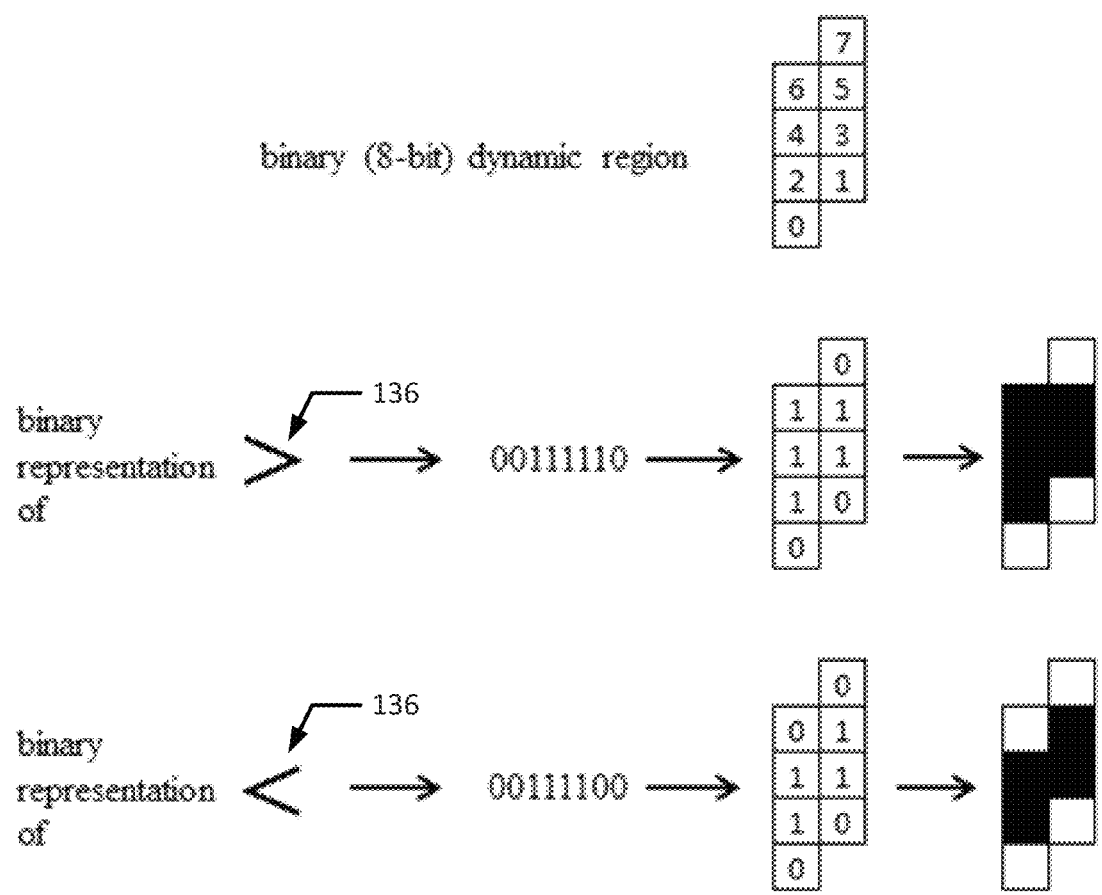
FIG. 6B is an example of textual dynamic data encoded as binary information modules, according to an example embodiment of the present disclosure.
Figure 6C:
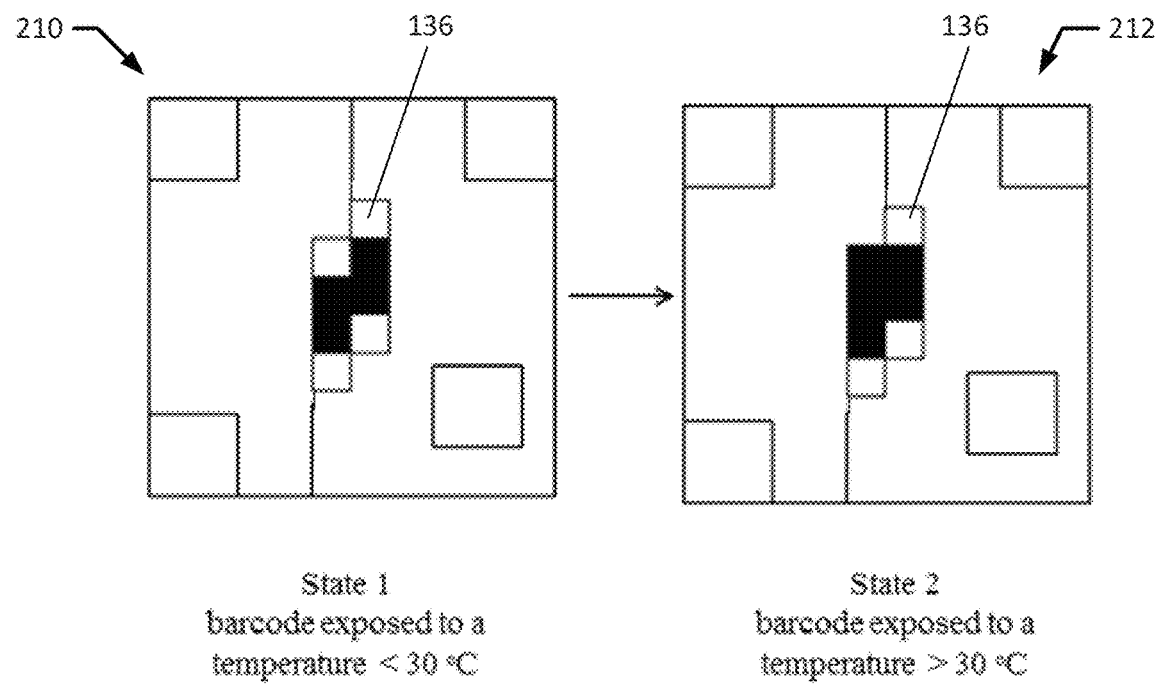
FIG. 6C is a flow chart diagram illustrating a 2D barcode printed using an example process for providing a 2D barcode, according to an example embodiment of the present disclosure.
Figure 6D:
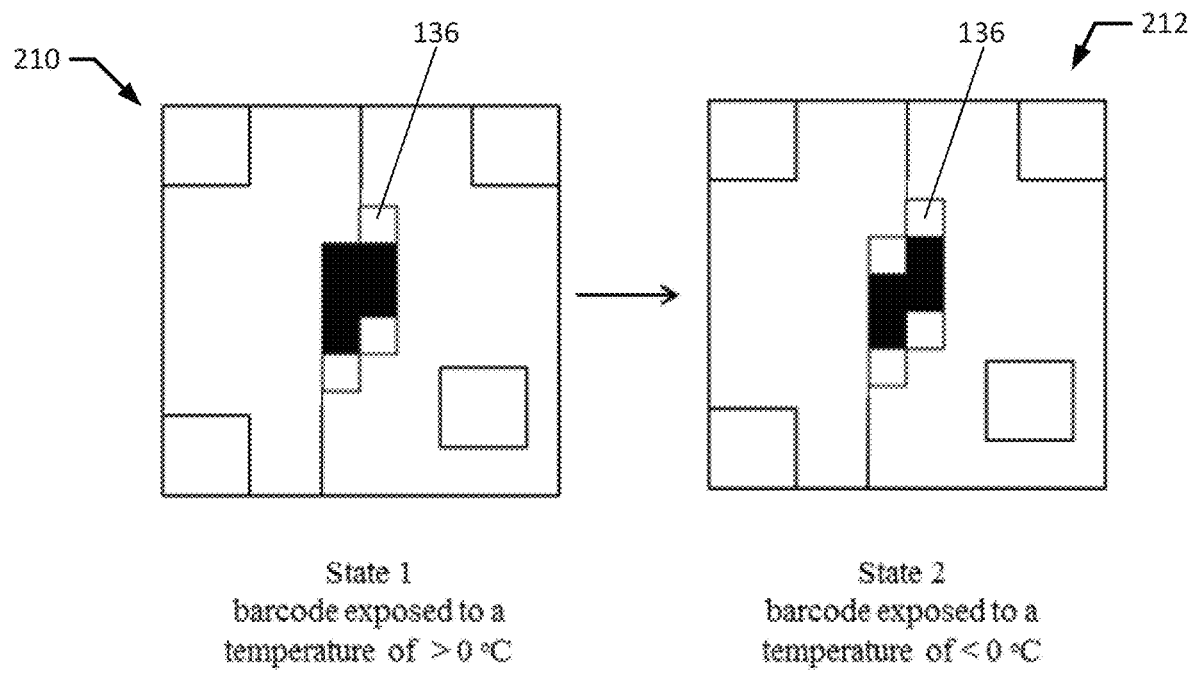
FIG. 6D is a flow chart diagram illustrating a 2D barcode printed using an example process for providing a 2D barcode, according to an example embodiment of the present disclosure.

FIG. 6A is a textual representation of a set of static data 134 and a set of dynamic data 136 that may be encoded into a 2D barcode, and FIG. 6B is an example of textual dynamic data encoded as binary information modules. FIG. 6C and FIG. 6D are flow chart diagrams illustrating the dynamic data of a 2D barcode changing from a first state to a second state. For example, the set of static data 134 includes product information such as serial number (SN), batch number (BN), and lot number (LN). In this example, the serial number is 498760003, the batch number is 654, and the lot number is 35A1. The set of static data 134 does not change. Additionally, the set of dynamic data 136 is shown in a first state 210 (top) and a second state 212 (bottom) in FIG. 6A. For example, the set of dynamic data 136 may be printed with a dynamic ink 198 that changes from a first state 210 to a second state 212 upon reaching a threshold exposure temperature above 30° C. The textual representation of the set of dynamic data 136 in the first state 210 is "<" (i.e., less than) the threshold exposure temperature specified in the set of static data 134, and the textual representation of the set of dynamic data 136 in the second state 212 is ">" (i.e., greater than) the threshold exposure temperature specified in the set of static data 134, in this case 30° C. In an example embodiment, the 2D barcode may be encoded using a binary 8-bit representation of the set of static data 134 and the set of dynamic data 136, as shown in FIG. 6B. For example, the binary representation of "<" may be "00111100" and the binary representation of ">" may be "00111110." In the present example, binary zero (0) bits are colored white and the binary one (1) bits are colored black. It should be appreciated that various other color combinations may be used to print the 2D barcode, and various other encoding methodologies may be used. The colors of black and white and binary (8-bit) encoding have been provided for illustrative purposes. FIG. 6C represents a 2D barcode with the set of dynamic data 136 in a first state 210 transitioning to a second state 212 in response to an environmental change such as the temperature rising above 30° C. For example, the dynamic ink 198 used in the 2D barcode represented in FIG. 6C shows a dynamic ink 198 that activates from white to black in response to an a temperature greater than the threshold exposure temperature. In another example embodiment, shown in FIG. 6D, the dynamic ink 198 may activate from black to white in response to an environmental change 506, such as freezing or exposure to a threshold exposure temperature below 0° C.

Figure 7:
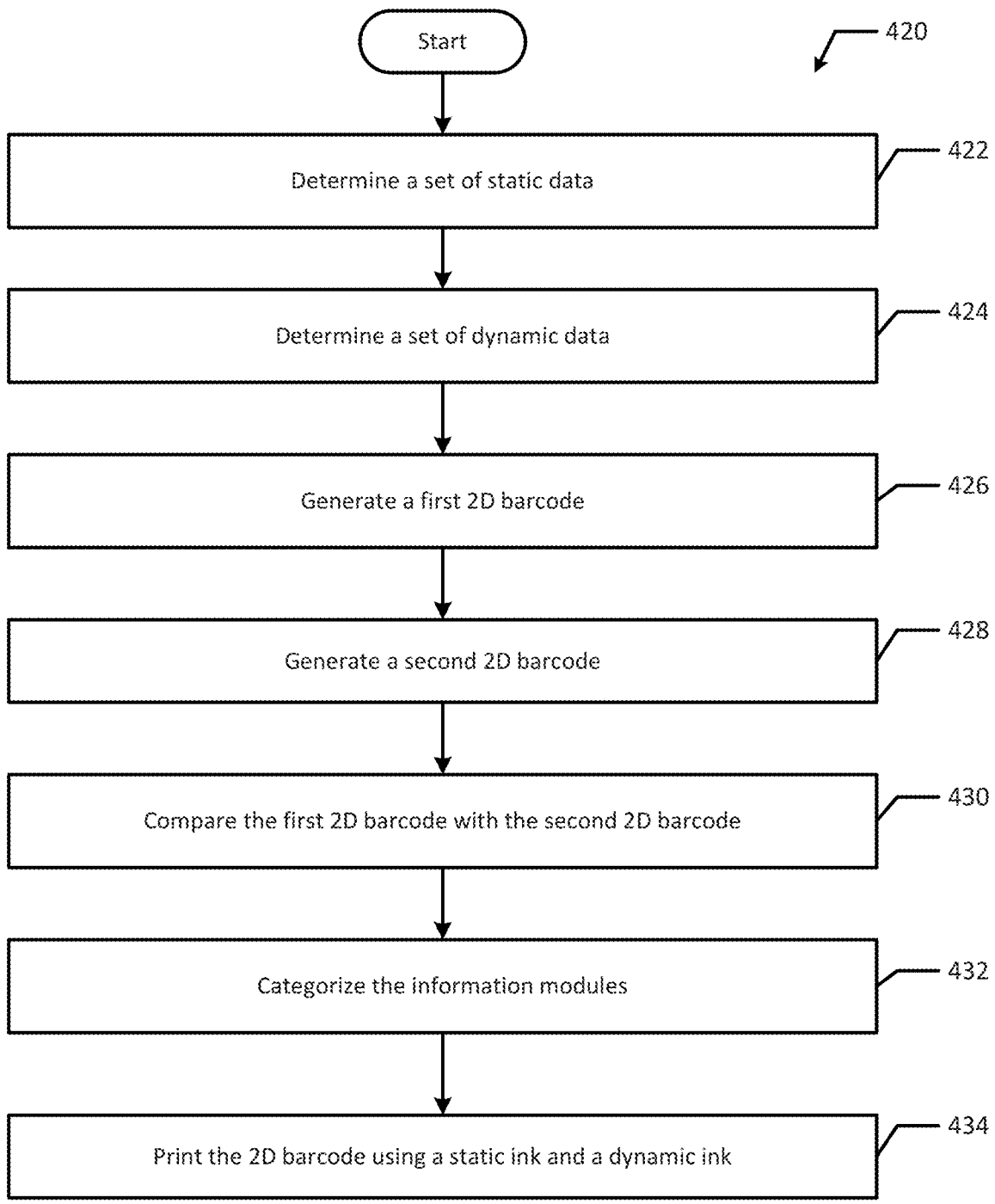
FIG. 7 includes a flowchart illustrating an example process for providing a 2D barcode, according to an example embodiment of the present disclosure.
Figure 8:
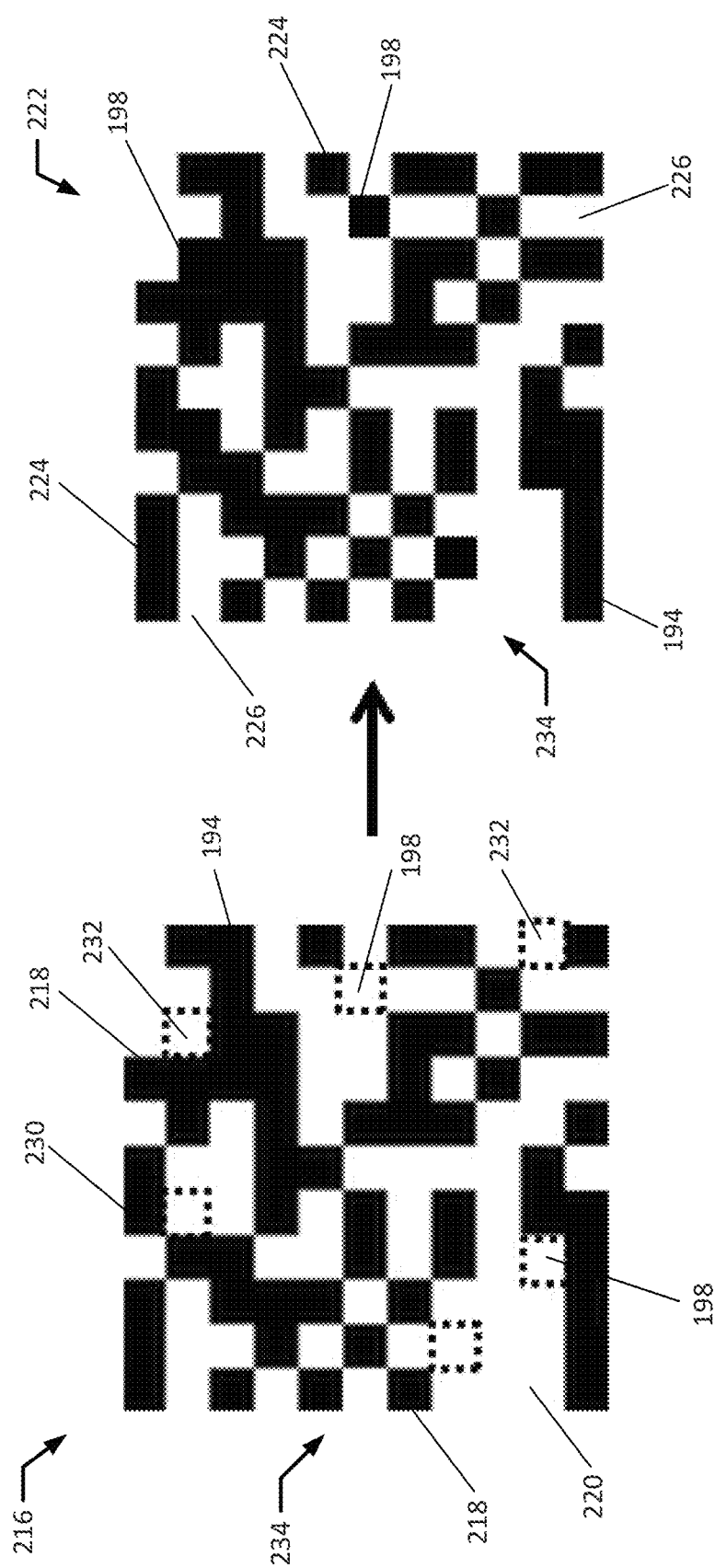
FIG. 8 is a flow diagram illustrating a portion of 2D barcode printed using an example process for providing a 2D barcode, according to an example embodiment of the present disclosure.

FIG. 7 includes a flowchart of an example process 420 of providing a 2D barcode as illustrated in FIG. 8, discussed in further detail below. Although the process 420 is described with reference to the flowchart illustrated in FIG. 7, it will be appreciated that many other methods of performing the acts associated with the process 420 may be used. For example, the order of many of the blocks may be changed, many blocks may be intermittently repeated or continually performed, certain blocks may be combined with other blocks, and many of the blocks described are optional or may only be contingently performed.

The example process 420 may begin with determining a set of static data 134 (block 422). For example, the set of static data 134 may be a serial number, a batch number, and/or a lot number, etc. Next, a set of dynamic data 136 is determined (block 424). In an example embodiment, the set of dynamic data 136 may have a first state 210 and a second state 212. For example, dynamic data 136 in a first state may be unexposed to UV light while the dynamic data 136 in a second state may be exposed to UV light. Additionally, dynamic data 136 in a first state may be a temperature less than 30° C. while the dynamic data 136 in a second state may be a temperature greater than 30° C. Then, a first 2D barcode is generated (block 426). For example, a computer may generate the first 2D barcode based on inputs of the set of static data 134 and the set of dynamic data 136 in the first state 210. In an example embodiment, the first 2D barcode may include an encoded version of the set of static data and the encoded version of the set of dynamic data 196 in the first state 210. Additionally, the set of static data 134 and the set of dynamic data 136 in the first state 210 may include a first plurality of information modules 218 and a second plurality of information modules 220. For example, the first plurality of information modules 218 may be black modules and the second plurality of information modules 220 may be white information modules. Then, a second 2D barcode is generated (block 428). For example, a computer may generate the second 2D barcode based on inputs of the set of static data 134 and the set of dynamic data 136 in the second state 212. In an example embodiment, the second 2D barcode may include an encoded version of the set of static data and an encoded version of the set of dynamic data 196 in the second state 212. Additionally, the set of static data 134 and the set of dynamic data 136 in the second state 212 may include a third plurality of information modules 224 and a fourth plurality of information modules 226. For example, the third plurality of information modules 224 may be black modules and the fourth plurality of information modules 226 may be white information modules. It should be appreciated that the first plurality of information modules 218 and the third plurality of information modules 224 may be white while the second plurality of information modules 220 and the fourth plurality of information modules 226 may be black. Furthermore, it should be appreciated that the first plurality of information modules 218 and the third plurality of information modules 224 and/or the second plurality of information modules 220 and the fourth plurality of information modules 226 may be various colors, levels of transparency, and/or levels of reflectivity, or may have any other suitable characteristic allowing the 2D barcode to be readable by a reader. In an example embodiment, the third plurality of information modules 224 may include all of the first plurality of information modules 218 plus a set of one or more information modules 228. Additionally, the second plurality of information modules 220 may include all of the fourth plurality of information modules 226 plus the set of one ore more information modules 228. Then, compare the first 2D barcode and the second 2D barcode (block 430). For example, the first 2D barcode and the second 2D barcode may include binary data having values of zero (0) or one (1), which may correspond to each information module being colored white for a binary value of zero (0) and black for a binary value of one (1). Then, categorize the information modules 214 into a first group 230 and a second group 232 (block 432). In an example embodiment, the first group 230 may include common information modules between the first plurality of information modules 218 of the first 2D barcode and the third plurality of information modules 224 of the second 2D barcode. Additionally, the second group 232 may include unique information modules of the third plurality of information modules 224 of the second 2D barcode. For example, a computer may categorize all the black information modules that are common to the first 2D barcode and the second 2D barcode into the first group 230. Additionally, the computer may categorize all the black information modules that are unique to the second 2D barcode (i.e., the information modules that were white in the first 2D barcode and are black in the second 2D barcode) into the second group 232. Then, print the 2D barcode using a static ink 194 and a dynamic ink 198 (block 434). In an example embodiment, the first group 230 may be printed in the static ink 194, and the second group 232 may be printed in the dynamic ink 198. Additionally, the dynamic ink 198 may be adapted to activate in response to the occurrence of a specific environmental factor. In an example embodiment, the dynamic ink 198 may be sensitive to an environmental factor such as temperature, time, time and temperature, freezing, radiation, toxic chemicals, or a combination of such factors, or the like.

In an example embodiment, the first plurality of information modules 218 and the third plurality of information modules 224 may be adapted to be visually distinguishable from a printing surface 234 and the third plurality of information modules 224 and the fourth plurality of information modules 226 may be visually indistinguishable from the printing surface 234. It should be appreciated that various printing techniques may be used that involve printing with ink, dye, paint, and/or any other suitable material, or the like. Additionally, various other techniques may be used to change the visual appearance of the printing surface 234 of the 2D barcode such as etching, burning, melting, removing material, and/or any other process adapted to print a 2D barcode. For example, a printing surface 234 may include a white substrate covered with a black top layer which is etched away to reveal the white substrate underneath. Additionally, a printing surface 234 may include a blue substrate covered with a yellow top layer, along with various other color combinations.

FIG. 8 is flow diagram illustrating an example portion of a 2D barcode printed using process 420. As shown in FIG. 8, the first 2D barcode portion 216 is a portion of an example barcode that includes an encoded version of a portion of the set of static data and an encoded version of a portion of the set of dynamic data 196 in a first state 210. The second 2D barcode portion 222 is the portion of the example barcode that includes the encoded version of the portion of the set of static data and the encoded version of the portion of the set of dynamic data 196 in a second state 212. All of the black information modules are the first group 230 of common information modules between the first plurality of information modules 218 of the first 2D barcode portion 216 and the third plurality of information modules 224 of the second 2D barcode portion 222. Additionally, the information modules outlined in dotted lines may be the second group 232 of unique information modules of the third plurality of information modules 224 of the second 2D barcode portion 222. For example, the second group 232 of information modules may include all of the information modules that are changing from white to black when the set of dynamic data 136 transitions from the first state 210 to the second state 212. Only using one dynamic ink 198 advantageously allows the 2D barcodes to be printed in a more efficient and cost effective manner. Additionally, the use of only one dynamic ink 198 advantageously reduces the risk of the code becoming unreadable due to an offset or delayed activation time of multiple dynamic inks. It should be appreciated that the example embodiments disclosed herein may translate to various 2D barcodes including an Aztec Code, Code 1, CrontoSign, CyberCode, DataGlyphs, Data Matrix, Datastrip code, EZcode, High Capacity Color Barcode, InterCode, MaxiCode, MMCC, NexCode, PDF417, Qode, QR code, ShotCode, SPARQCode, and the like.

Figure 9:
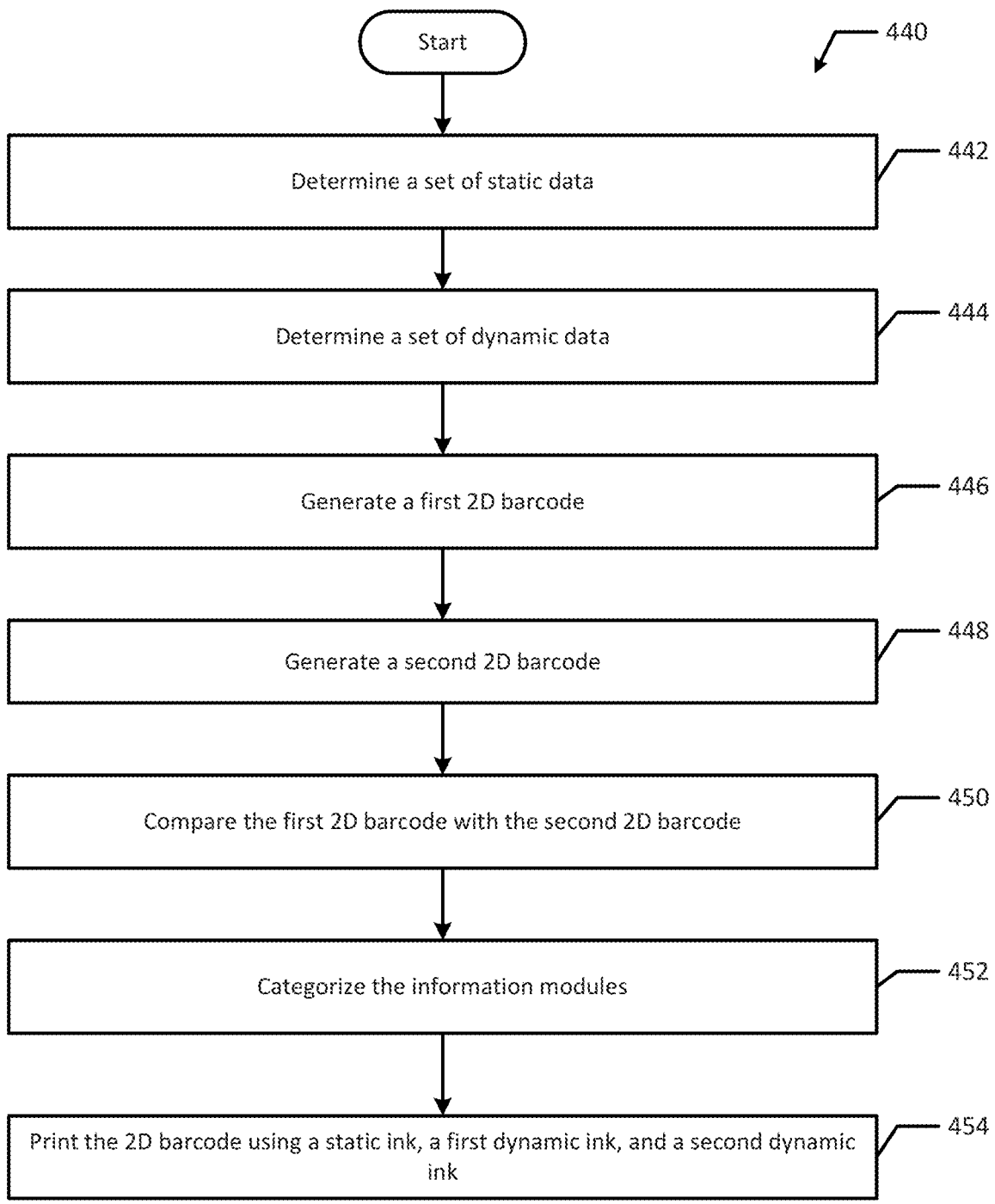
FIG. 9 includes a flowchart illustrating an example process for providing a 2D barcode, according to an example embodiment of the present disclosure.

FIG. 9 includes a flowchart of an example process 440 of generating a 2D barcode. Although the process 440 is described with reference to the flowchart illustrated in FIG. 9, it will be appreciated that many other methods of performing the acts associated with the process 440 may be used. For example, the order of many of the blocks may be changed, many blocks may be intermittently repeated or continually performed, certain blocks may be combined with other blocks, and many of the blocks described are optional or may only be contingently performed.

The example process 440 may begin with determining a set of static data 134 (block 442). For example, the set of static data 134 may be a serial number, a batch number, and/or a lot number, etc. Next, a set of dynamic data 136 is determined (block 444). In an example embodiment, the set of dynamic data 136 may have a first state 210 and a second state 212. The set of dynamic data 136 may have more than two states. For example, the set of dynamic data 136 may have a first state 210, a second state 212 (e.g., activated by going above 25° C.), and a third state (e.g., activated by going above 40° C.). Then, a first 2D barcode is generated (block 446). For example, a computer may generate the first 2D barcode based on inputs of the set of static data 134 and the set of dynamic data 136 in the first state 210. In an example embodiment, the first 2D barcode may include an encoded version of the set of static data and an encoded version of the set of dynamic data 196 in the first state 210. Additionally, the set of static data 134 and the set of dynamic data 136 in the first state 210 may include a first plurality of information modules 218 and a second plurality of information modules 220. For example, the first plurality of information modules 218 may be black modules and the second plurality of information modules 220 may be white information modules. Then, a second 2D barcode is generated (block 448). For example, a computer may generate the second 2D barcode based on inputs of the set of static data 134 and set of dynamic data 136 in the second state 212. In an example embodiment, the second 2D barcode may include an encoded version of the set of static data and an encoded version of the set of dynamic data 196 in the second state 212. Additionally, the set of static data 134 and the set of dynamic data 136 in the second state 212 may include a third plurality of information modules 224 and a fourth plurality of information modules 226. For example, the third plurality of information modules 224 may be black modules and the fourth plurality of information modules 226 may be white information modules. It should be appreciated that the first plurality of information modules 218 and the third plurality of information modules 224 may be white while the second plurality of information modules 220 and the fourth plurality of information modules 226 may be black. Furthermore, it should be appreciated that the first plurality of information modules 218 and the third plurality of information modules 224 and/or the second plurality of information modules 220 and the fourth plurality of information modules 226 may be various colors, levels of transparency or opacity, and/or levels of reflectivity or absorptivity, or may have any other suitable characteristic allowing the barcode to be readable by a reader. Then, the first 2D barcode is compared to the second 2D barcode (block 450). For example, the first 2D barcode and the second 2D barcode may include binary data having values of zero (0) or one (1), which may correspond to each information module being colored white for a binary value of zero (0) and black for a binary value of one (1). Then, the information modules are categorized into a first group 230, a second group 232, and a third group (block 452). In an example embodiment, the first group 230 may include common information modules between the first plurality of information modules 218 of the first 2D barcode and the third plurality of information modules 224 of the second 2D barcode. Additionally, the second group 232 may include unique information modules of the third plurality of information modules 224 of the second 2D barcode. In an example embodiment, the third group may include unique information modules of the first plurality of information modules 218 of the first 2D barcode. For example, a computer may categorize all the black information modules that are common to the first 2D barcode and the second 2D barcode into the first group 230. Additionally, the computer may categorize all the black information modules that are unique to the first 2D barcode into a third group (i.e. the information modules that are black in the first 2D barcode, but white in the second 2D barcode). Also, the computer may categorize all the black information modules that are unique to the second 2D barcode into a second group 232 (i.e., the information modules that were white in the first 2D barcode, but are black in the second 2D barcode). Then, the 2D barcode is printed using a static ink 194, a first dynamic ink, and a second dynamic ink (block 454). In an example embodiment, the first group 230 may be printed in the static ink 194. Additionally, the second group 232 may be printed in the first dynamic ink. The first dynamic ink may be adapted to activate in response to the occurrence of a specific environmental factor. Furthermore, the third group may be printed in a second dynamic ink, and the second dynamic ink may be adapted to activate in response to the occurrence of the specific environmental factor. For example, the first dynamic ink may be printed in white and active to black upon reaching 30° C. and the second dynamic ink may be printed in black and activate to white upon reaching 30° C. It should be appreciated that the first and second dynamic ink may be printed in several color combinations. In an example embodiment, the first dynamic ink and the second dynamic ink may be sensitive to an environmental factor such as temperature, time, time and temperature, freezing, radiation, toxic chemicals, or a combination of such factors, or the like. Additionally, in an example embodiment, the first dynamic ink and the second dynamic ink may activate simultaneously. For example, the first dynamic ink and the second dynamic ink may both activate 72 hours after printing such that the first dynamic ink changes from white to black and the second dynamic ink simultaneously changes from black to white. Additionally, the first dynamic ink and the second dynamic ink may both simultaneously activate after a temperature threshold is met (e.g., precision within 0.1° C. temperature range). Having the first dynamic ink and second dynamic ink active simultaneously advantageously allows the 2D barcode to be readable at all times because the 2D barcode will either be in a first state (i.e., the first 2D barcode) or a second state (i.e., the second 2D barcode).

Figure 10A:
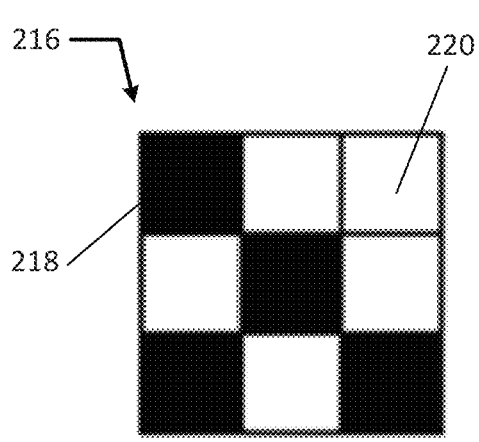
FIG. 10A is a block diagram of an example set of information modules printed using an example process for providing a 2D barcode, according to an example embodiment of the present disclosure.
Figure 10B:
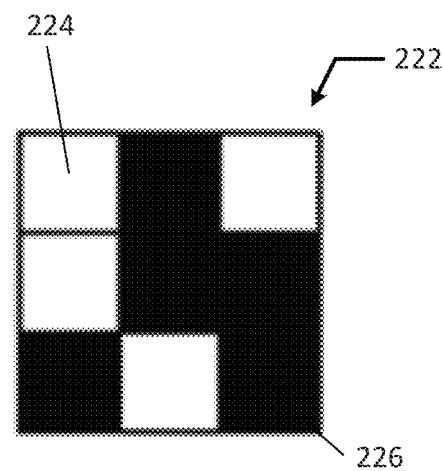
FIG. 10B is a block diagram of an example set of information modules printed using an example process for providing a 2D barcode, according to an example embodiment of the present disclosure.
Figure 10C:
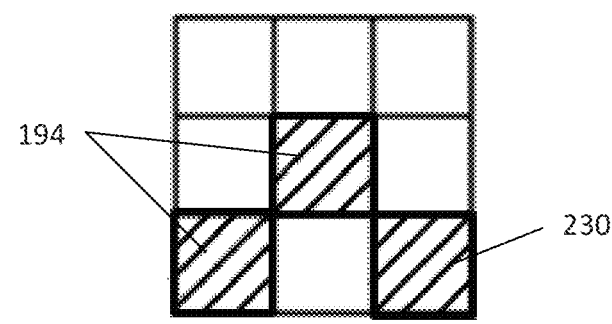
FIG. 10C is a block diagram of an example set of information modules printed using an example process for providing a 2D barcode, according to an example embodiment of the present disclosure.
Figure 10C:
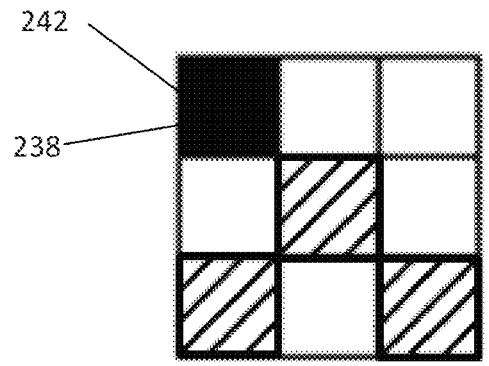
Figure 10C:
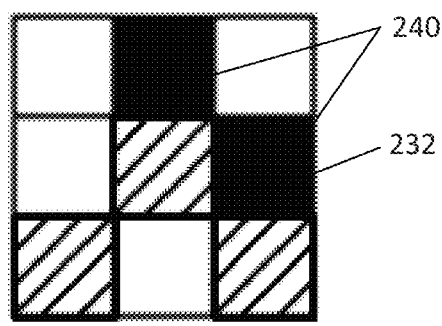

FIG. 10A, FIG. 10B, and FIG. 10C are block diagrams of an example set of information modules of a 2D barcode printed using process 440. Specifically, FIG. 10A shows the first plurality of information modules 218 and the second plurality of information modules 220 of the first 2D barcode portion 216 (i.e., the set of dynamic data 136 is in the first state 210). FIG. 10B shows the third plurality of information modules 224 and the fourth plurality of information modules 226 of the second 2D barcode portion 222 (i.e., the set of dynamic data 136 is in the second state 212). FIG. 10C shows the first group 230, the third group 238, and the second group 232 of information modules, from top to bottom respectively. For example, the first group 230 includes common information modules between the first plurality of information modules 218 of the first 2D barcode portion 216 and the third plurality of information modules 224 of the second 2D barcode portion 222, these information modules are depicted as cross-hatched modules. The second group 232 includes unique information modules of the third plurality of information modules 224 of the second 2D barcode portion 222, this group of information modules is depicted as a black module in the bottom picture in FIG. 10C. Additionally, the third group 238 includes unique information modules of the first plurality of information modules 218 of the first 2D barcode portion 216, and this group of information modules is depicted by black modules in the middle picture of FIG. 10C. In this example, the first group 230 may be printed in a static ink 194, the second group 232 may be printed in a first dynamic ink 240, and the third group 238 may be printed in a second dynamic ink 242. For example, the second group 232 may be printed with a first dynamic ink 240 adapted to activate (i.e., transition from white to black) in response to the occurrence of a specific environmental factor. Additionally, the third group 238 may be printed with a second dynamic ink 242 adapted to activate (i.e., transition from black to white) in response to the occurrence of the specific environmental factor. It should be appreciated that generating a 2D barcode with more than one dynamic ink advantageously allows the 2D barcode to be printed with larger portions of changing dynamic data that may include error detection and correction data 116. For example, by using multiple dynamic inks, the 2D barcode is capable of changing several different regions of the 2D barcode enabling a non-privileged reader to read both the set of static data 134 and the set of dynamic data 136 in a plurality of states to give a plurality of outputs without the error detection and correction data 116 overwriting a designated output.

In an example, modules of the barcode may continuously (as contrasted with step-wise) change color state in response to environmental conditions. For example, a sensor-augmented two-dimensional barcode includes a substrate with two overlayers, a first layer and a second layer (e.g., sensor layer and barcode layer). The sensor layer and the barcode layers may be printed in either order on top of the other on the substrate, so that either the sensor layer or the barcode layer may be the first layer printed on the substrate, the other being the second (top) layer. In the barcode layer, a two-dimensional error-correcting barcode symbol may be provided provided in a permanent light (nominally "white") or dark (nominally "black") color state. The barcode further includes a plurality of white and black modules, the modules optionally being square, rectangular, or circular. The sensor layer comprises a sensor dye may have a chemistry that is predictably responsive to a specified environmental condition, undergoing continuous chemical or physical state change between an initial state and an end state, causing a continuous color change in the color state of the sensor dye. The sensor layer may optionally include one or more color calibration patches of known reflectivity to be used in autocalibration of the barcode scanner at the reading color of interest. The calibration patches may be preprinted as part of the sensor layer and may appear either adjacent to or at specific module positions within the sensor-augmented two-dimensional barcode.

Figure 32A:
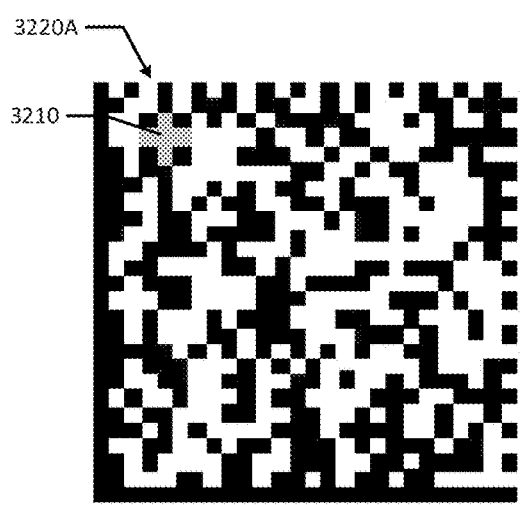
FIG. 32A is a block diagram of a 26×26 Data Matrix with a sensor dye patch in the Invariant space in a first intermediate state between the initial state and end state, according to an example embodiment of the present disclosure.
Figure 32B:
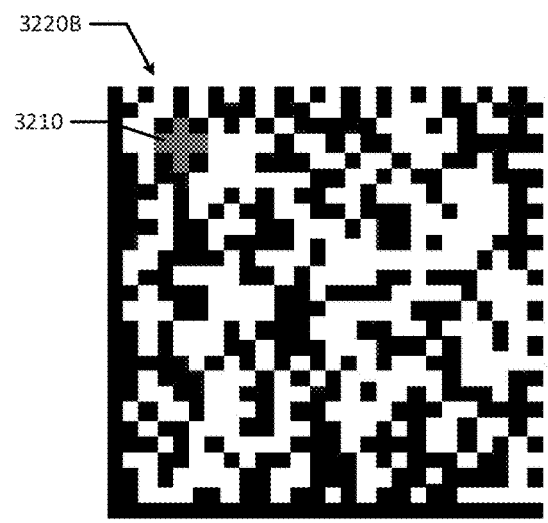
FIG. 32B is a block diagram of a 26×26 Data Matrix with a sensor dye patch in the Invariant space in a second intermediate state, according to an example embodiment of the present disclosure.

As described above, both the sensory dye patch and the barcode may be provided on the substrate. Depending on the order of printing, all or part of a layer may be provided on a substrate without being in contact with the substrate. For example, if a sensor dye patch is overprinted onto a barcode, portions of the sensor dye patch may not be in direct contact with the substrate. A sensor dye patch may be printed on a substrate and a GS1 Data Matrix barcode may be overprinted on the sensor dye patch. Additionally, a GS1 Data Matrix barcode may be printed on the substrate and the sensor dye patch may be printed over the barcode. As illustrated in FIG. 32A and FIG. 32B, the barcode may be aligned with the sensor dye patch 3210 before printing to ensure that the sensor dye patch is properly positioned within the barcode (e.g., positioned within the invariant area). For example, the sensor dye patch may be positioned within the Invariant Area of the 2D barcode such that the upper left corner (ULC) of the Data Matrix may be aligned with the ULC of the patch. It should be appreciated that the sensor dye patch 3210 can be positioned in other regions within the 2D barcode. Additionally, the sensor dye patch 3210 may be positioned near the 2D barcode such that it is still associated with the barcode during scanning. The overprinted 2D barcode may include one or more Application Identifiers such as AI (01) for a GTIN-14 of the product, an AI (10) for lot number, an AI (17) for product expiration of the lot, AI (21) for a serial number of the time-temperature label, and an AI that indicates the barcode includes a temperature exposure indicator. Additionally, an AI (90) or another part of the Data Matrix barcode data may identify or form the size and/or location of the temperature exposure indicator, such as the "+" shaped sensor dye patch 3210 within the barcode. An additional AI or other method of data encodation may be used in the 2D barcode having parameters which describe the Arrhenius kinetics of the chemical reaction equation of the color response to the sensor's specific environmental factor. After the Data Matrix barcode is overprinted on the sensor dye patch 3210, the product is distributed through its normal supply chain to an end user.

The time-temperature indicator (TTI) may be scanned at any point in the supply chain (e.g., using a smartphone carrying a TTI reader App, or other special barcode reader) to ensure that the TTI labeled product has not yet expired. Once the 2D barcode is scanned, and the reflectivity percentage of the sensor dye modules determined, the barcode reader device may determine the remaining labeled product life, expended product life, or an expected expiration date. For example, given the remaining product life and the current temperature, the barcode reader may estimate the expiration date of the product if continuously stored at the reference temperature, and additionally if stored at another lower temperature.

An example method of reading of a sensor-augmented two-dimensional barcode symbol includes scanning and optically processing an image of the sensor-augmented two-dimensional barcode symbol using a barcode imager or color camera using a pixel color identification system such as preferably sRGB, including construction of a scanned pixel map containing the preferably sRGB color value of the pixels in the scanned modules of the sensor-augmented two-dimensional barcode symbol. The sRGB value of the pixels in the scanned modules contain color contributions from both the barcode layer and the underlying or overprinted sensor layer.

Optionally, the scanning process may include reading of one or more preprinted color calibration patches containing adjacent to or within the sensor-augmented two-dimensional barcode symbol as part of the scanned pixel map. Optionally, these calibration patches may be preprinted as part of the sensor layer and may appear either adjacent to or at specific module positions within the sensor-augmented two-dimensional barcode.

The pixels of the modules in the scanned pixel map are then processed using thresholding algorithm and/or voting algorithms to assigned a binary color value to each pixel, to form an equal-sized binarised pixel map. The 2D barcode symbol may be identified from other graphical objects in the binarised pixel map and then identified 2D barcode may be decoded to construct a symbol codeword sequence from the binarised pixel map. In an example, the color value assignment may utilize the IEC 61966-2-1:1999 standard RGB color space (sRGB).

Then, underlying data codewords may be recovered from the symbol codeword sequence, preferably by utilizing error correction process on the symbol codeword sequence. In an example, the error correction process is Reed-Solomon Error Correction.

Processing the data codewords then determines the location, size, and product life equation parameters of the sensor dye region, and additionally whether calibration patches are present, and if so their relative location and their reference reflectance value. The data codewords are processed for identification of the pixels of the barcode modules in the sensor dye region, and the average sRGB color is determined. Additionally, processing the sRGB color information may optionally include all or some of the steps of: capturing the incident light reflectance of pixels included in the sensor dye region, including both environmentally-sensitive pixels and color calibration patches; creating a colored digital light filter effect on reflectance data from the pixels to generate filtered colored image sRGB values; reducing the filtered colored image values to greyscale values and creating a greyscale pixel map; correcting the relationship between greyscale and reflection percentage based on the color calibration patch values; and determining a reflectance percentage of the incident light at the scanning sample time. As used herein, a pixel map may be a map of binary bits (e.g., a bitmap), ternary bits, etc. For example a pixel map may include greyscale values or RGB color values.

In order to obtain the product life data an image sensor such as a smartphone carrying a TTI App reader, may be used to scan the 2D barcode with the embedded sensor dye patch 3210. For example, the image may be captured from an image sensor, such as the smartphone camera, using a flash such as a smartphone white flash. The nominally white flash intensity may overwhelm the ambient light and set the color temperature for image capture by the sRGB sensor of the camera. The image sensor may capture the white incident light reflectance of the pixels, including those modules (typically but not necessarily in the Invariant Area) containing the sensor dye. In lieu of the incident light being a specified color a physical color filter may be positioned over the camera lens when the sRGB image is captured. Alternatively, a digital filter may be applied over the sRGB image pixel map to creates a colored light filter effect on the reflectance data. As an example the digital filter may programmed to process the sRGB image based on an appropriate center wavelength and range, as in a bandpass filter. Then, the filtered color image RGB values may be reduced to a greyscale value (e.g., range 0 to 255) and a greyscale pixel map for the Data Matrix barcode may be created. In an example, the 2D barcode may include encoded data to provide the appropriate inputs and may be used to program a barcode reader for reading color saturation and/or density of the sensor dye patch 3210. For example, through encoded data and/or Application Identifiers (AIs), the barcode can automatically program the barcode reader to properly sense color reflectivity of the sensor dye patch 3210. The encoded data in the Application Identifiers may also include the appropriate lifetime equation parameters such that the reader can estimate the used and/or remaining product life at a specified temperature for the scanned product.

The greyscale pixel map of the Data Matrix barcode may then be processed, e.g., using a standard Data Matrix procedure, such as ISO 16022 Data Matrix with modifications such as replacing the ISO 15415 Global Threshold algorithm with the Ultracode Color barcode Symbology dual-threshold ternary algorithm to the separate pixels into black pixels, white pixels, and color pixels (i.e., pixels neither black nor white). Once the color pixels are separated from the black and white pixels, the remaining black pixels and white pixels may be processed according to the methods of ISO 16022. For example, this processing method identifies the square module positions and the module centers in the Data Matrix pixel map using only the black and white pixels. The ISO 16022 method then decodes the Data Matrix and recovers the GS1 AI data.

As discussed above, an Application Identifier may identify the size, shape and/or location of the sensor dye modules. Next, as an example, a group of pixels in each identified sensor dye module in the Invariant Area may be sampled; for example, a 3×3 or larger number of pixels at the center of each module may be sampled. As a widely-used example, each pixel value may serve as a vote and the module is categorized as black, white, or color based on a majority vote. In a 3×3 sample, 2 pixels may be voted as black, 6 pixels voted as color, and 1 pixel voted as white. Since 6 is a majority of the 9 total pixels, the module is categorized as color, and the average sRGB color for that module determined by averaging separately the R, G, B values of the 9 pixels voting. The average sensor area sRGB value is formed by averaging separately the R, G, B values of all the identified dye sensor modules. Any color modules found other than the identified sensor modules may be ignored, and Reed-Solomon Error Correction process will recover their underlying data bit value.

It should be appreciated that by using error correction, a sensor dye patch 3210 can advantageously be used within a 2D barcode, such as in the Invariant Area, without affecting the readability of the overlying (or optionally underlying) 2D barcode. Through the use of error correction, such as ISO 16022 Reed-Solomon Error Correction process, which corrects any erroneously identified modules, including the colored modules and unknown modules in the Invariant area, the underlying GS1 Data Matrix is recovered. Thus, data from the underlying GS1 Data Matrix is advantageously processed in the standard manner without being corrupted by the continuously changing color of the sensor dye patch 3210. Therefore, static product data can be read from the overprinted 2D barcode while dynamic product data, such as remaining product life, embedded within the barcode continuously changes due to environmental exposure.

Figure 33:
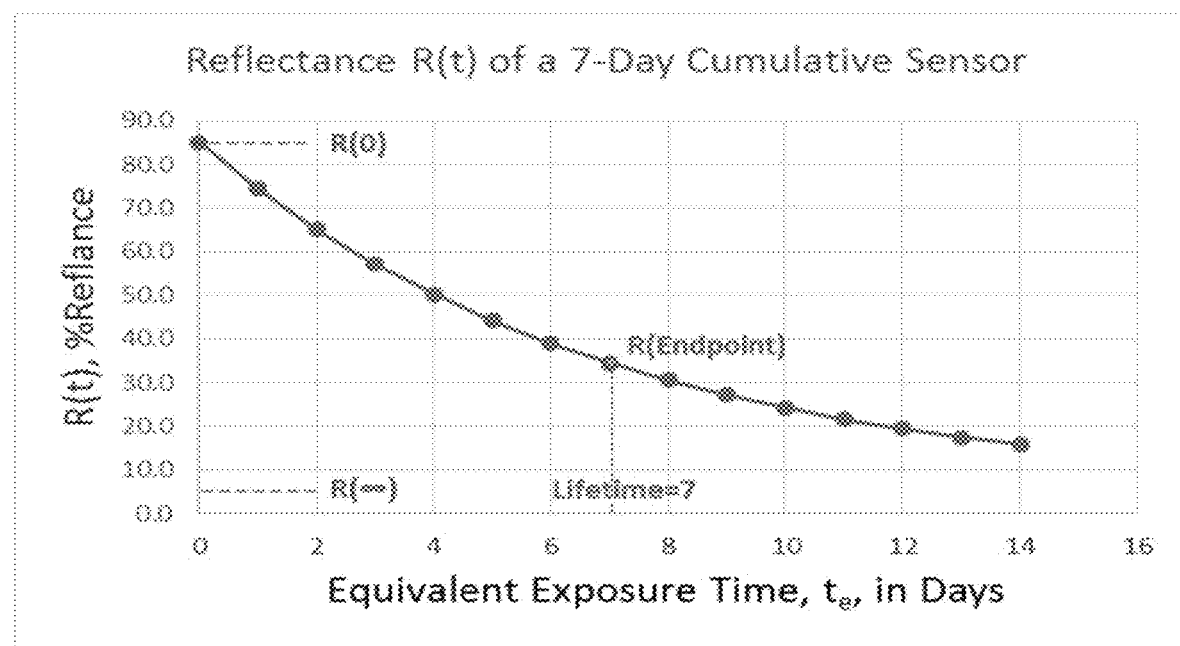
FIG. 33 is a graph of Reflectance R(t) vs. Equivalent Exposure time (t) of a sensor dye patch, according to an example embodiment of the present disclosure.

The remaining color modules (e.g., modules that have not been overprinted with black modules) are processed to determine the current reflectance percentage R(t) at the time of barcode capture (t). As illustrated in FIG. 33, the reflectance R(t) may be processed to determine equivalent exposure time ($t_e$) at the reference temperature, preferably by using the Arrhenius equation. After determining the equivalent exposure time ($t_e$), the total expended product life to date and the remaining life at the reference temperature can be estimated. Product life may depend on exposure to both time and temperature. For example, with constant exposure to 30° C., product life may be 2.5 weeks. However, with constant exposure to 38° C., product life may only be 1 week, and therefore the cumulative time temperature sensor (e.g., sensor dye patch 3210) advantageously indicates cumulative exposure to environmental conditions, which is beneficial when previous storage conditions in the supply chain are unknown. For example, time and temperature conditions of a transportation truck may be unknown, but a cumulative time temperature sensor may advantageously capture and represent this exposure through its change in chemical or physical state (e.g., color state) to allow calculation of the remaining life of the delivered product. Additionally, other calculations based on the equivalent exposure time ($t_e$) may be conducted the remaining life of the product if stored at a different temperature may also be estimated.

By encoding the 2D barcode with an AI containing parameters to automatically program the image processing and provide product equation parameters for pre-stored algorithms, the barcode reader can determine product characteristics that are specific to each 2D barcode labeled product utilizing the same barcode reader. For example, use a reader, the remaining product life for a food product may be determined using the image sensor processing and equation parameters indicated by reading the sensor enhanced 2D barcode on that food product; different parameters may be stored in an AI in the 2D barcode on a vaccine vial and which the same barcode reader may read and use to program the image processing and equation parameters to calculate the remaining life of vaccine in the vial.

After scanning the barcode and obtaining the appropriate life data, the barcode reader may display information about the marked product and the remaining life. For example, the barcode in FIG. 32A may represent a first intermediate state 3220A, which is at some point after an initial state (e.g., product has 100% remaining life), of a barcode on a medical product (e.g., inactivated Polio vaccine) that may be scanned to reveal product lifetime data, as illustrated in FIG. 34, such as a Monitor Category: VVM7, 80 percent life remaining, expiration date (e.g., calculated from the estimated remaining life or based on some other criteria), and product authenticity. Additionally, the barcode data may include AI (01) for a GTIN, AI(10) batch number, and AI (21) serial number that are displayed by the 2D barcode reader. The static barcode data may contain product information such that the barcode reader is automatically provided with the appropriate equation parameters and inputs to calculate the remaining product life according to the current color state of the sensor dye patch 3210. For example, after reflectance data is obtained from the image sensor, the appropriate equation parameters can be used to determine equivalent exposure time ($t_e$) at the reference temperature, as illustrated in FIG. 33. Subtracting ($t_e$) from the lifetime gives the remaining product life at the reference temperature.

The sensor dye patch 3210 may transition between an initial state and an end state. FIG. 32B may represent a barcode (and sensor dye patch 3210) in a second intermediate state 3220B, after an initial state (e.g., product has 100% remaining life) and the first intermediate state 3220A illustrated in FIG. 32A. For example, the sensory dye patch may change color from clear to a solid color in the end state. To ensure accuracy of product life calculations, the 2D barcode may be encoded such that a threshold value of opacity in the sensor dye patch 3210 is identified as the end of the product life. For example, the 2D barcode may be encoded such that the barcode reader determines that the sensor dye patch reaching 20 percent reflectance of the end state reflectance R(∞) is expired, which may allow a reader to determine how long a product has been expired for. For example, if the product expiration was set at the final reflectance percentage end state R(∞) of the sensor dye patch, then the rate of change of reflectance would be so slow it would be impractical to determine when the dye patch 3210 had reached the end state. However, if the expiration is set at an intermediate state, which is before the end state, the 2D barcode may be configured to also provide information about cummulative environmental exposure after expiration. In another example, the end state may be used as the threshold value. Similar to FIG. 32A, the barcode on the medical product (e.g., inactivated Polio vaccine) that may be scanned at some other level of exposure to reveal product lifetime data. As illustrated in FIG. 35, the product has exceeded its suitable life and the barcode reader may display "Test Failed". For example, due excessive exposure to time, temperature, or both time and temperature, the product may have no remaining life. Similar to FIG. 33, the static 2D barcode data carries the same GTIN, batch number, serial number, etc. and carries the parameters necessary to implement the R(t) equation shown in graphical form in FIG. 33.

Additionally, the barcode data may be utilized to check on product authenticity as an anti-counterfeiting measure. For example, all or part of the encoded AI (01) for a GTIN, AI(10) batch number, and AI (21) data may used as validation data form this product instance. This validation data is sent by the reader as a query to the manufacturer's database to see if that validation data is associated there, meaning that the product carrying that barcode has already been registered. If the validation data is not matched in manufacturer's database, or is marked there previously seen, already used or expired, then the authenticity of this product instance just scanned is questionable. A warning code may be placed in the manufacturer's database that multiple instances of the same barcode have been seen, to warn others who may receive another identical product instance that at least one of the products instances is counterfeit.

As discussed above, the remaining product life may be temperature dependent. Therefore, at a new storage temperature different from the reference temperature, a new predicted expiration date may be calculated by using barcode data and the scanner's currently measured equivalent exposure time ($t_e$) at the reference temperature.

Figure 11:
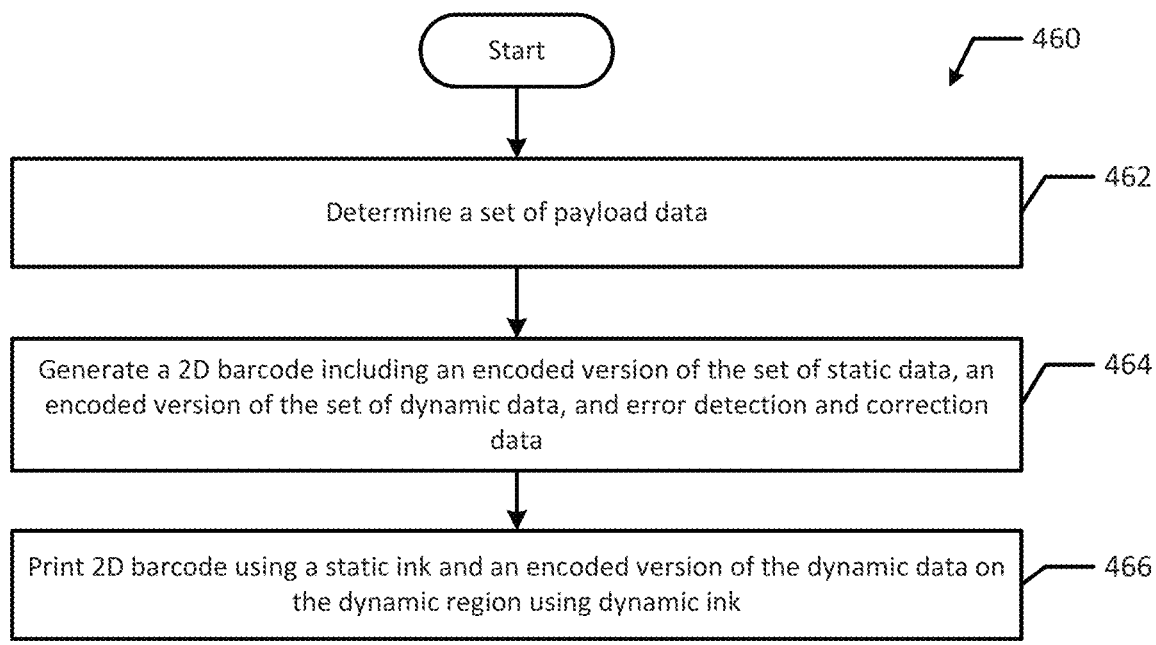
FIG. 11 includes a flowchart illustrating an example process for providing a 2D barcode, according to an example embodiment of the present disclosure.

FIG. 11 includes a flowchart of an example process 460 of generating a 2D barcode. Although the process 460 is described with reference to the flowchart illustrated in FIG. 11, it will be appreciated that many other methods of performing the acts associated with the process 460 may be used. For example, the order of many of the blocks may be changed, many blocks may be intermittently repeated or continually performed, certain blocks may be combined with other blocks, and many of the blocks described are optional or may only be contingently performed.

The example process 460 may begin with determining a set of payload data 112 (block 462). In an example embodiment, the set of payload data 112 may include a set of static data 134 and a set of dynamic data 136. Additionally, the set of dynamic data 136 may have a first state 210 and a second state 212. Next, a computer may generate a 2D barcode (block 464). In an example embodiment, the 2D barcode may include an encoded version of the set of static data, a dynamic region 192 which is adapted to store an encoded version of the set of dynamic data, and error detection and correction data 116. Then, a printer may print the 2D barcode using a static ink 194 and the encoded set of the dynamic data on the dynamic region 192 using a dynamic ink 198 (block 466). In an example embodiment, the 2D barcode may be attached to various products such as food product, pharmaceutical products, etc. In an example embodiment, the dynamic ink 198 may change states responsive to at least one environmental change, such that the set of dynamic data 136 is in either the first state 210 or the second state 212. Additionally, in an example embodiment, the error detection and correction data 116 may accommodate for changes in the set of dynamic data 136 in the dynamic region 192 such that the 2D barcode may be readable by a reader and may produce a first output when the set of dynamic data 136 is in the first state 210 and the 2D barcode may be readable by a reader and may produce a second output when the set of dynamic data 136 is in the second state 212. In an example embodiment, the dynamic region 192 may be provided in a padding region. Additionally, the dynamic region 192 may be provided at an end of a data region. Providing a 2D barcode that includes error detection and correction data 116 that accommodates for changes in the set of dynamic data 136 advantageously allows an individual to use a non-privileged reader and also advantageously allows an individual to obtain two different output readings using the non-privileged reader. For example, without generating a 2D barcode with error detection and correction data 116 that accommodates for changes in the set of dynamic data 136 in the dynamic region 192, a non-privileged reader may only produce the first output regardless of whether the 2D barcode included a set of dynamic data 136 in the first state 210 or a set of dynamic data 136 in the second state 212.

Figure 12:
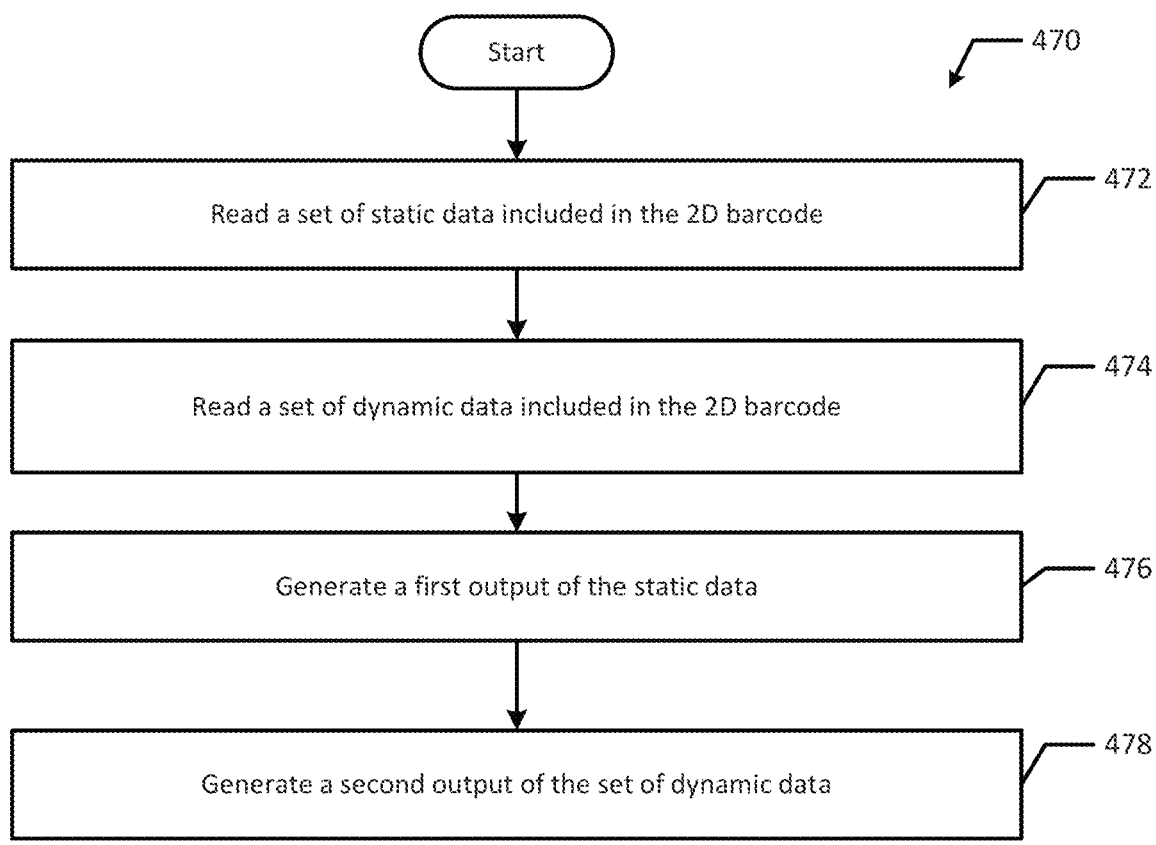
FIG. 12 includes a flowchart illustrating an example process for reading a 2D barcode, according to an example embodiment of the present disclosure.

FIG. 12 includes a flowchart of an example process 470 of reading a 2D barcode. Although the process 470 is described with reference to the flowchart illustrated in FIG. 12, it will be appreciated that many other methods of performing the acts associated with the process 470 may be used. For example, the order of many of the blocks may be changed, many blocks may be intermittently repeated or continually performed, certain blocks may be combined with other blocks, and many of the blocks described are optional or may only be contingently performed.

The example process 470 may begin with a reader reading a set of static data 134 included in the 2D barcode (block 472). In an example embodiment, the 2D barcode may be printed in static ink 194 and dynamic ink 198. Additionally, an encoded version of the set of static data may be printed in the static ink 194. Next, a reader may read a set of dynamic data 136 included in the 2D barcode (block 474). In an example embodiment, an encoded version of the set of dynamic data 196 may be printed in the dynamic ink 198. Additionally, the set of dynamic data 136 may be printed in a redundant space on the 2D barcode. Next, the reader may generate a first output of the set of static data 134 (block 476). Then, the reader may generate a second output of the set of dynamic data 136 (block 478). In an example embodiment, the second output may depend on which state of the one of a plurality of states the dynamic data is in, such as greater than 30° C. or less than 30° C.

Figure 13:
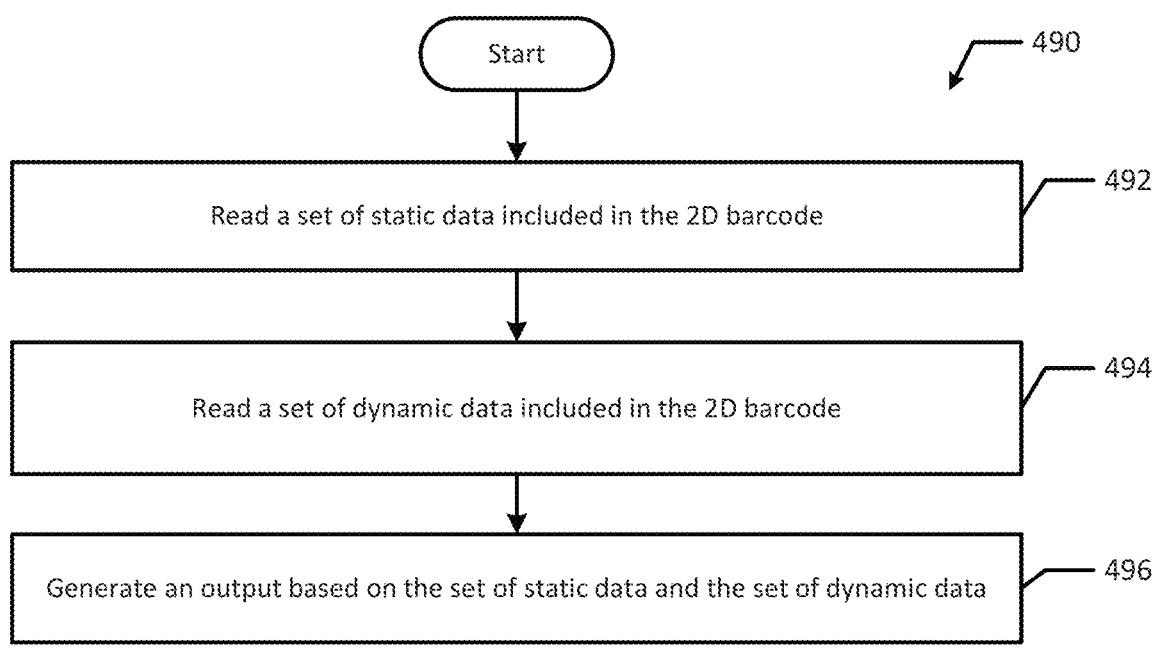
FIG. 13 includes a flowchart illustrating an example process for reading a 2D barcode, according to an example embodiment of the present disclosure.

FIG. 13 includes a flowchart of an example process 490 of reading a 2D barcode. Although the process 490 is described with reference to the flowchart illustrated in FIG. 13, it will be appreciated that many other methods of performing the acts associated with the process 490 may be used. For example, the order of many of the blocks may be changed, many blocks may be intermittently repeated or continually performed, certain blocks may be combined with other blocks, and many of the blocks described are optional or may only be contingently performed.

The example process 490 may begin with a reader reading a set of static data 134 included in the 2D barcode (block 492). In an example embodiment, the 2D barcode may be printed in static ink 194 and dynamic ink 198. Additionally, an encoded version of the set of static data may be printed in the static ink 194. Next, a reader may read a set of dynamic data 136 included in the 2D barcode (block 494). In an example embodiment, an encoded version of the set of dynamic data 196 may be printed in the dynamic ink 198. Additionally, the set of dynamic data 136 may be printed in a dynamic region 192 of the 2D barcode. Next, the reader may generate an output of the set of static data 134 and the set of dynamic data 136 (block 496). In an example embodiment, the output may be a first output when the set of dynamic data 136 is in a first state 210, and the output may be a second output when the set of dynamic data 136 is in a second state 212.

Figure 14:
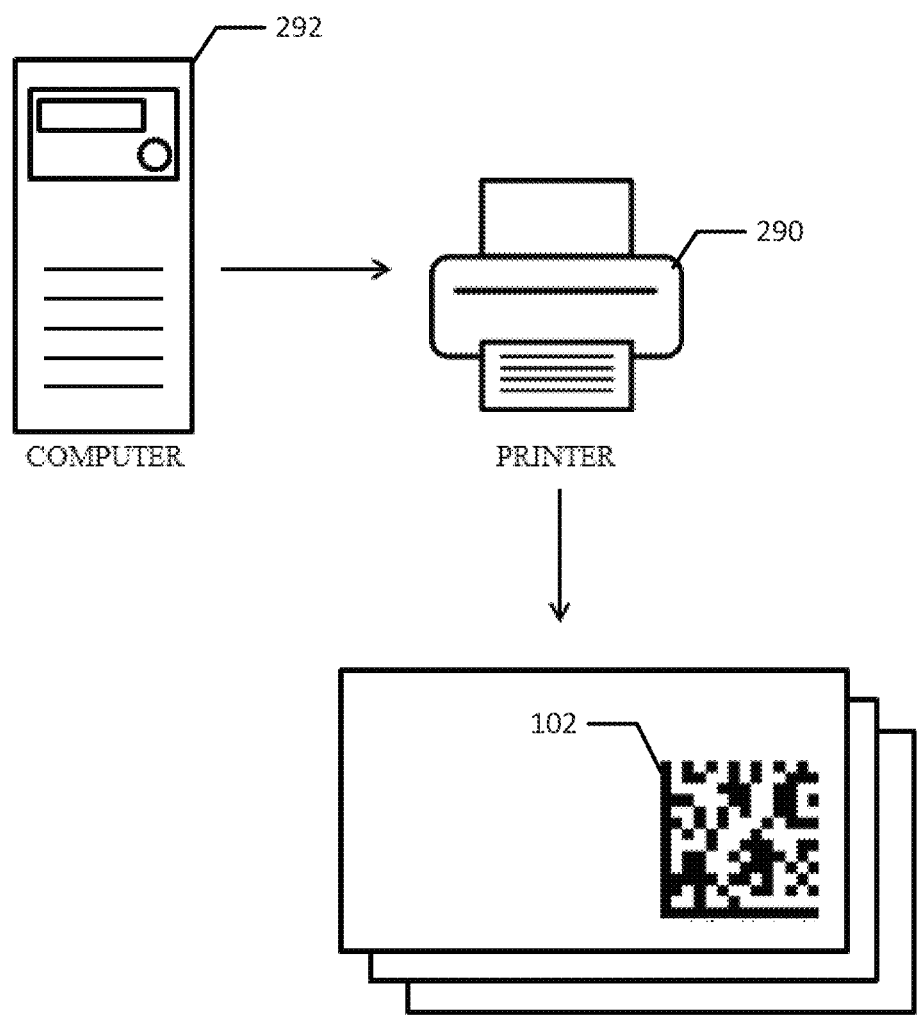
FIG. 14 is a block diagram of a 2D barcode providing system, according to an example embodiment of the present disclosure.

FIG. 14 is a block diagram of a 2D barcode providing system. The system may include a computer 292 and a printer 290. The system may be used to provide barcodes 102. The computer 292 may include one or more computer programs or components. It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. Additionally, the computer 292 may include a display and may have a connection to one or more communications channels such as the Internet or some other voice and/or data network, including, but not limited to, any suitable wide area network or local area network.

The computer 292 may include one or more processors electrically coupled by an address/data bus to one or more memory devices, other computer circuitry, and one or more interface circuits. The processor may be any suitable processor, such as a microprocessor. The memory preferably includes volatile memory and non-volatile memory. Additionally, the memory may store a software program that interacts with the other devices in the barcode providing system. This program may be executed by the processor in any suitable manner. The memory may also store digital data indicative of documents, files, programs, barcodes, etc. received from a computer or a barcode reader. Other computer circuitry may include a wide variety of hardware components including ASICs, or other specialized circuitry for manipulating data in a specific format, such as barcode data.

One or more displays, printers 290, and/or other output devices may also be connected to the computer 292 via interface circuits. The display may be a liquid crystal display or any other type of display. The printer 290 may print a barcode that is generated and received from the computer 292. Additionally, one or more storage devices may also be connected to the computer 292 via the interface circuits. For example, a hard drive, CD drive, DVD drive, and/or other storage devices may be connected to the computer 292. The storage devices may store any type of data, such as barcode data 100, image data, historical access or usage data, etc.

Figure 15A:
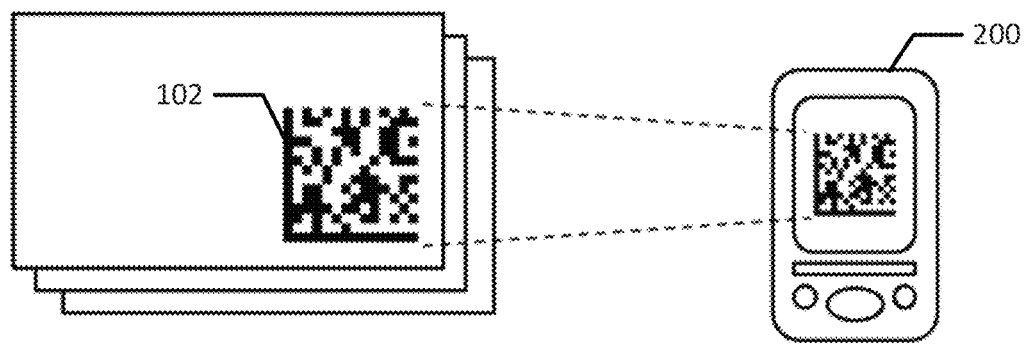
FIG. 15A is a block diagram of a 2D barcode reading system, according to an example embodiment of the present disclosure.
Figure 15B:
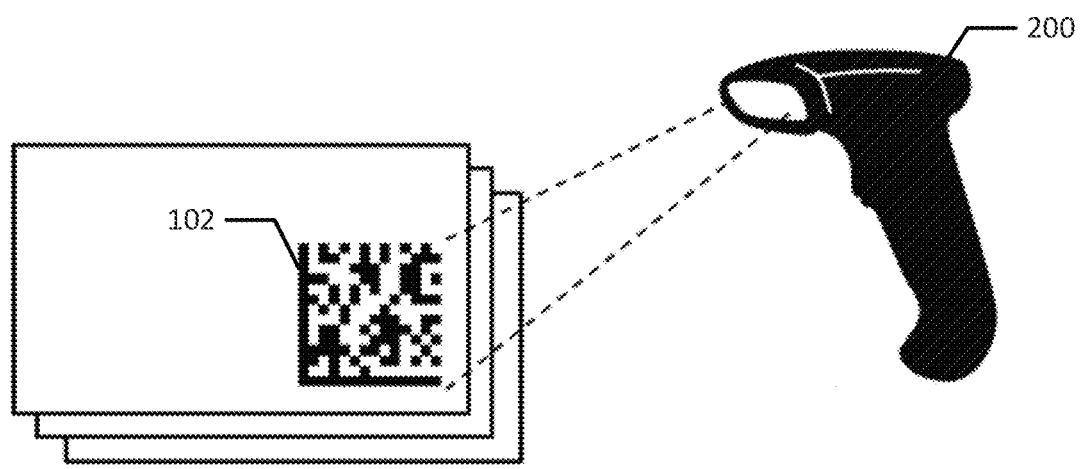
FIG. 15B is a block diagram of a 2D barcode reading system, according to an example embodiment of the present disclosure.

FIG. 15A and FIG. 15B is a block diagram of a 2D barcode reading system. The system may include a reader 200, the system may be used to read barcodes 102. In an example embodiment, the reader 200 may be a privileged reader or a non-privileged reader. The reader 200 may be a dedicated barcode reader or an apparatus configured to read barcodes such as a mobile device, a personal digital assistant or PDA, a smartphone, a laptop, a tablet computer, or a desktop computer, as well as any other user devices. The reader 200 may be adapted to read 1D and 2D barcodes, or may be adapted to read only 2D barcodes. The reader 200 may also transmit, receive, or exchange data with other network devices via a communication network. A network device may be a computer 292, a different reader 200, or any other device accessible via a communication network. Also, certain data may be stored in a reader 200 which is also stored on the server, either temporarily or permanently, for example in memory or a storage device. The network connection may be any type of network connection, such as a cellular or wireless connection, an Ethernet connection, digital subscriber line, telephone line, coaxial cable, etc. Access to a reader 200 or dynamic data 136 may be controlled by appropriate security software or security measures. An individual users' access may be defined by reader 200 and limited to certain data and/or actions. For example, a user may only have access to a non-privileged reader which may only be capable of reading the static data 134 on a barcode 102. Additionally, a user may have access to a privileged reader which may be capable of reading just the dynamic data or both the dynamic and static data on a barcode 102. Accordingly, users and/or administrators of the barcode reading system may be required to register with one or more readers 200. Additionally, various options for managing data located within a reader 200 and/or in a server may be implemented. For example, a management system may be implemented in the reader 200 and may update, store, and/or back up barcode data 100 locally and/or remotely using any suitable method of data transmission.

The method of reading of a sensor-augmented two-dimensional barcode symbol has a number of requirements. Reading a sensor-augmented Data Matrix symbol is possible 1. If only a limited number of modules change color state in the sensor dye module pattern, and
2. If the changed modules are restricted to a small number of utahs, and
3. If there is sufficient Reed Solomon Error Correction capability in the underlying Data Matrix, then the RSEC process may be utilized to recover the underlying codeword data in the underlying Data Matrix prior to the color state changes of modules caused by sensor activation.

Table 5 shows the data and RSEC codeword capacities of all square Data Matrix symbols up to 26×26 and all rectangular Data Matrix symbols.

Each data codeword normally requires two RSEC codewords to recover the underlying data. As an example, a 16×16 square Data Matrix which has a capacity for 12 data codewords (12 data utahs) and has 12 RSEC codewords (12 RSEC utahs). Thus if activated sensor modules change 4 data utahs in that 16×16 symbol, then eight RSEC codewords are utilized to recover the data in those for altered utahs. This leaves 4 additional RSEC codewords available for correction of any other symbol damage.

TABLE 5

Total Data and RSEC Codewords for Different Sizes of Data Matrix Symbols

| Symbol Size | | | Maximum Data Capacity | | | Total Codewords | | Error Correction | |
|---|---|---|---|---|---|---|---|---|---|
| Size | Rows | Cols | Digits | Alphanum | Bytes | Data | RSEC | Max Cwds | % EC |
| SQUARE SYMBOLS | | | | | | | | | |
| 10 × 10 | 10 | 10 | 6 | 3 | 1 | 3 | 5 | 2 | 63% |
| 12 × 12 | 12 | 12 | 10 | 6 | 3 | 5 | 7 | 3 | 58% |
| 14 × 14 | 14 | 14 | 16 | 10 | 6 | 8 | 10 | 5 | 56% |
| 16 × 16 | 16 | 16 | 24 | 16 | 10 | 12 | 12 | 6 | 50% |
| 18 × 18 | 18 | 18 | 36 | 25 | 16 | 18 | 14 | 7 | 44% |

TABLE 5-continued

Total Data and RSEC Codewords for Different Sizes of Data Matrix Symbols

| Symbol Size | | | Maximum Data Capacity | | | Total Codewords | | Error Correction | |
|---|---|---|---|---|---|---|---|---|---|
| Size | Rows | Cols | Digits | Alphanum | Bytes | Data | RSEC | Max Cwds | % EC |
| 20 × 20 | 20 | 20 | 44 | 31 | 20 | 22 | 18 | 9 | 45% |
| 22 × 22 | 22 | 22 | 60 | 43 | 28 | 30 | 20 | 10 | 40% |
| 24 × 24 | 24 | 24 | 72 | 52 | 34 | 36 | 24 | 12 | 40% |
| 26 × 26 | 26 | 26 | 88 | 64 | 42 | 44 | 28 | 14 | 39% |
| RECTANGULAR SYMBOLS | | | | | | | | | |
| 8 × 18 | 8 | 18 | 10 | 6 | 3 | 5 | 7 | 3 | 58% |
| 8 × 32 | 8 | 32 | 20 | 13 | 8 | 10 | 11 | 5 | 52% |
| 12 × 26 | 12 | 26 | 32 | 22 | 14 | 16 | 14 | 7 | 47% |
| 12 × 36 | 12 | 36 | 44 | 31 | 18 | 22 | 18 | 9 | 45% |
| 16 × 36 | 16 | 36 | 64 | 46 | 24 | 32 | 24 | 12 | 43% |
| 16 × 48 | 16 | 48 | 98 | 72 | 28 | 49 | 28 | 14 | 36% |

Two types of reading processes for the sensor-augmented two-dimensional barcode are utilized, depending on whether or not the structure of sensor dye module pattern has been encoded in the underlying Data Matrix. In the first case, where the the structure of sensor dye module pattern has not been encoded in the underlying Data Matrix of the sensor-augmented two-dimensional barcode:
1. Scan and optically process the image as part of the Data Matrix reading process and construct a scan binary pixel map (e.g., bitmap) of the scanned image. See ISO/IEC 16022 for one methodology.
2. Process the scan binary pixel map (e.g., bitmap) to construct the underlying symbol codeword sequence,
3. Utilize the Reed-Solomon error correction process on the symbol codeword sequence to recover the underlying data codewords prior to any alteration by activated sensor modules. See ISO/IEC 16022 for one methodology.
4. Construct an underlying binary pixel map (e.g., bitmap) from the underlying data codeword sequence equal in size to the scan binary pixel map (e.g., bitmap). See ISO/IEC 16022 for one methodology.
5. At each bit position, Exclusive OR the scan binary pixel map (e.g., bitmap) and the underlying binary pixel map (e.g., bitmap) to form a sensor digital information pixel map of the same size as the scan binary pixel map.
6. Process the sensor digital information pixel map according to the situational rules.

In the case where the the structure of sensor dye module pattern has been encoded in the underlying Data Matrix of the sensor-augmented two-dimensional barcode:
1. Scan and optically process the image as part of the Data Matrix reading process and construct a scan binary pixel map of the scanned image. See ISO/IEC 16022 for one methodology.
2. Process the scan binary pixel map to construct the underlying symbol codeword sequence,
3. Utilize the Reed-Solomon error correction process on the symbol codeword sequence to recover the underlying data codewords prior to any alteration by activated sensor modules. See ISO/IEC 16022 for one methodology.
4. Utilize the information encoded in the underlying data codewords to determine within the scan binary pixel map a sensor dye bit pattern containing the sensor digital information and extract the binary information sequence in its appropriate bit order.
5. When the sensor data has been BCH(15,5,7) encoded, use standard methods the BCH error-correcting process to recover the 5-bit binary-encoded sensor data (or else decode decoding fails).

Additionally, where a continuously changing sensor dye is used, for example, to indicate cumulative exposure to an environmental condition, then a barcode reader may:
1. Process color information from a sensor dye region, preferably by processing the binary pixel map to retrieve the barcode data determining the location, size, and product life equation parameters of the sensor dye region. Additionally, the binary pixel map may be used to program the image sensor for a particular sensor dye and product type.
2. Utilize the product life equation parameters to determine remaining product life from the processed color information.

An embodiment utilizes a sensor dye that is configured to undergo a continuous chemical or physical state change between an initial state and an end state causing a change in the color state of the sensor dye. The current color state may indicate exposure (e.g., cumulative exposure) to the environmental condition. For example, a sensor dye patch, such as a cumulative time-temperature sensor may be embedded within or associated within a 2D barcode. The cumulative time-temperature sensor may continuously change color as the product is exposed to temperature over time.

An embodiment utilizes a temperature threshold-sensitive sensor dye chemistry. The sensor dye chemistry is W→X; white dye elements overprinted on black modules of the printed underlying Data Matrix on a white printing media. It is assumed the sensor dye chemistry used is known at the time of printing the Data Matrix symbol.

It is assumed that the data structure encoded in the Data Matrix symbol utilizes GS1 Application Identifiers (AIs) and conforms to the GS1 General Specifications, V15 Issue 2 (January 2015) (http://www.gs1.org/docs/barcodes/GS1_General_Specications.pdf) and later.

Here 15-bit BCH(15,5,7) error correction used to encode 5 bits of sensor data. Since the overprinted sensor dye modules are white, the black modules corresponding to '1' bits of the 15-bit BCH encoding needs to be printed in underlying Data Matrix.

The sensor data BCH encoding along with 2 indicator bits to indicate the sensor dye chemistry in use utilizes only utahs 3, 5 and 6 of the 16×16 ECC 200 Data Matrix symbol shown in FIG. 19 for exemplary purposes. Utahs 5, 6 and utah bits 3.6-3.8 are in the same bitmap position relative to the symbol ULC as in the invariant bitmap 410 in FIG. 19.

The indicator utah bits 3.6 and 3.7 indicate which of the sensor dye chemistries in Table 1 is in use. It is assumed that the sensor dye chemistry to be used is known at the time of printing of the Data Matrix.

Modules of the selected sensor chemistry overprint both utah bits 3.6 and 3.7. Depending upon the sensor dye chemistry selected, bits 3.6 and 3.7 will appear as in Table 4 when the sensor dye is in either the unactivated or activated state.

Figure 20:
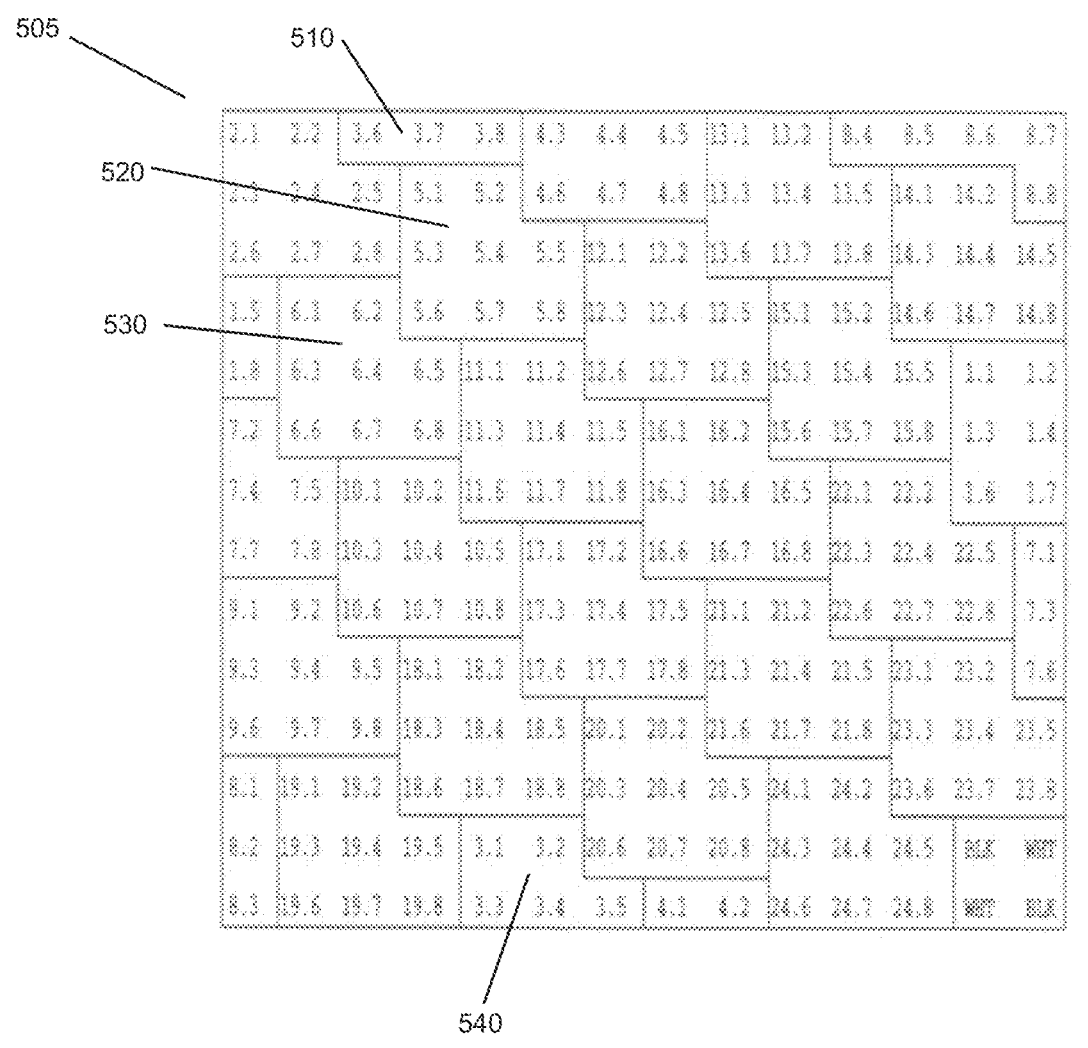

FIG. 20 shows the size 14 Data Matrix bitmap 505 from ISO/IEC 16022 and identifies utah bit 3.8 and utahs 5 and 6 of the invariant bitmap 410. These are references 510, 520 and 530 respectively. The upper 5 bits of utah 3, bits 3.1-3.5 referenced as 540, which are not in the invariant bitmap 410, may be used to encode additional information about the sensor dye chemistry in use and/or the sensor dye bit pattern.

In keeping with the GS1 System as defined in the GS1 General Specifications, the most widely used system for encoding information in Data Matrix, the GS1 Application Identifier AI (90) may be used. AI (90) is reserved for information mutually agreed upon between trading partners, such as the presence of a sensor-enabled Data Matrix. Since the Application Identifiers may appear within any sequence in a GS1 Data Matrix, AI (90) will appear immediately after the FNC1 to ensure that the 15 BCH—encoded sensor bits B1-B15 are in the invariant bitmap 410. Since only 7-bit characters can be encoded in a GS1 application identifier, the most significant bit 5.1 of utah 5 at 520 and bit 6.1 of utah 6 at 530 and their color state both before and after activation are unimportant here.

Figure 21:
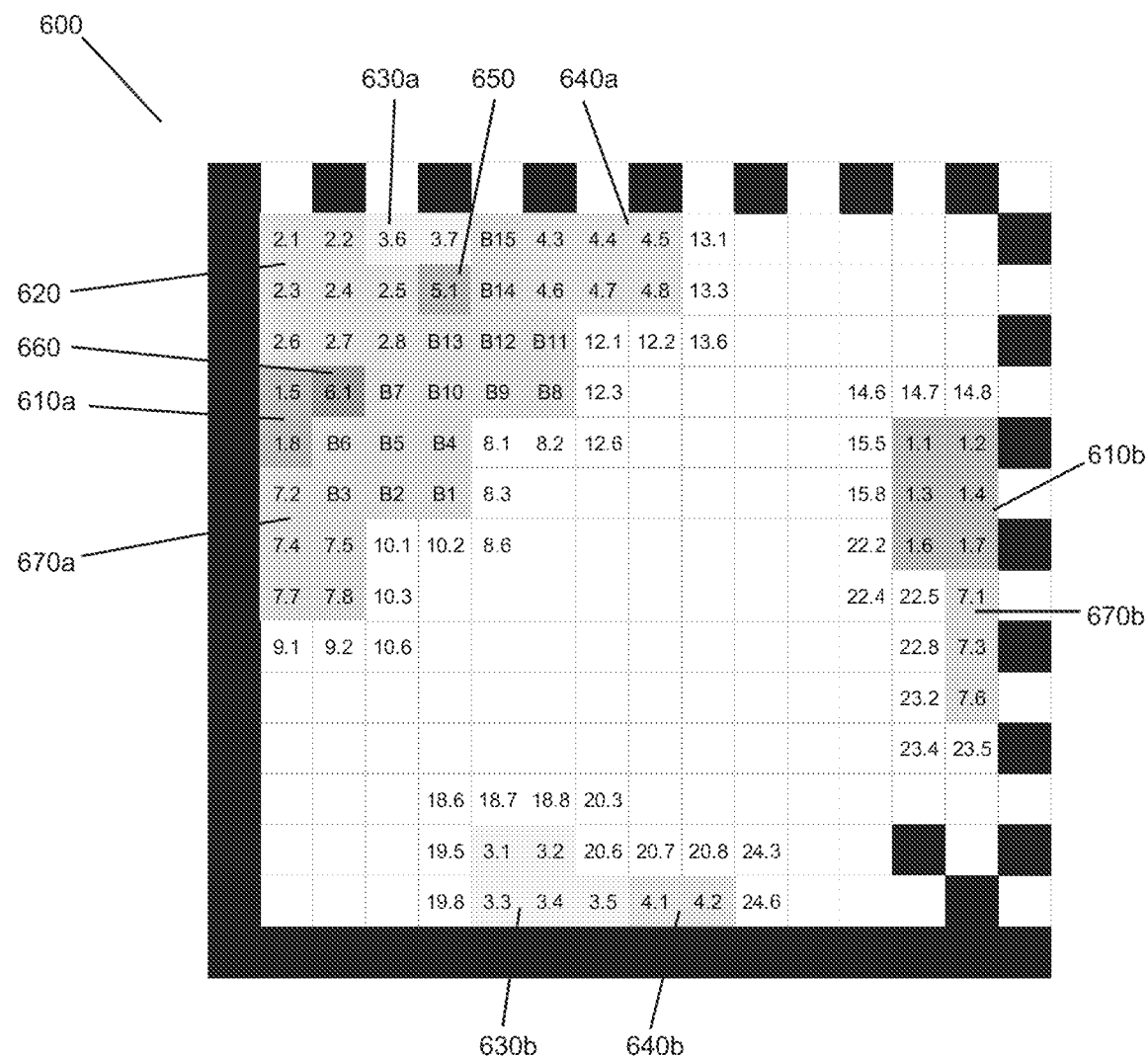
FIG. 21 is a representation of utahs used in the GS1 AI (90) string and placement of the 15 BCH(15,5,7) encoding bits, according to an example embodiment of the present disclosure.

As shown in FIG. 21, the invariant bitmap 410 portion of the 16×16 Data Matrix 600 includes 610*a*, utah 1 bits 1.5 and 1.8; 620 utah 2; 630*a* utah 3 bits 3.6-3.8; 640*a* utah 4 bits 4.3-4.8; 650 utah 5; 660 utah 6 and 670*a* utah 7 bits 7.2, 7.4, 7.5, 7.7 and 7.8. Note that other utah bits surrounding these seven utahs are shown in 600 for reference purposes and easy correspondence with the bitmap of FIG. 20. For example, 610*b* utah 1 bits 1.1-1.4, 1.6, and 1.7; 640*b* utah 4 bits 4.1 and 4.2; and 670*b* utah 7 bits 7.1, 7.3, and 7.6.

The most significant bit B15 will be encoded in 630*a* utah bit 3.8 at 630*a*. Utah 5 at 650 bits 5.2 through 5.8 will encode B14 through B7 of the BCH encoded sensor bits. Utah 6 at 660 bits 6.2 through 6.8 will encode bits B7 through B1 of the BCH encoded sensor bits.

Since a white to transparent sensor dye chemistry is utilized in the first preferred embodiment, the encoded sensor data bit black and white pattern B15-B1 should be preprinted in the Data Matrix. The W→X sensor dye is then overprinted on these encoded bits; her either all of the bits B1-15 or at least those of the black bits B15-B1 in the underlying Data Matrix.

Consider an example when the sensor data value is '4'. From Table 2, the BCH encoding B15-B1 is 001000111101011. Thus in the Data Matrix size 14 bitmap in FIG. 20, utah bits 3.8, 5.2-5.8 and 6.2-6.8 are set to encode the black modules corresponding to these bits B15-B1, as these modules will be over printed with the white to transparent sensor dye. Utah bits 5.1 and 6.1 are set to '0' to ensure white modules are printed. Table 6 shows the AI (90) data string is printed in the first seven utahs of the 16×16 Data Matrix. Recall that each utah encodes one 8-bit codeword.

TABLE 6

AI (90) ASCII and Data Matrix Codeword String Example for W→X Sensor Dye

| Utah | AI (90) Data | 7-bit ASCII Input | Hexadecimal Codeword | Notes |
|---|---|---|---|---|
| 1 | FNC1 | Printer dependent see Notes | E8 | FNC1 is not a 7-bit ASCII value, so a special character string is sent to the printer to include at the start of the GS1 AI string |
| 2 | 90 | 90 | DC | AI (90) |
| 3 | See Notes | 5 | 36 | Indicator bits 3.6, 3.7 = "11", B15 in 3.8 = '0' and Bits 3.1-3.4 set to "0011" to flag as an example of a W→X sensor dye chemistry product |
| 4 | X | X | 59 | Any 7-bit ASCII. Here 'X' 'is used as an example of an additional data character |
| 5 | Example | " | 23 | Sets bits B14-B8 to print '0100011' |
| 6 | Example | j | 6B | Sets bits B7-B1 to print '1101011' |
| 7 | GS or FNC1 | GS | 1E | Terminates AI (90) string |

Bits 3.1-3.5 of utah 3 at 630*b* are not in the invariant bitmap 410 as they are on the bottom edge of the Data Matrix symbol for all sizes of Data Matrix. However data may be encoded here which is useful in communicating specific information about the properties of the sensor dye in use, and the sensor dye pattern which is encoded in the augmented Data Matrix.

Since only part 640*a* of utah 4 appears in the invariant bitmap portion 410, utah 4 is used as a spacer to ensure that bits B14-B1 are printed in utahs 5 and 6 at 650 and 660 respectively. Any 7-bit ASCII character may be encoded in utah 4. It is typically used for product-related information.

Figure 22:
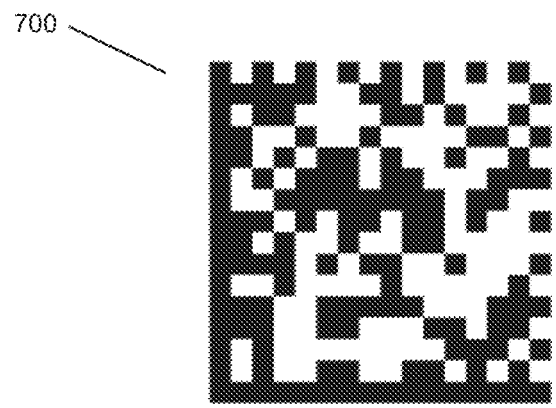
FIG. 22 is a block diagram of a 16×16 Data Matrix using W→X sensor dye chemistry and encoding the GS1 AI (90) string, according to an example embodiment of the present disclosure.
Figure 23:
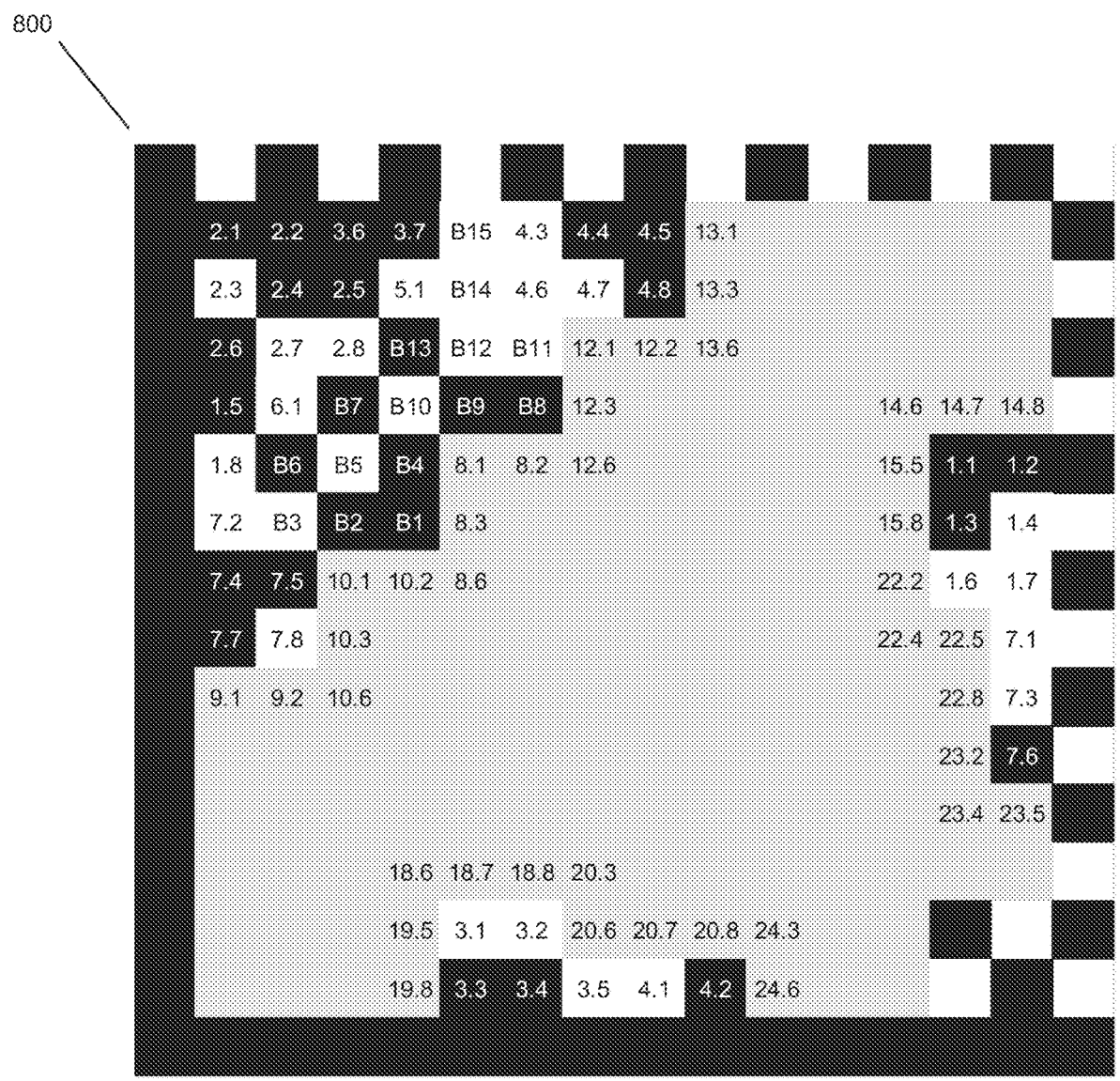
FIG. 23 is a Detail of utahs 1-7 in FIG. 7, according to an example embodiment of the present disclosure.

A 16×16 Data Matrix 700 printed only with the information in Table 6 is shown in FIG. 22. In FIG. 23, Data Matrix 800 is shown similar in structure to Data Matrix 600. Here however, the appropriate modules in the invariant bitmap portion are set to either black or white as per the encodation underlying Data Matrix 700 in FIG. 22. The remaining Data Matrix codewords (utahs 8-12) are filled with pad characters to fill out the 12 available data codewords. The last 12 codewords in the symbol (utahs 13-24) are RSEC error correction codewords. In FIG. 23, for convenience the contents of utahs 8-24 are shown in grey, since they are not relevant to the encoding of AI (90).

Figure 24:
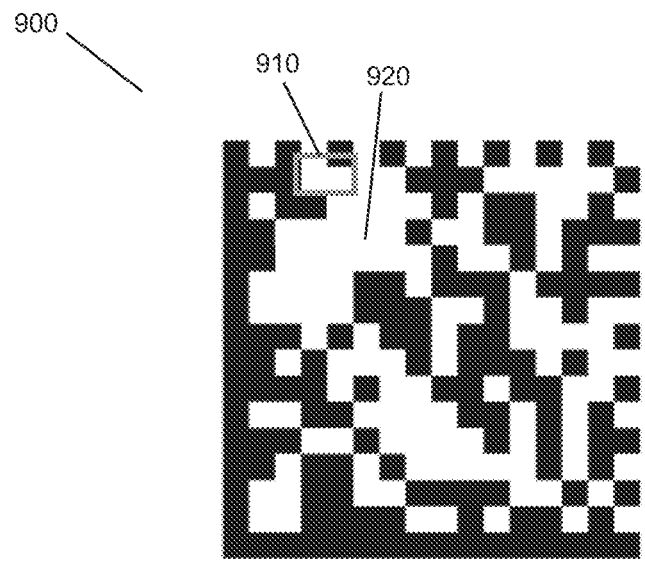
FIG. 24 is a block diagram of the 16×16 Data Matrix of FIG. 7 with unactivated, overprinted sensor dye modules, according to an example embodiment of the present disclosure.

The visual image of the unactivated sensor-augmented Data Matrix 900 is shown in FIG. 24. Note the white sensor dye is overprinted indicator bits 910. The overprinted BCH encoding 920 of B15-B1 of the sensor data is shown as white dye modules, indistinguishable from the unprinted and not-overprinted white modules at utah bits 5.1 and 6.1. These have value '00000000000000', indicating the unactivated default sensor data value '0' for B15-B1 in this sensor dye chemistry system. Note indicator bits are '00' indicating the unactivated state of a W→X sensor dye chemistry.

Once activated, all sensor modules become transparent and the visual image reverts to FIG. 22, showing the correct 15 bit BCH bit pattern 001000111101011 which is decoded using one of the standard methods for BCH (15,5,7) described above to recover the sensor data value '4'.

The second preferred embodiment utilizes a temperature threshold sensitive sensor dye chemistry X→B as is frequently represented by the thermally-activated leuco dye systems used to make thermal paper. Here transparent dye modules are overprinted on white (unprinted) modules of the underlying Data Matrix printed on a white media.

Here also 15-bit BCH(15,5,7) error correction used to encode 5 bits of sensor data which are also encoded by overprinting sensor dye modules on an underlying printed Data Matrix symbol only at bit map locations where a black module is to appear upon sensor dye activation. It is also assumed here that the sensor dye chemistry used is known at the time of printing the Data Matrix symbol.

With any sensor dye chemistry that is initially transparent, different printers may be used to print the underlying Data Matrix symbol and later overprint it with the sensor dye modules as a separate process, thus augmenting the Data Matrix information to be known at time the sensor modules are overprinted. In an example embodiment, the two-dimensional barcode may be attached to various products such as food products, pharmaceutical products, biologics, or any other product that may benefit from environmental, physical, or biological monitoring. For example, the bar code may be printed on or applied to a container for such a product.

The sensor data 15-bit BCH encoding pattern, along with 2 indicator bits, is identical to that of the first preferred embodiment. From Table 2, for an X→B sensor dye chemistry the printed indicator bits 3.6 and 3.7 will be "10". As in the first preferred embodiment, the upper 5 bits of utah 3, bits 3.1-3.5 may be used to encode additional information about the sensor dye chemistry in use and/or the sensor dye bit pattern.

In keeping with the most broadly used system for encoding information in a Data Matrix, the GS1 Application Identifier AI (90) is used. AI (90) is reserved for information mutually agreed upon between trading partners, such as the presence of a sensor-enabled Data Matrix. AI (90) is used in utah 1-7 data structure format as in the first preferred embodiment, with the specific data here encoded in Table 7.

Consider the same example as in the first preferred embodiment when the sensor data value is 4. From Table 4, the BCH encoding B15-B1 is 001000111101011. Since a transparent-to-black sensor dye chemistry is utilized in this second preferred embodiment, the BCH-encoded sensor dye modules for what will become black modules in B15-B1 once active must be selectively overprinted on B15-B1 white modules in the underlying Data Matrix. The indicator bits 3.6 and 3.7 are also overprinted with sensor dye modules.

Figure 25:
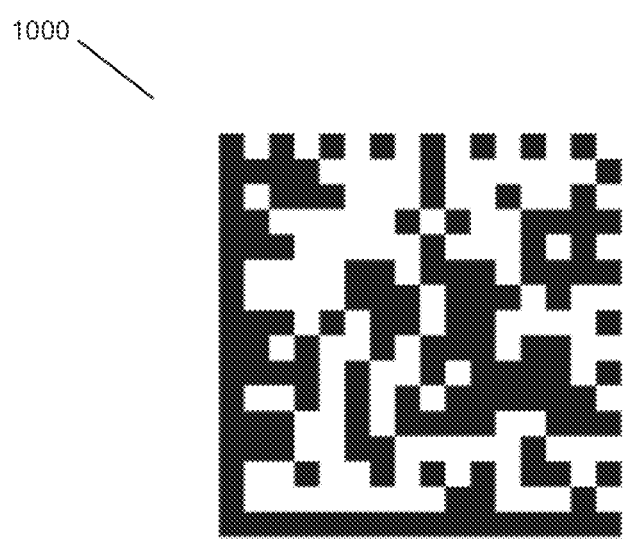
FIG. 25 is a block diagram of a 16×16 Data Matrix using X→B sensor dye chemistry and encoding the GS1 AI (90) string, according to an example embodiment of the present disclosure.

Table 7 shows the AI (90) data string that is printed for this second preferred embodiment example in the first 7 utahs of the 16×16 underlying Data Matrix 1000 in FIG. 25. The underlying Data Matrix 1000 printed only with the information in Table 7 is shown in FIG. 25.

Figure 26:
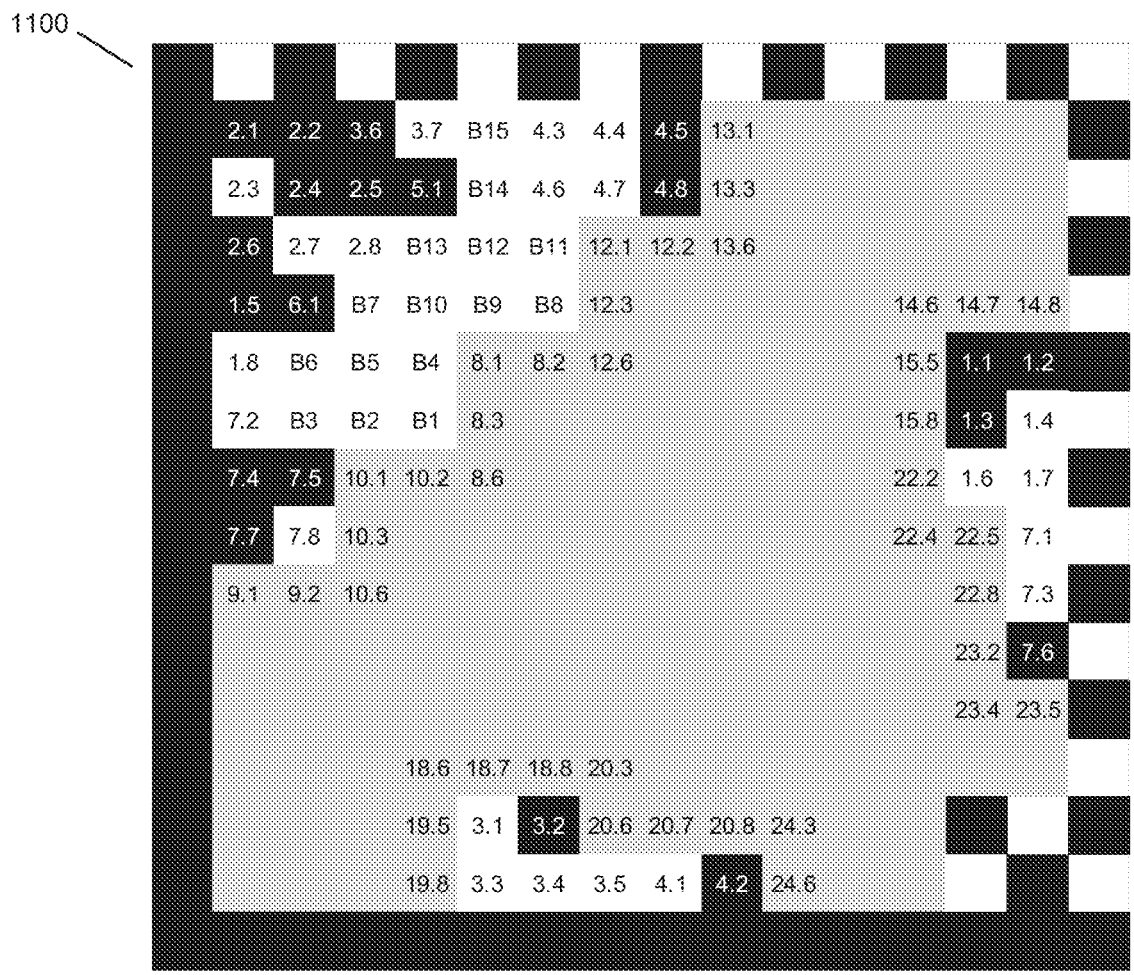
FIG. 26 is a Detail of utahs 1-7 in FIG. 25, according to an example embodiment of the present disclosure.

Referring to the ULC detail 1100 in FIG. 26, indicator bits 3.6 and 3.7 are set to '1' and '0' respectively. Utah bits 3.8, 5.2-5.8 and 6.2-6.8 are white modules corresponding to '0' for all these bits B15-B1. Utah bits 5.1 and 6.1 are set to '1' as they are not part of the BCH bit encoding sequence, and the Data Matrix standard ISO/IEC standard requires every utah to have at least 1 black module. The remaining Data Matrix codewords (utahs 8-12) are filled with pad characters to fill out the 12 available data codewords, which are specially encoded as per ISO/IEC 16022. The last 12 codewords in the symbol (utahs 13-24) are RSEC error correction codewords. In FIG. 26, for convenience the contents of utahs 8-24 are shown in grey, since they are not relevant to the encoding of AI (90).

TABLE 7

AI (90) ASCII and Data Matrix Codeword String Example for X→B Sensor Dye

| Utah | AI (90) Data | 7-bit ASCII Input | Hexadecimal Codeword | Notes |
| --- | --- | --- | --- | --- |
| 1 | FNC1 | Printer dependent see Notes | E8 | FNC1 is not a 7-bit ASCII value, so a special character string is sent to the printer to include at the start of the GS1 AI string |
| 2 | 90 | 90 | DC | |
| 3 | See Notes | C | 44 | Indicator bits 3.6, 3.7 = '10', B15 in 3.8 = '0' and Bits 3.1-3.4 set to "0100" to flag as an example of a W→X sensor dye chemistry product |
| 4 | H | H | 49 | Any 7-bit ASCII. Here 'H' is used as an example of an additional data character |
| 5 | Example | Printer Dependent | 80 | Sets bits B14-B8 to print '0000000' '~' is a common printer string as ~ is 7F and Data Matrix encodes ASCII value + 1 |
| 6 | Example | Printer Dependent | 80 | Sets bits B7-B1 to print '0000000' See note for Utah 5 |
| 7 | GS or FNC1 | GS | 1E | Terminates AI (90) string |

The white modules of the underlying Data Matrix will be visible when the sensor-augmented Data Matrix barcode symbol is in the unactivated state, showing a BCH encoding for B15-B1 of 00000000000000, or sensor data value 0 as in the sensor-augmented Data Matrix 1000 in FIG. 25 and the Data Matrix ULC detail 1100 in FIG. 26.

Figure 27:
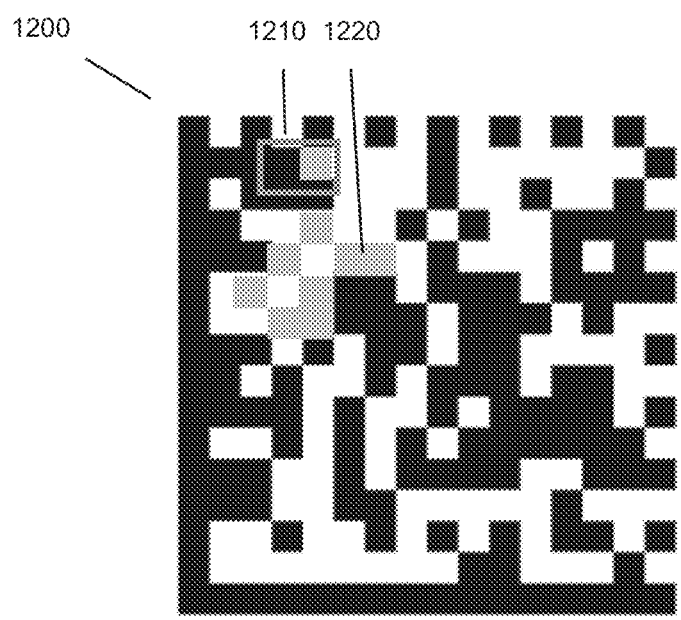
FIG. 27 is a block diagram of the 16×16 Data Matrix of FIG. 25 with unactivated, overprinted sensor dye modules, according to an example embodiment of the present disclosure.

Once the sensor modules are activated, the visual sensor-augmented Data Matrix 1200 ideally will appear, as shown in in FIG. 27. The sensor data bit pattern B15-B1 of 001000111101011 will now show, and through reading of the Data Matrix as described above using supplemental standard BCH decoding techniques on the sensor dye bit pattern the sensor data value 4 will be recovered. Note that the Data Matrix 1200 is the same as the underlying Data Matrix 1000 with the overprinted sensor dyes modules now activated to black (but shown in dark grey as 1220 in FIG. 27, for clarity) to reveal the sensor data bit pattern B15-B1, and the indicator bit pattern 1210 now as '11'.

The third preferred embodiment also utilizes a temperature-sensitive sensor dye chemistry. Here sensor dye modules in the unactivated color state are overprinted as a single sensor dye patch in the invariant bitmap of an underlying Data Matrix printed on a white media.

Any sensor dye chemistry R→S may be used, provided the arbitrary color states R and S both have 1) sufficient visual color state change and 2) sufficient contrast under 660 nm reader illumination that the R color state scans as W or B and the S color state scans as the complementary color, B or W. This enables the sensor dye patch, in either the unactivated or activated color state, to be both visually discriminable and machine readable to using the aforementioned Data Matrix reading techniques to recover the sensor dye modules as an image and further process it to determine the activation state of the sensor dye patch.

Different printers, or different stations of the same printing press, may be used: First to print the underlying Data Matrix symbol and later to overprint it with the sensor dye patch in a separate process.

In this example, an X→B sensor dye chemistry is illustrated. The sensor dye patch is a square approximately 2×2 sensor dye modules in size. It is framed by and centered in a white area 4×4 modules in size. This 4×4 white frame is positioned in the invariant bitmap of a 16×16 Data Matrix, to ensure that the 4×4 white frame and its enclosed sensor dye patch will always be in the same position relative to ULC over broad range of Data Matrix symbol sizes.

Figure 28:
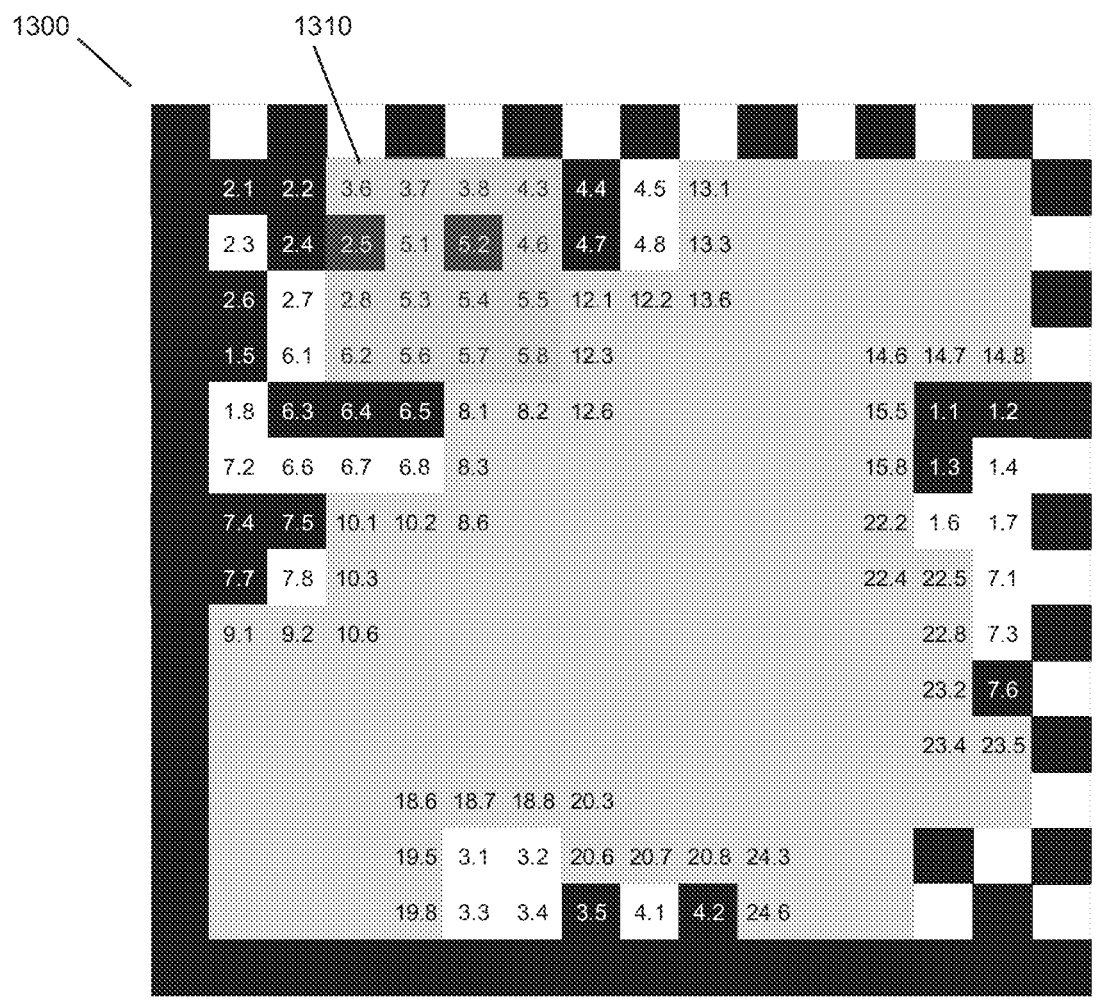
FIG. 28 is a Detail of a 16×16 Data Matrix encoding the data of Table 8 showing a 4×4 frame area, according to an example embodiment of the present disclosure.

FIG. 28 shows the position of the 4×4 white frame 1310 (from bit 3.6 to bit 5.8) within the example 16×16 Data Matrix symbol 1300. The 4×4 white frame 1310 contains 4 rows of utah bits comprised as follows:
Row 1: Bits 3.6, 3.7, 3.8, 4.3
Row 2: Bits 2.5, 5.1, 5.2, 5.3
Row 3: Bits 2.8, 5.3, 5.4, 5.5
Row 4: Bits 6.2, 5.6, 5.7, 5.8

Note that in this third preferred embodiment, bits 3.6 and 3.7 are not used as indicator bits, as in the first and second preferred embodiments but are rather here they are part of the 4×4 white frame.

A naive approach would be to create the underlying printed Data Matrix symbol without data restriction and simply overprint white modules on the 16 underlying Data Matrix modules in the 4×4 white frame 1310. Depending on the data encoded, and whether any black modules in 1310 were deliberately overprinted, up to 5 utahs and their encoded codewords could be deliberately damaged by overprinting. A conventional approach to the use of Reed-Solomon error correction to recover up to 5 damaged codewords during reading a Data Matrix would require the use of up to 10 of the 12 available RSEC codewords in a 16×16 Data Matrix symbol. This would leave few RSEC codewords available for other accidental symbol damage.

As in the examples shown in the first and second preferred embodiments, in this example symbol data encoding is also performed using the GS1 Application Identifier AI (90) and the utah 1-7 data structure format. Symbol data specific to the third preferred embodiment is encoded in Table 8. For convenience the contents of utahs 8-24 are shown in grey in Data Matrix 1300, since they are not relevant to the encoding of AI (90).

Utahs 1 and 7 are unaffected by the creation of the 4×4 white frame 1310, as they have no bits within 1310. Utah bits 2.5 and 2.8 are within 1310. In the AI(90) data encoding bit 2.5='1', and therefore utah 2 will be deliberately damaged when overwritten by a white module. Utah 5 is entirely within the 4×4 white frame 1310. Since by the way data is encoded with ISO/IEC 16022 Data Matrix there will always be at least 1 black module in any valid utah; therefore no matter what 7-bit ASCII data character is encoded in utah 5 it and its codeword will be deliberately damaged by overprinting all utah 5 modules with white modules.

However, is possible to avoid deliberate damage to bit positions in utahs 3, 4 and 6 which are within the 4×4 white frame merely by restricting the data allowed to be encoded in these codewords so that there are no black modules ('1' bits) in utah bits 3.6-3.8, 4.3, 4.6 and 6.2. Assuming than 'x' represents a "don't care" bit position in each specific bit position within a utah, the allowable 8-bit Data Matrix codeword forms are:
Utah 3: xxxxx000
Utah 4: xx0xx0xx
Utah 6: x0xxxxxx Table 8 shows the AI (90) data string for this $3^{rd}$ preferred embodiment example in the first 7 utahs of the 16×16 underlying Data Matrix 1400 in FIG. 29.

TABLE 8

AI (90) ASCII and Data Matrix Codeword String Example for Patch sensor

| Utah | AI (90) Data | 7-bit ASCII Input | Hexadecimal Codeword | Notes |
|---|---|---|---|---|
| 1 | FNC1 | Printer dependent see Notes | E8 | FNC1 is not a 7-bit ASCII value, so a special character string is sent to the printer to include at the start of the GS1 AI string |
| 2 | 90 | 90 | DC | Data Matrix encodes 2 digits/codeword |
| 3 | See Notes | BEL | 08 | Binary form: xxxxx000 so bits 3.6-3.8 = '000'. As an example, here bits 3.1-3.5 are set to "00001" to signal a dye patch symbol with an XAB sensor dye chemistry |
| 4 | See Notes | 'Q' | 52 | Binary form: xx0xx0xx Here binary form 01010010 (7-bit ASCII 'Q') is an example of an additional data character |
| 5 | Product Related | '?' | 40 | Any 7-bit ASCII value. Here ASCII 63 corresponding to '?' is used as an example. |
| 6 | Product Related | '7' | 38 | Binary form: x0xxxxxx Any 7-bit ASCII value less than 64 decimal may be used. As an example, '7' (ASCII 55) is used. |
| 7 | GS or FNC1 | GS | 1E | Terminates AI (90) string |

Figure 29:
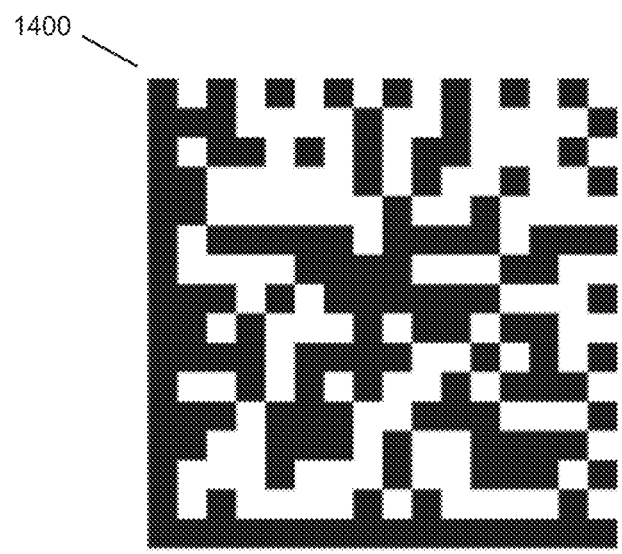
FIG. 29 is a block diagram of an Underlying 16×16 Data Matrix encoded using the data on Table 8, according to an example embodiment of the present disclosure.

In FIG. 29, the underlying Data Matrix 1400 is printed only with the information in Table 8. The remaining Data Matrix data codewords (utahs 8-12) are filled with Data Matrix pad characters. The last 12 codewords in the symbol (utahs 13-24) are RSEC error correction codewords.

Figure 30:
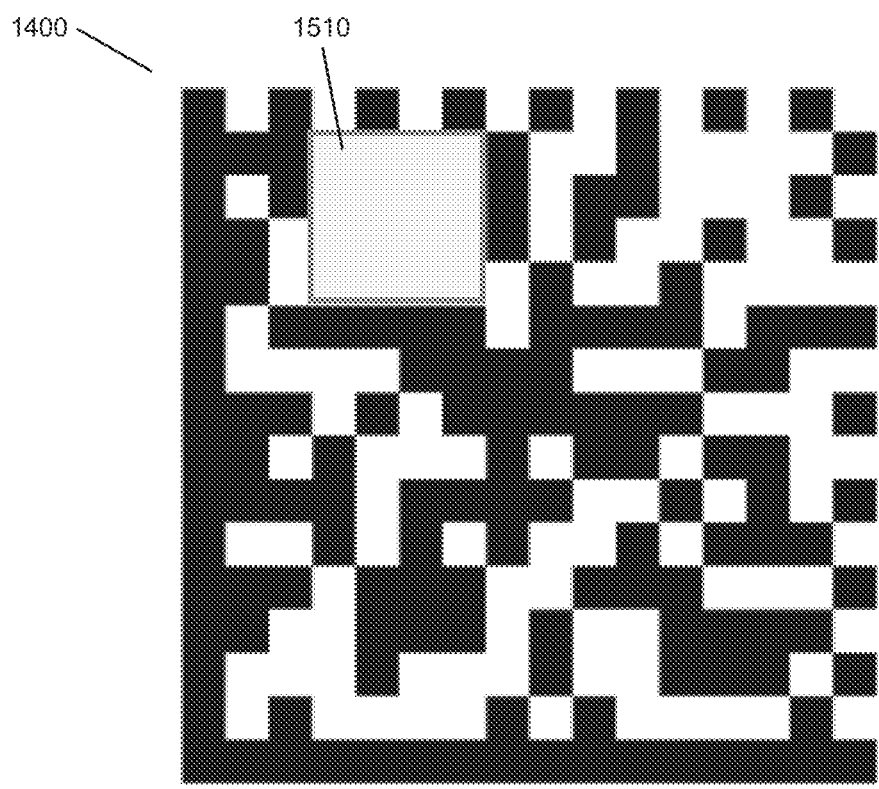
FIG. 30 is a block diagram of the 16×16 Data Matrix of FIG. 29 with an overprinted 4×4 white frame, according to an example embodiment of the present disclosure.

In FIG. 30, a 4×4 white frame 1510 is shown within the invariant bitmap of Data Matrix 1400, corresponding to the 4×4 white area 1310 in FIG. 28. There are several ways of producing this 4×4 white frame 1510, including physically overprinting white modules on the underlying Data Matrix 1400. A better way is a modification to the Data Matrix encoding and symbol generation software for the underlying symbol is by altering the Data Matrix's encoded 14×14 bitmap to ensure that all bit positions in 1510 are set to '0' prior to conversion to black and white modules, or alternatively setting all modules to white in the 4×4 white area 1510 prior to printing Data Matrix 1400. Thus, no black modules are ever printed in the 4×4 white area 1510 in the first place, requiring no white module overprinting step.

Figure 31:
FIG. 31 is a block diagram of the 16×16 Data Matrix of FIG. 30 showing an overprinted and activated sensor dye patch, according to an example embodiment of the present disclosure.

As in the second preferred embodiment, in the third preferred embodiment a secondary printing step is used to print an approximately 2×2 sensor dye patch 1620 within the 4×4 white frame 1510, as shown in FIG. 31. Here the sensor dye patch 1602 is shown as activated (for clarity in a purple color).

One of the objectives of the third preferred embodiment that there is a visible change of the sensor dye patch 1520 color state within the 4×4 white frame 1510 upon sensor dye activation. The second objective is that a sensor dye chemistry is employed that has adequate contrast to the Data Matrix reader as described above so that the sensor dye patch 1620 is read as W or B modules when unactivated and read as the complementary color B or W modules when activated. Then the presence of both the unactivated and activated sensor dye patch can be machine readable to a Data Matrix reader using reading methods described above.

A further improvement to the third preferred embodiment is in the Data Matrix reading process: It is to apply the knowledge that the codewords of utahs 2 and 5 have been deliberately damaged to improve the efficiency of the Reed-Solomon error correction process in the symbol codeword sequence recovery. Detection and correction of an erroneous codeword at an unknown location in the combined data plus RSEC codeword sequence requires the use of 2 RSEC characters per damaged codeword. But, if the location of the damaged codewords are known prior to applying the Reed-Solomon error correction process (in this case in codewords 2 and 5) then only 1 RSEC codeword is required to recover the correct codeword value of each identified damaged codeword. This leaves additional unused RSEC codewords available for other accidental Data Matrix symbol damage correction.

Alternative embodiments include use of one or more of
- other two-dimensional error correcting barcode symbols in place of Data Matrix including QR Code, Aztec Code, MaxiCode, PDF417 and Dot Code;
- alternate sensor dye chemistries utilizing color states other than black, white or transparent, such as a continuously variable color state between an initial state and an end state;
- underlying printed two-dimensional error correcting barcode symbols where either first color state or the second color state of the symbol are colors other than black or white;
- underlying two-dimensional error correcting barcode symbols where either the first color state may be the unmarked media surface and the second color state a directly-marked media surface change, or vice versa;
- overprinting a two-dimensional error correcting barcode symbol on a color indicator or sensor dye patch that continuously changes color;
- overprinting a color indicator or sensor dye patch that continuously changes color on a two-dimensional error correcting barcode symbol.

In an exemplary aspect of the present disclosure, a sensor-augmented two-dimensional barcode includes a substrate, a first layer provided on the substrate, and a second layer provided on the substrate. The first layer includes a sensor dye region, which includes a sensor dye having a chemistry that is configured, responsive to the occurrence of an environmental condition, to undergo a continuous chemical or physical state change between an initial state and an end state, causing a change in the color state of the sensor dye. The color state indicates exposure to the environmental condition. The second layer includes a two-dimensional error-correcting barcode symbol, which includes a plurality of modules in a permanent color state. The modules are optionally square, rectangular, or circular.

In accordance with another exemplary aspect of the present disclosure, which may be used in combination with any one or more of the preceding aspects, the second layer is aligned with a feature of the first layer, and wherein, preferably, the sensor dye region is positioned in an invariant area of the two dimensional barcode such that an upper left corner of the second layer is aligned with an upper left corner of the first layer.

In accordance with another exemplary aspect of the present disclosure, which may be used in combination with any one or more of the preceding aspects, the environmental condition is selected from the group consisting of time, temperature, and time-temperature product, and wherein, preferably, the sensor dye continuously changes color state between the initial state and the end state when exposed to the environmental condition.

In accordance with another exemplary aspect of the present disclosure, which may be used in combination with any one or more of the preceding aspects, the second layer is printed over the first layer.

In accordance with another exemplary aspect of the present disclosure, which may be used in combination with any one or more of the preceding aspects, the first layer is printed over the second layer.

In accordance with another exemplary aspect of the present disclosure, which may be used in combination with any one or more of the preceding aspects, the second layer forms a readable barcode symbol in the symbology of a two-dimensional barcode.

In accordance with another exemplary aspect of the present disclosure, which may be used in combination with any one or more of the preceding aspects, the two-dimensional error-correcting barcode symbol is from the symbology group consisting of Data Matrix, QR Code, Aztec Code, MaxiCode, PDF417 and Dot Code symbologies.

In accordance with another exemplary aspect of the present disclosure, which may be used in combination with any one or more of the preceding aspects, the two-dimensional error-correcting barcode symbol utilizes Reed-Solomon error correction.

In accordance with another exemplary aspect of the present disclosure, which may be used in combination with any one or more of the preceding aspects, the sensor dye is initially in a first color state when unactivated and dynamically changes to a plurality of different color states within a range between the initial state and the end state before reaching the end state.

In accordance with another exemplary aspect of the present disclosure, which may be used in combination with any one or more of the preceding aspects, the sensor dye reaches a predetermined intermediate state between the initial state and the end state when the specified condition of the sensed property is beyond a threshold value, wherein the threshold value is preferably a labeled product life.

In accordance with another exemplary aspect of the present disclosure, which may be used in combination with any one or more of the preceding aspects, the sensor dye dynamically changes to a plurality of different color states related to one of expended product life and remaining labeled product life.

In accordance with another exemplary aspect of the present disclosure, which may be used in combination with any one or more of the preceding aspects, the first layer optionally may provide sensor digital information, the sensor digital information preferably encoded in an invariant pixel map of the two-dimensional symbol, and more preferably encoded as binary encoded sensor data, and more preferably the binary encoded sensor data is in an error correcting code, preferably chosen from the group consisting of Hamming Codes, Bose-Chaudhuri-Hocquenghem Codes, Golay Codes, Simplex Codes, Reed-Muller Codes, Fire Codes, Convolutional Codes, and Reed-Solomon Codes.

In accordance with another exemplary aspect of the present disclosure, which may be used in combination with any one or more of the preceding aspects, the two-dimensional error-correcting barcode includes encoded application identifiers, and wherein, preferably, a first application identifier indicates the size and location of the sensor dye region and a second application identifier indicates product life equation parameters, wherein, preferably, the product life equation parameters are Arrhenius equation parameters.

In accordance with another exemplary aspect of the present disclosure, which may be used in combination with any one or more of the preceding aspects, pharmaceutical, biological, or food product, preferably a vaccine; a container holding the pharmaceutical, biological, or food product, preferably a vaccine vial; and a sensor-augmented two-dimensional barcode symbol provided on or in the container, preferably being applied to the outside surface of the container.

In an exemplary aspect of the present disclosure, method of reading of a sensor-augmented two-dimensional barcode symbol includes optically scanning an image of the sensor-augmented two-dimensional barcode symbol to obtain color values for pixels in the image. Then, a scanned pixel map containing the color values in the sensor-augmented two-dimensional barcode symbol is constructed, and the pixels in the scanned pixel map are processed to assign a binary color value to each pixel and to form a binarised pixel map. The two-dimensional barcode symbol is identified and decoded in the binarised pixel map to recover a symbol codeword sequence. Next, underlying data codewords are recovered from the symbol codeword sequence, preferably by utilizing error correction process on the symbol codeword sequence. The data codewords are processed for identification of barcode modules in a sensor dye region, and an average color value of the barcode modules in the sensor dye region is determined. The average color value of the sensor dye region is processed to determine a reflectance percentage of incident light at a time of scanning.

In accordance with another exemplary aspect of the present disclosure, which may be used in combination with any one or more of the preceding aspects, the method includes processing sensor digital information pixel map to identify the sensor dye region and determine from a color state of the sensor dye region product life information.

In accordance with another exemplary aspect of the present disclosure, which may be used in combination with any one or more of the preceding aspects, processing color information includes capturing white light reflectance of pixels included in the sensor dye region, and creating a colored light filter effect on reflectance data from the scanned pixels utilizing a filter to generate filtered colored image values of the pixels in a scanned pixel map.

In accordance with another exemplary aspect of the present disclosure, which may be used in combination with any one or more of the preceding aspects, the method further includes reducing the filtered colored image values to greyscale values creating a greyscale pixel map.

In accordance with another exemplary aspect of the present disclosure, which may be used in combination with any one or more of the preceding aspects, processing color information includes capturing white light reflectance of pixels included in the sensor dye region, and creating a colored light filter effect on reflectance data from the scanned pixels utilizing a filter to generate filtered colored image values of the pixels in a scanned pixel map.

In accordance with another exemplary aspect of the present disclosure, which may be used in combination with any one or more of the preceding aspects, processing color information includes reducing the filtered colored image values in the scanned pixel map to greyscale values, determining an average greyscale value of the average color value of the barcode modules, and processing the average grey value to determine the incident light reflectance percentage at the time of scanning.

In accordance with another exemplary aspect of the present disclosure, which may be used in combination with any one or more of the preceding aspects, processing the pixels in the scanned pixel map includes classifying each pixel as one of a black pixel, a white pixel, and a color pixel.

In accordance with another exemplary aspect of the present disclosure, which may be used in combination with any one or more of the preceding aspects, the black pixels, the white pixels, and the color pixels are used to form a ternarised pixel map, and the black and white pixels in the ternarised pixel map are used to identify the two-dimensional barcode symbol in the ternarised pixel map.

In accordance with another exemplary aspect of the present disclosure, which may be used in combination with any one or more of the preceding aspects, the method includes classifying each pixel in the invariant area as one of a black pixel, a white pixel, and a color pixel. Additionally, the method optionally includes determining the average grey value of the color pixels, and processing the average grey value to determine the current reflectance percentage at the sampling time.

In accordance with another exemplary aspect of the present disclosure, which may be used in combination with any one or more of the preceding aspects, the sensor dye region is located in an invariant area of a Data Matrix barcode symbol.

In accordance with another exemplary aspect of the present disclosure, which may be used in combination with any one or more of the preceding aspects, the method further includes recovering a visual pattern or image from the sensor digital information.

In accordance with another exemplary aspect of the present disclosure, which may be used in combination with any one or more of the preceding aspects, the sensor dye region includes a sensor dye that is responsive to environmental factors including at least one of temperature, time, radiation, light, and toxic chemicals.

In accordance with another exemplary aspect of the present disclosure, which may be used in combination with any one or more of the preceding aspects, the sensor dye region includes a sensor dye that is responsive to environmental factors including at least one of temperature, time, radiation, light, and toxic chemicals.

In an exemplary aspect of the present disclosure, a method of reading a sensor-augmented two-dimensional barcode symbol includes optically scanning an image of the sensor-augmented two-dimensional barcode symbol to obtain a greyscale value for each pixel in the image. Then, a greyscale pixel map of the pixels in the sensor-augmented two-dimensional barcode symbol is constructed. Next, the method includes processing the pixels in the greyscale pixel map to assign a binary color value to each pixel and to form a binarised pixel map. Additionally, identifying the two-dimensional barcode symbol in the binarised pixel map is identified and decoded to recover a symbol codeword sequence. Then, underlying data codewords from the symbol codeword sequence are recovered utilizing an error-correction process on the symbol codewords. The data codewords are processed for identification of the barcode modules in a sensor dye region. Then, an average greyscale value of the barcode modules in the sensor dye region is determined, and the average greyscale values of the sensor dye region are processed to determine a reflectance percentage of incident light at a time of scanning.

In accordance with another exemplary aspect of the present disclosure, which may be used in combination with any one or more of the preceding aspects, a bandpass filter is utilized when optically scanning the image to create the effect of monochrome illumination.

In accordance with another exemplary aspect of the present disclosure, which may be used in combination with any one or more of the preceding aspects, a light source is used to optically scan the image, the light source being a monochrome light source, wherein preferably, the monochrome light source is a monochrome laser.

In accordance with another exemplary aspect of the present disclosure, which may be used in combination with any one or more of the preceding aspects, a barcode imager is used to optically scan the image, and wherein the barcode imager is responsive only to greyscale values.

In an exemplary aspect of the present disclosure, a sensor-augmented two-dimensional barcode includes a substrate; a two-dimensional error-correcting barcode symbol provided on the substrate; a first layer provided on the substrate in a permanent color state; and a second layer provided on the substrate. The bar code symbol further includes a plurality of modules, the modules optionally being square, rectangular, or circular, each module having one of a first color state or a second color state. The second layer is optionally provided by overprinting the first layer, in a sensor dye module pattern, the sensor dye module pattern containing sensor digital information. The second layer further includes a sensor dye having a chemistry that is configured, responsive to the occurrence of an environmental, physical or biological condition, to undergo a chemical or physical state change causing a change in the color state of the sensor dye, thereby changing the color state of a subset of the plurality of modules.

In accordance with another exemplary aspect of the present disclosure, which may be used in combination with any one or more of the preceding aspects, the environmental condition is selected from the group consisting of time, temperature, time-temperature product, light, humidity, gas vapor and nuclear radiation, and wherein, preferably, the sensor dye permanently changes color state when the environmental condition crosses a threshold value.

In accordance with another exemplary aspect of the present disclosure, which may be used in combination with any one or more of the preceding aspects, the first layer forms a readable barcode symbol in the symbology of the two-dimensional barcode.

In accordance with another exemplary aspect of the present disclosure, which may be used in combination with any one or more of the preceding aspects, the two-dimensional error-correcting barcode symbol is from the symbology group consisting of Data Matrix, QR Code, Aztec Code, MaxiCode, PDF417 and Dot Code symbologies.

In accordance with another exemplary aspect of the present disclosure, which may be used in combination with any one or more of the preceding aspects, the two-dimensional error-correcting barcode symbol utilizes Reed-Solomon error correction.

In accordance with another exemplary aspect of the present disclosure, which may be used in combination with any one or more of the preceding aspects, the sensor dye is initially in a black, white or transparent color state when unactivated and changes to a different color state upon activation.

In accordance with another exemplary aspect of the present disclosure, which may be used in combination with any one or more of the preceding aspects, the sensor dye permanently changes color state when the specified condition of the sensed property is above or below a threshold value.

In accordance with another exemplary aspect of the present disclosure, which may be used in combination with any one or more of the preceding aspects, the specified condition of the sensed property is the detection of the presence of a biological organism, biological agent or biological toxin, preferably by utilizing a colorimetric immunoassay.

In accordance with another exemplary aspect of the present disclosure, which may be used in combination with any one or more of the preceding aspects, the second layer provides sensor digital information, the sensor digital information preferably encoded in an invariant bitmap of the two-dimensional symbol, and more preferably encoded as binary encoded sensor data, and more preferably the binary encoded sensor data is in an error correcting code, preferably chosen from the group consisting of Hamming Codes, Bose-Chaudhuri-Hocquenghem Codes, Golay Codes, Simplex Codes, Reed-Muller Codes, Fire Codes, Convolutional Codes, and Reed-Solomon Codes.

In accordance with another exemplary aspect of the present disclosure, which may be used in combination with any one or more of the preceding aspects, the sensor digital information encoded in the sensor dye module pattern is a visual pattern or image.

In accordance with another exemplary aspect of the present disclosure, which may be used in combination with any one or more of the preceding aspects, an article of manufacture includes pharmaceutical, biological, or food product, preferably a vaccine; a container holding the pharmaceutical, biological, or food product, preferably a vaccine vial; and a sensor-augmented two-dimensional barcode symbol provided on or in the container, preferably being applied to the outside surface of the container.

In accordance with another exemplary aspect of the present disclosure, a method of reading of a sensor-augmented two-dimensional barcode symbol includes scanning and optically processing an image of the sensor-augmented two-dimensional barcode symbol, including construction of a scan binary bitmap from scanned modules of the sensor-augmented two-dimensional barcode symbol. The method further includes constructing a symbol codeword sequence from the scan binary bitmap. Then, underlying data codewords are recovered from the symbol codeword sequence, preferably by utilizing error correction process on the symbol codeword sequence, the error correction process preferably being a Reed-Solomon code. Next, the underlying data codewords are processed to form the underlying symbol codeword sequence. The method further includes constructing an underlying binary bitmap from the scan binary bitmap from the underlying symbol codeword sequence, the underlying binary bitmap preferably equal in size to the scan binary bitmap. At each bit position an exclusive-OR of the scan binary bitmap and the underlying binary bitmap may be performed to form a sensor digital information bitmap. Optionally, the method includes, processing the sensor digital information bitmap to recover a binary information sequence that incorporates binary encoded sensor data, preferably by processing the binary information sequence as an error-correcting code sequence and utilizing an error correction process to recover binary-encoded sensor data. The error-correcting code preferably is selected from the group consisting of Hamming Codes, Bose-Chaudhuri-Hocquenghem Codes, Golay Codes, Simplex Codes, Reed-Muller Codes, Fire Codes, Convolutional Codes, and Reed-Solomon Codes.

In accordance with another exemplary aspect of the present disclosure, which may be used in combination with any one or more of the preceding aspects, the method includes processing the sensor digital information bitmap to identify a sensor dye patch and determine from a color state of the sensor dye patch whether or not activation of a sensor dye has occurred in response to an environmental condition.

In accordance with another exemplary aspect of the present disclosure, which may be used in combination with any one or more of the preceding aspects, the sensor dye patch is located in an invariant area of a Data Matrix barcode symbol.

In accordance with another exemplary aspect of the present disclosure, which may be used in combination with any one or more of the preceding aspects, the method includes recovering a visual pattern or image from the sensor digital information bitmap.

In accordance with another exemplary aspect of the present disclosure, which may be used in combination with any one or more of the preceding aspects, an apparatus may perform a method of generating a 2D barcode, includes determining a set of payload data including a set of static data and a set of dynamic data, generating a 2D barcode which includes an encoded version of the set of static data and includes redundant space, designating at least part of the redundant space as a dynamic region which is adapted to store the set of dynamic data, and printing the 2D barcode using a static ink and an encoded version of the set of the dynamic data on the dynamic region using a dynamic ink which changes states responsive to at least one environmental change, such that the set of dynamic data is in one of a plurality of states. The set of dynamic data is readable by a reader of the 2D barcode and the set of static data is readable by the reader of the 2D barcode when the set of dynamic data is in each one of the plurality of states.

In accordance with another exemplary aspect of the present disclosure, which may be used in combination with the preceding aspect, the dynamic ink is responsive to environmental factors including at least one of temperature, time, radiation, light, and toxic chemicals.

In accordance with another exemplary aspect of the present disclosure, which may be used in combination with any one or more of the preceding aspects, the dynamic ink is responsive to time and temperature.

In accordance with another exemplary aspect of the present disclosure, which may be used in combination with any one or more of the preceding aspects, the dynamic ink is responsive to freezing.

In accordance with another exemplary aspect of the present disclosure, which may be used in combination with any one or more of the preceding aspects, the dynamic ink permanently changes in response to an environmental factor.

In accordance with another exemplary aspect of the present disclosure, which may be used in combination with any one or more of the preceding aspects, the dynamic ink transitions from a first state to a second state in response to the occurrence of a specific environmental factor and returns to the first state when the specific environmental factor is no longer occurring.

In accordance with another exemplary aspect of the present disclosure, which may be used in combination with any one or more of the preceding aspects, the redundant space includes at least one of a plurality of unused bits, a padding region, and an error detection and correction region.

In accordance with another exemplary aspect of the present disclosure, which may be used in combination with any one or more of the preceding aspects, wherein the redundant space includes at least one of a format information region, a version information region, and a reference data region.

In accordance with another exemplary aspect of the present disclosure, which may be used in combination with any one or more of the preceding aspects, a non-privileged reader is capable of reading the static data and cannot read the dynamic data of the 2D barcode.

In accordance with another exemplary aspect of the present disclosure, which may be used in combination with any one or more of the preceding aspects, only privileged readers are capable of reading the static data and cannot read the dynamic data of the 2D barcode.

In accordance with another exemplary aspect of the present disclosure, which may be used in combination with any one or more of the preceding aspects, an apparatus may perform a method of providing a 2D barcode, includes determining a set of static data, determining a set of dynamic data, generating a first 2D barcode, generating a second 2D barcode, comparing the first 2D barcode and the second 2D barcode and categorizing the information modules into a first group and a second group, and printing the 2D barcode in static ink and dynamic ink. The set of dynamic data has a first state and a second state. The first 2D barcode includes an encoded version of the set of static data and the set of dynamic data in the first state. The set of static data and the set of dynamic data in the first state include a first plurality of information modules and a second plurality of information modules. The second 2D barcode includes an encoded version of the set of static data and the set of dynamic data in the second state. The set of static data and the set of dynamic data in the second state include a third plurality of information modules and a fourth plurality of information modules. The third plurality of information modules includes all of the first plurality of information modules plus a set of one or more information modules. The second plurality of information modules includes all of the fourth plurality of information modules plus the set of one or more information modules. The first group includes common information modules between the first plurality of information modules of the first 2D barcode and the third plurality of information modules of the second 2D barcode. The second group includes unique information modules of the third plurality of information modules of the second 2D barcode. The first group is printed in the static ink, and the second group is printed in the dynamic ink. The dynamic ink is adapted to activate in response to the occurrence of a specific environmental factor.

In accordance with another exemplary aspect of the present disclosure, which may be used in combination with any one or more of the preceding aspects, the first plurality of information modules and the third plurality of information modules are black modules and the second plurality of information modules and the fourth plurality of information modules are white modules.

In accordance with another exemplary aspect of the present disclosure, which may be used in combination with any one or more of the preceding aspects, the first plurality of information modules and the third plurality of information modules are adapted to be visually distinguishable from a printing surface and the third plurality of information modules and the fourth plurality of information modules are visually indistinguishable from the printing surface.

In accordance with another exemplary aspect of the present disclosure, which may be used in combination with any one or more of the preceding aspects, an apparatus may perform a method of providing a 2D barcode, includes determining a set of static data, determining a set of dynamic data, generating a first 2D barcode, generating a second 2D barcode, comparing the first 2D barcode and the second 2D barcode and categorizing the information modules into a first group, a second group, and a third group, and printing the 2D barcode using a static ink, a first dynamic ink, and a second dynamic ink. The set of dynamic data has a first state and a second state. The first 2D barcode includes an encoded version of the set of static data and the set of dynamic data in the first state. The set of static data and the set of dynamic data in the first state include a first plurality of information modules and a second plurality of information modules. The second 2D barcode includes an encoded version of the set of static data and the set of dynamic data in the second state. The set of static data and the set of dynamic data in the second state include a third plurality of information modules and a fourth plurality of information modules. The first group includes common information modules between the first plurality of information modules of the first 2D barcode and the third plurality of information modules of the second 2D barcode. The second group includes unique information modules of the third plurality of information modules of the second 2D barcode, and the third group includes unique information modules of the first plurality of information modules of the first 2D barcode. The first group is printed in the static ink, the second group is printed in a first dynamic ink, and the third group is printed in a second dynamic ink. The first dynamic ink is adapted to deactivate in response to the occurrence of a specific environmental factor, and the second dynamic ink is adapted to activate in response to the occurrence of the specific environmental factor.

In accordance with another exemplary aspect of the present disclosure, which may be used in combination with any one or more of the preceding aspects, the first dynamic ink and the second dynamic ink are responsive to environmental factors including at least one of temperature, time, radiation, light, and toxic chemicals.

In accordance with another exemplary aspect of the present disclosure, which may be used in combination with any one or more of the preceding aspects, the first dynamic ink and the second dynamic ink are responsive to time and temperature.

In accordance with another exemplary aspect of the present disclosure, which may be used in combination with any one or more of the preceding aspects, the first dynamic ink and the second dynamic ink are responsive to freezing.

In accordance with another exemplary aspect of the present disclosure, which may be used in combination with any one or more of the preceding aspects, the first dynamic ink and the second dynamic ink activate simultaneously.

In accordance with another exemplary aspect of the present disclosure, which may be used in combination with any one or more of the preceding aspects, an apparatus may perform a method of providing a 2D barcode, includes determining a set of payload data including a set of static data and a set of dynamic data having a first state and a second state, generating a 2D barcode which includes an encoded version of the set of static data, a dynamic region which is adapted to store the set of dynamic data, and error detection and correction data, and printing the 2D barcode using a static ink and an encoded set of the dynamic data on the dynamic region using a dynamic ink which changes states responsive to at least one environmental change, such that the set of dynamic data is in the first state or the second state, and the error detection and correction data accommodates for changes in the set of dynamic data in the dynamic region such that the 2D barcode is readable by a reader and produces a first output when the set of dynamic data is in the first state and the 2D barcode is readable by a reader and produces a second output when the set of dynamic data is in the second state.

In accordance with another exemplary aspect of the present disclosure, which may be used in combination with any one or more of the preceding aspects, the dynamic region is provided in a padding region.

In accordance with another exemplary aspect of the present disclosure, which may be used in combination with any one or more of the preceding aspects, the dynamic region is provided at an end of a data region.

In accordance with another exemplary aspect of the present disclosure, which may be used in combination with any one or more of the preceding aspects, an apparatus may perform a method of reading a 2D barcode includes scanning a set of static data included in the 2D barcode, scanning a set of dynamic data included in the 2D barcode, generating a first output of the set of static data, and generating a second output of the set of dynamic data. The 2D barcode is printed in static ink and dynamic ink, and an encoded version of the set of static data is printed in the static ink. An encoded version of the set of dynamic data is printed in the dynamic ink which changes states responsive to at least one environmental change, such that the dynamic data is in one of the plurality of states. The set of dynamic data is printed in a redundant space on the 2D barcode. The second output indicates on which state of the plurality of states the dynamic data is in.

In accordance with another exemplary aspect of the present disclosure, which may be used in combination with any one or more of the preceding aspects, an apparatus may perform a method of reading a two dimensional (2D) includes scanning a set of static data included in the 2D barcode, scanning a set of dynamic data included in the 2D barcode, and generating an output based on the set of static data and the set of dynamic data. The 2D barcode includes static ink and dynamic ink. An encoded version of the set of static data is printed in the static ink. An encoded version of the set of dynamic data is printed in the dynamic ink, which changes states responsive to at least one environmental change, such that the dynamic data is in one of a plurality of states. The set of dynamic data is printed in the dynamic region. The output is a first output when the set of dynamic data is in a first state of the plurality of states, and the output is a second output when the set of dynamic data is in a second state of the plurality of states.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. A method of reading of a sensor-augmented two-dimensional barcode symbol comprising:
    optically scanning an image of the sensor-augmented two-dimensional barcode symbol to obtain color values for pixels in the image;
    constructing a scanned pixel map including the color values;
    processing the pixels in the scanned pixel map by assigning a binary color value to each of the pixels to form a binarised pixel map;
    identifying the two-dimensional barcode symbol in the binarised pixel map;
    decoding the identified two-dimensional barcode symbol in the binarised pixel map to recover a symbol codeword sequence;
    recovering data codewords from the symbol codeword sequence by utilizing an error-correction process on the symbol codeword sequence;
    processing the data codewords for identification of barcode modules in a Censor dye dynamic region;
    determining an average color value of the barcode modules in the dynamic region; and
    processing the average color value of the dynamic region to determine a reflectance percentage of incident light at a time of scanning.

2. The method of claim 1, further comprising:
    capturing white light reflectance of one of the pixels included in the dynamic region; and
    creating a colored light filter effect on reflectance data from the scanned pixels utilizing a filter to generate filtered colored image values of the pixels in the scanned pixel map.

3. The method of claim 2, further comprising:
    reducing the filtered colored image values of the pixels in the scanned pixel map to greyscale values;
    determining an average greyscale value of the barcode modules; and
    processing the average greyscale value to determine the reflectance percentage of incident light at the time of scanning.

4. The method of claim 1, wherein processing the pixels in the scanned pixel map includes classifying each of the pixels as one of a black pixel, a white pixel, and a color pixel.

5. The method of claim 4, wherein the black pixels, the white pixels, and the color pixels are used to form a ternarised pixel map, and the black pixels and the white pixels in the ternarised pixel map are used to identify the two-dimensional barcode symbol in the ternarised pixel map.

6. The method of claim 1, wherein the dynamic region is located in an invariant area of a Data Matrix barcode symbol.

7. The method of claim 1, wherein the sensor dye dynamic region includes at least one of a dynamic ink and a that is responsive to environmental factors including at least one of temperature, time, radiation, light, and toxic chemicals.

8. The method of claim 1, wherein the data code words are part of an error correcting code chosen from the group consisting of Bose-Chaudhuri-Hocquenghem Codes, Hamming Codes, Golay Codes, Simplex Codes, Reed-Muller Codes, Fire Codes, Convolutional Codes, and Reed-Solomon Codes.

9. The method of claim 1, wherein the color values for at least the portion of the pixels in the image are configured to permanently change to the end color state when the environmental condition crosses a threshold value.

10. The method of claim 1, wherein the color values for at least a portion of the pixels in the image are configured to gradually change from an initial color state to an end color state indicative of a cumulative exposure to an occurrence of an environmental condition.

11. The method of claim 10, wherein the environmental condition is selected from the group consisting of time, temperature, and time-temperature product.

12. The method of claim 10, wherein the color values for at least a portion of the pixels in the image gradually reach an intermediate color state between the initial color state and the end state, wherein the intermediate color state indicates a remaining product life.

13. A method of reading of a sensor-augmented two-dimensional barcode symbol comprising:
    optically scanning an image of the sensor-augmented two-dimensional barcode symbol to obtain a greyscale value for each pixel in the image;
    constructing a greyscale pixel map of the pixels in the sensor-augmented two-dimensional barcode symbol;
    processing the pixels in the greyscale pixel map by assigning a binary color value to each of the pixels and to form a binarised pixel map;
    identifying the two-dimensional barcode symbol in the binarised pixel map;
    decoding the identified two-dimensional barcode symbol in the binarised pixel map to recover a symbol codeword sequence;
    recovering data codewords from the symbol codeword sequence utilizing an error-correction process on the symbol codeword sequence;
    processing the data codewords for identification of barcode modules in a dynamic region;

determining an average greyscale value of the barcode modules in the dynamic region; and processing the average greyscale value of the barcode modules in the dynamic region to determine a reflectance percentage of incident light at a time of scanning.

14. The method of claim 13, wherein an optical bandpass filter is used when scanning the image to create the effect of monochrome illumination.

15. The method of claim 13, wherein a light source is used to optically scan the image, the light source being a monochrome laser.

16. The method of claim 13, wherein a barcode imager is used to optically scan the image, and the barcode imager is responsive only to greyscale values.

17. The method of claim 13, wherein the data code words are part of an error correcting code chosen from the group consisting of Bose-Chaudhuri-Hocquenghem Codes, Hamming Codes, Golay Codes, Simplex Codes, Reed-Muller Codes, Fire Codes, Convolutional Codes, and Reed-Solomon Codes.

18. The method of claim 13, wherein the color values for at least a portion of the pixels in the image are configured to gradually change from an initial color state to an end color state indicative of a cumulative exposure to an occurrence of an environmental condition.

19. The method of claim 18, wherein the environmental condition is selected from the group consisting of time, temperature, and time-temperature product.

20. The method of claim 18, wherein the color values for at least a portion of the pixels in the image gradually reach an intermediate color state between the initial color state and the end state, wherein the intermediate color state indicates a remaining product life.

* * * * *